US012581469B2

(12) United States Patent
Yang et al.

(10) Patent No.: US 12,581,469 B2
(45) Date of Patent: Mar. 17, 2026

(54) PHYSICAL LAYER (PHY) PACKET DESIGN FOR POWER SPECTRAL DENSITY (PSD) LIMITS

(71) Applicant: QUALCOMM Incorporated, San Diego, CA (US)

(72) Inventors: Lin Yang, San Diego, CA (US); Jialing Li Chen, San Diego, CA (US); Sameer Vermani, San Diego, CA (US); Bin Tian, San Diego, CA (US); Youhan Kim, Saratoga, CA (US); Vincent Knowles Jones, IV, Redwood City, CA (US); Tevfik Yucek, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/196,247

(22) Filed: Mar. 9, 2021

(65) Prior Publication Data

US 2021/0289500 A1    Sep. 16, 2021

Related U.S. Application Data

(60) Provisional application No. 62/989,588, filed on Mar. 13, 2020, provisional application No. 63/009,450, filed on Apr. 13, 2020.

(51) Int. Cl.
*H04W 72/0453* (2023.01)
*H04W 52/36* (2009.01)

(52) U.S. Cl.
CPC ..... *H04W 72/0453* (2013.01); *H04W 52/367* (2013.01)

(58) Field of Classification Search
CPC ........... H04W 72/0453; H04W 52/367; H04W 84/12; H04L 5/0044
See application file for complete search history.

(56) References Cited

U.S. PATENT DOCUMENTS

| | | |
|---|---|---|
| 8,964,618 B2 | 2/2015 | Seok |
| 9,131,399 B2 | 9/2015 | Liu et al. |

(Continued)

FOREIGN PATENT DOCUMENTS

| | | |
|---|---|---|
| CN | 107925470 A | 4/2018 |
| CN | 110352578 B | 5/2022 |

(Continued)

OTHER PUBLICATIONS

International Search Report and Written Opinion—PCT/US2021/021645—ISA/EPO—dated Jun. 25, 2021.

(Continued)

*Primary Examiner* — Christine Ng
(74) *Attorney, Agent, or Firm* — Holland & Hart LLP

(57) ABSTRACT

This disclosure provides systems, methods and apparatus, including computer programs encoded on computer storage media, for physical layer (PHY) packet design for power spectral density (PSD) limits. In some implementations, a wireless communication device generates a plurality of PHY convergence protocol (PLCP) protocol data unit (PPDU) duplicates configured for transmission over a selected bandwidth, and transmits each PPDU duplicate of the plurality of PPDU duplicates on a corresponding frequency subband of a plurality of different frequency subbands. In some other implementations, the wireless communication device generates a PPDU for transmission over a set of duplicated resource units (RUs) allocated to the wireless communication device, and transmits the PPDU over the allocated set of duplicated RUs.

28 Claims, 27 Drawing Sheets

(56) References Cited

U.S. PATENT DOCUMENTS

| | | | |
|---|---|---|---|
| 9,462,575 | B2 | 10/2016 | Vermani et al. |
| 9,628,310 | B2 | 4/2017 | Lee et al. |
| 9,763,238 | B2 | 9/2017 | Ghosh et al. |
| 9,843,097 | B1* | 12/2017 | Zhang .................. H04L 5/0023 |
| 9,844,028 | B2 | 12/2017 | Yang et al. |
| 10,129,873 | B2 | 11/2018 | Yang et al. |
| 10,165,094 | B2 | 12/2018 | Sun et al. |
| 10,187,238 | B2 | 1/2019 | Chen et al. |
| 10,211,948 | B2 | 2/2019 | Liu et al. |
| 10,334,475 | B2 | 6/2019 | Xi et al. |
| 10,523,483 | B2 | 12/2019 | Noh et al. |
| 11,122,594 | B2 | 9/2021 | Bhanage et al. |
| 11,395,359 | B2 | 7/2022 | Cao et al. |
| 11,621,753 | B2 | 4/2023 | Jiang et al. |
| 11,888,770 | B2 | 1/2024 | Yang et al. |
| 2002/0159506 | A1 | 10/2002 | Alamouti et al. |
| 2007/0043982 | A1 | 2/2007 | Arivoli et al. |
| 2015/0365195 | A1 | 12/2015 | Yang et al. |
| 2016/0088599 | A1 | 3/2016 | Yang et al. |
| 2016/0165607 | A1* | 6/2016 | Hedayat ................ H04W 24/00 |
| | | | 370/338 |
| 2017/0041929 | A1* | 2/2017 | Noh ...................... H04L 5/0037 |
| 2017/0054542 | A1 | 2/2017 | Vermani et al. |
| 2017/0064718 | A1 | 3/2017 | Bharadwaj et al. |
| 2017/0181034 | A1 | 6/2017 | Lee et al. |
| 2017/0195890 | A1 | 7/2017 | Chen et al. |
| 2017/0303275 | A1* | 10/2017 | Banerjea ................ H04B 1/713 |
| 2018/0007179 | A1 | 1/2018 | Chen et al. |
| 2018/0103487 | A1 | 4/2018 | Asterjadhi et al. |
| 2018/0115972 | A1 | 4/2018 | Huang et al. |
| 2018/0205519 | A1 | 7/2018 | Vermani et al. |
| 2018/0242355 | A1* | 8/2018 | Lou ...................... H04W 74/006 |
| 2019/0159207 | A1 | 5/2019 | Chen et al. |
| 2019/0199499 | A1 | 6/2019 | Da Silva et al. |
| 2019/0238288 | A1* | 8/2019 | Liu ...................... H04L 1/0059 |
| 2019/0281614 | A1 | 9/2019 | Chen et al. |
| 2019/0312710 | A1 | 10/2019 | Noh et al. |
| 2020/0007265 | A1 | 1/2020 | Min et al. |
| 2020/0008185 | A1* | 1/2020 | Chen ...................... H04L 69/18 |
| 2020/0014509 | A1 | 1/2020 | Asterjadhi et al. |
| 2020/0014576 | A1 | 1/2020 | Cherian et al. |
| 2020/0045656 | A1 | 2/2020 | Verma et al. |
| 2020/0322199 | A1 | 10/2020 | Matsumura et al. |
| 2020/0382173 | A1* | 12/2020 | Park ........................ H04L 5/001 |
| 2021/0105667 | A1* | 4/2021 | Li ........................ H04W 74/002 |
| 2021/0135789 | A1 | 5/2021 | Wu et al. |
| 2021/0144752 | A1* | 5/2021 | Chen ...................... H04L 5/0091 |
| 2021/0204299 | A1* | 7/2021 | Yun ...................... H04W 72/542 |
| 2021/0243586 | A1 | 8/2021 | Osawa et al. |
| 2021/0258115 | A1* | 8/2021 | Liu ...................... H04L 5/0053 |
| 2021/0288768 | A1 | 9/2021 | Yang |
| 2021/0288769 | A1 | 9/2021 | Yang et al. |
| 2022/0053465 | A1 | 2/2022 | Redlich et al. |
| 2022/0053482 | A1* | 2/2022 | Yang .................. H04L 41/0803 |
| 2022/0060286 | A1 | 2/2022 | Yoshioka et al. |
| 2022/0150014 | A1 | 5/2022 | Wong et al. |
| 2022/0294558 | A1 | 9/2022 | Park et al. |
| 2022/0377603 | A1 | 11/2022 | Kim |
| 2024/0171329 | A1 | 5/2024 | Yang et al. |

FOREIGN PATENT DOCUMENTS

| | | | |
|---|---|---|---|
| JP | 6278319 | B2 | 2/2018 |
| TW | 201935878 | A | 9/2019 |
| WO | WO-2016025817 | A1 | 2/2016 |
| WO | WO-2016164621 | A1 | 10/2016 |
| WO | WO-2017031451 | A1 | 2/2017 |

OTHER PUBLICATIONS

Kim J., (Apple) et al., "RU Restriction of 20MHz Operating Devices in OFDMA", IEEE 802.11-16/0906r0, IEEE, Retrieved from the Internet: URL:https://mentor.ieee.org/802.11/dcn/16/11-16-0906-00-00ax-ru-restriction-on-20mhz-operating-stas.pptx, Jul. 25, 2016, 11-16-0906-00-00AX-RU-RESTRICTION-ON-20MHZ-OPERATING-STAS, IEEE-SA Mentor, Piscataway, NJ USA, vol. 802 .11ax, Jul. 25, 2016 (Jul. 25, 2016), 33 Pages, XP068107223, [retrieved on Jul. 25, 2016] p. 18-p. 21.

Fatang C., et al., "Analysis and Design of Uplink Resource Scheduling in Narrow Band Internet of Things", Journal of Computer Applications, Nov. 10, 2018, vol. 38(11), pp. 3270-3274, 3281.

Taiwan Search Report—TW110108532—TIPO—Apr. 16, 2024.

Taiwan Search Report—TW110108500—TIPO—Sep. 6, 2024.

Taiwan Search Report—TW110108501—TIPO—Oct. 23, 2024.

* cited by examiner

400

1100

1102

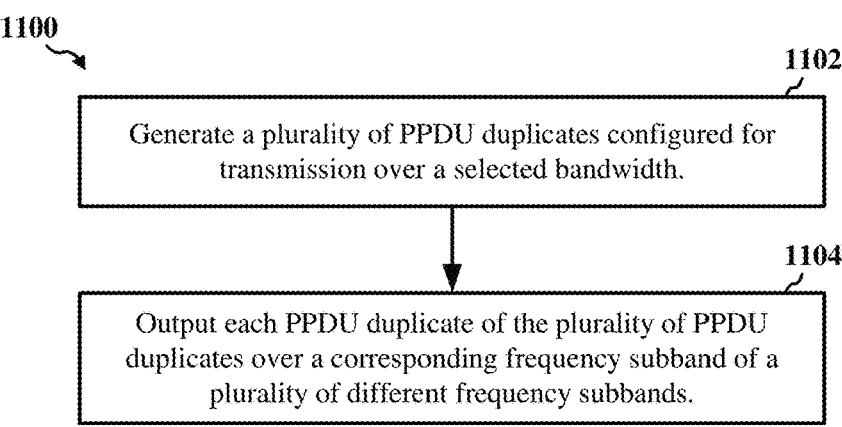

Generate a plurality of PPDU duplicates configured for transmission over a selected bandwidth.

1104

Output each PPDU duplicate of the plurality of PPDU duplicates over a corresponding frequency subband of a plurality of different frequency subbands.

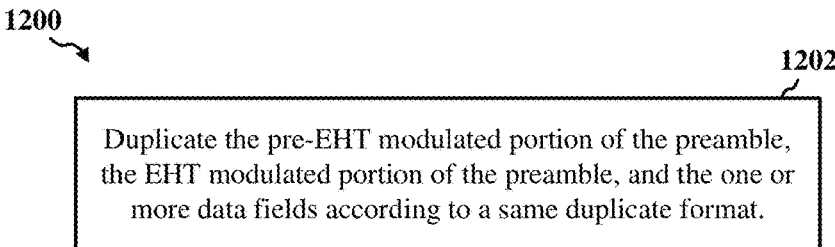

Duplicate the pre-EHT modulated portion of the preamble, the EHT modulated portion of the preamble, and the one or more data fields according to a same duplicate format.

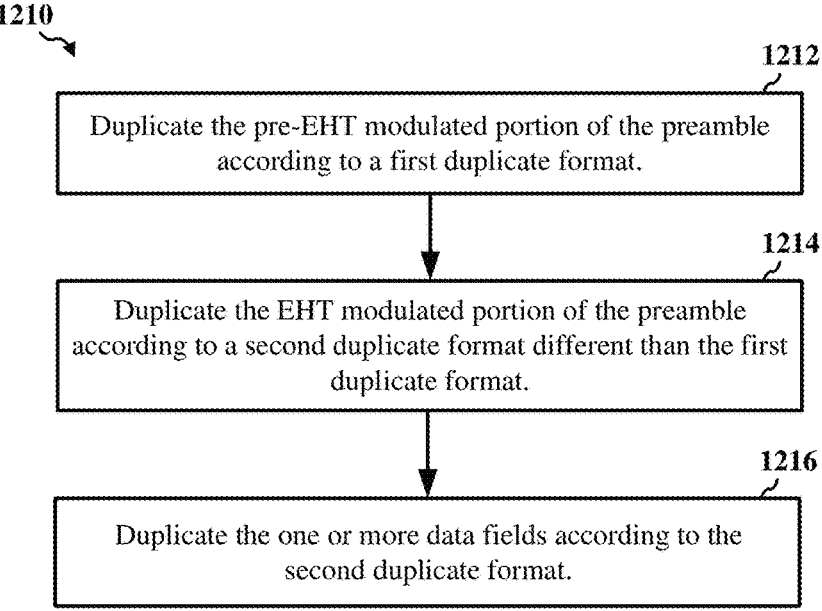

Duplicate the pre-EHT modulated portion of the preamble according to a first duplicate format.

1214

Duplicate the EHT modulated portion of the preamble according to a second duplicate format different than the first duplicate format.

1216

Duplicate the one or more data fields according to the second duplicate format.

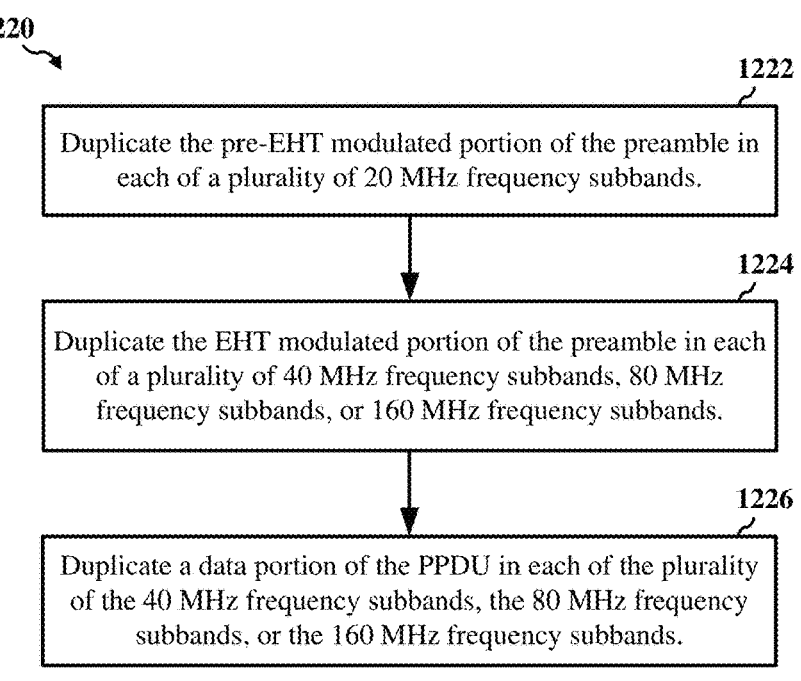

Duplicate the pre-EHT modulated portion of the preamble in each of a plurality of 20 MHz frequency subbands.

1224

Duplicate the EHT modulated portion of the preamble in each of a plurality of 40 MHz frequency subbands, 80 MHz frequency subbands, or 160 MHz frequency subbands.

1226

Duplicate a data portion of the PPDU in each of the plurality of the 40 MHz frequency subbands, the 80 MHz frequency subbands, or the 160 MHz frequency subbands.

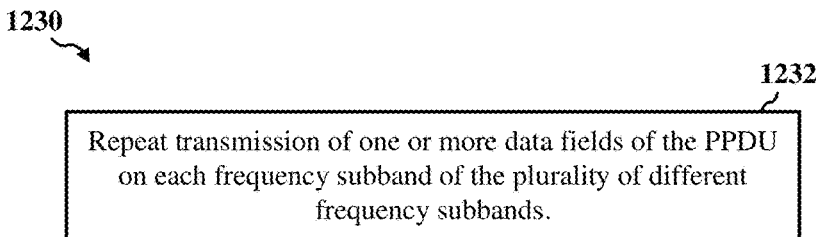

Repeat transmission of one or more data fields of the PPDU on each frequency subband of the plurality of different frequency subbands.

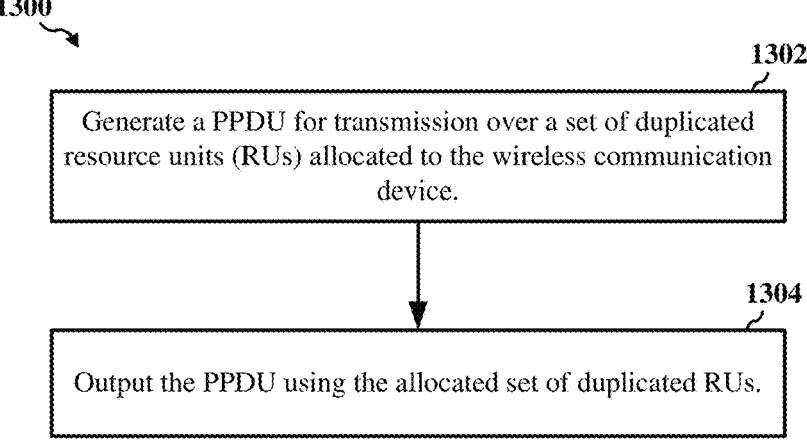

Generate a PPDU for transmission over a set of duplicated resource units (RUs) allocated to the wireless communication device.

1304

Output the PPDU using the allocated set of duplicated RUs.

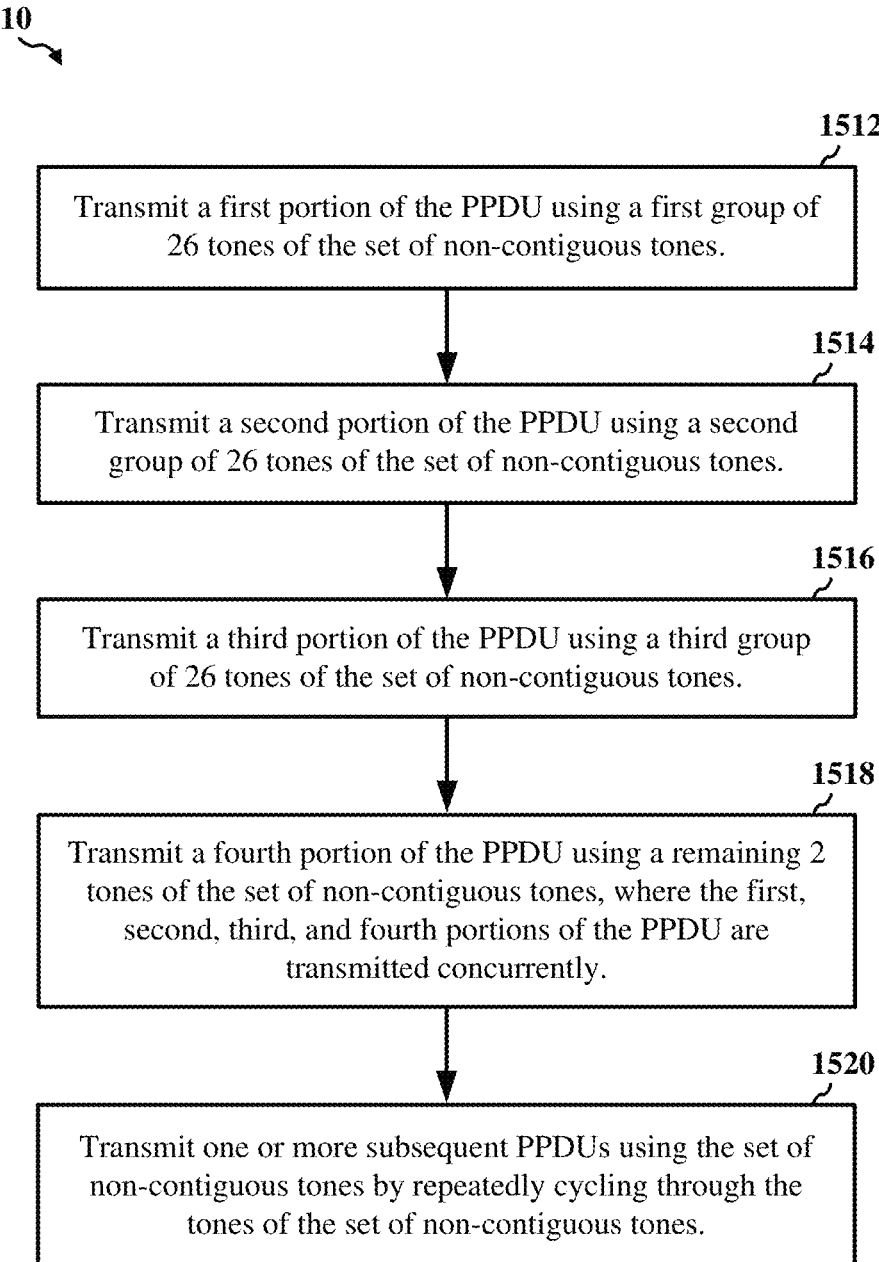

1512

Transmit a first portion of the PPDU using a first group of 26 tones of the set of non-contiguous tones.

1514

Transmit a second portion of the PPDU using a second group of 26 tones of the set of non-contiguous tones.

1516

Transmit a third portion of the PPDU using a third group of 26 tones of the set of non-contiguous tones.

1518

Transmit a fourth portion of the PPDU using a remaining 2 tones of the set of non-contiguous tones, where the first, second, third, and fourth portions of the PPDU are transmitted concurrently.

1520

Transmit one or more subsequent PPDUs using the set of non-contiguous tones by repeatedly cycling through the tones of the set of non-contiguous tones.

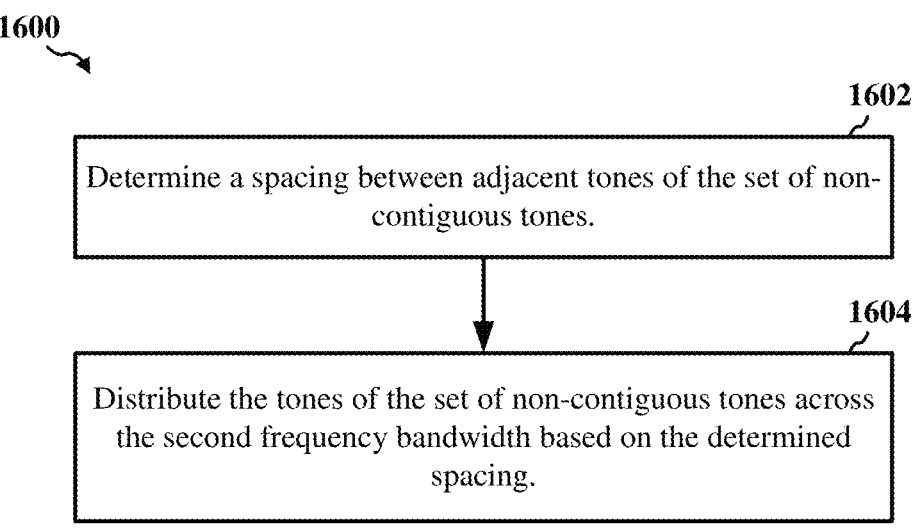

1602

Determine a spacing between adjacent tones of the set of non-contiguous tones.

1604

Distribute the tones of the set of non-contiguous tones across the second frequency bandwidth based on the determined spacing.

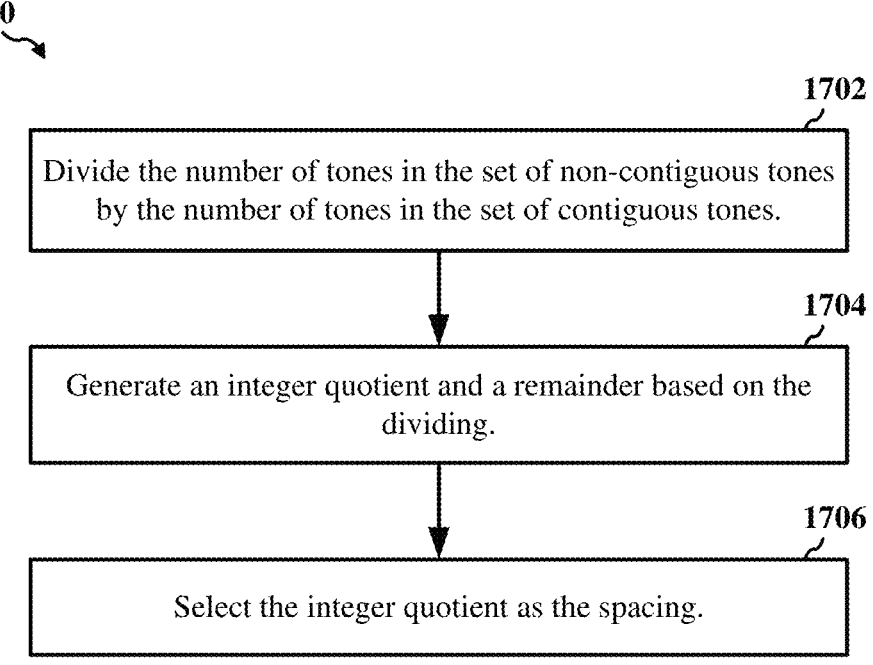

1702

Divide the number of tones in the set of non-contiguous tones by the number of tones in the set of contiguous tones.

1704

Generate an integer quotient and a remainder based on the dividing.

1706

Select the integer quotient as the spacing.

*Figure 17*

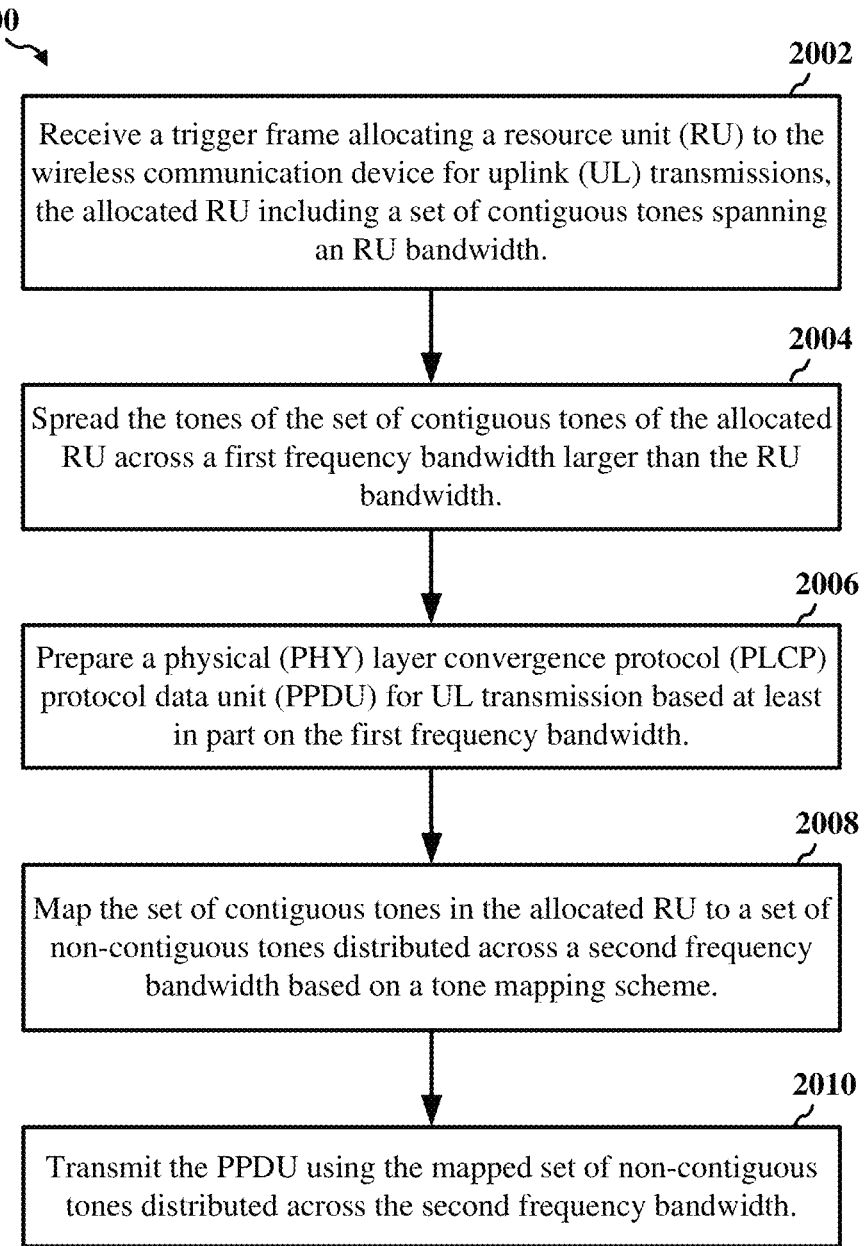

2000

2002

Receive a trigger frame allocating a resource unit (RU) to the wireless communication device for uplink (UL) transmissions, the allocated RU including a set of contiguous tones spanning an RU bandwidth.

2004

Spread the tones of the set of contiguous tones of the allocated RU across a first frequency bandwidth larger than the RU bandwidth.

2006

Prepare a physical (PHY) layer convergence protocol (PLCP) protocol data unit (PPDU) for UL transmission based at least in part on the first frequency bandwidth.

2008

Map the set of contiguous tones in the allocated RU to a set of non-contiguous tones distributed across a second frequency bandwidth based on a tone mapping scheme.

2010

Transmit the PPDU using the mapped set of non-contiguous tones distributed across the second frequency bandwidth.

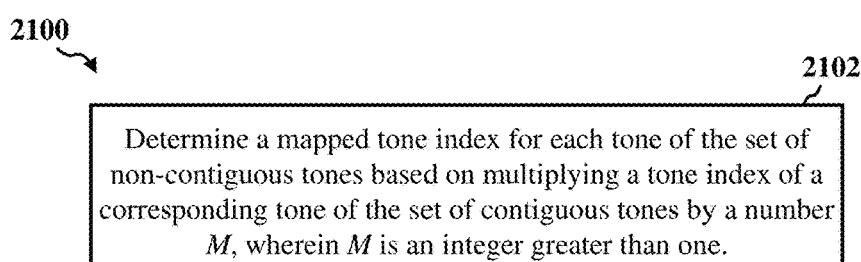

Determine a mapped tone index for each tone of the set of non-contiguous tones based on multiplying a tone index of a corresponding tone of the set of contiguous tones by a number *M*, wherein *M* is an integer greater than one.

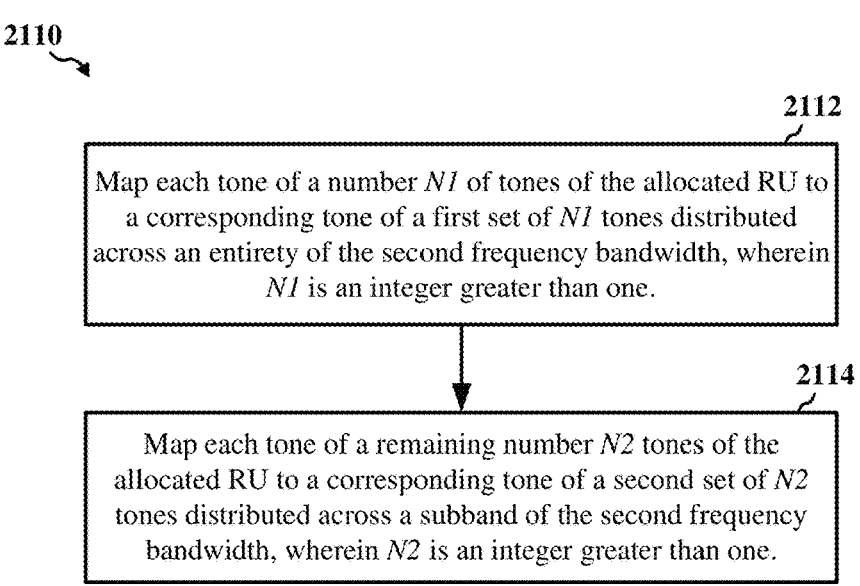

Map each tone of a number *N1* of tones of the allocated RU to a corresponding tone of a first set of *N1* tones distributed across an entirety of the second frequency bandwidth, wherein *N1* is an integer greater than one.

2114

Map each tone of a remaining number *N2* tones of the allocated RU to a corresponding tone of a second set of *N2* tones distributed across a subband of the second frequency bandwidth, wherein *N2* is an integer greater than one.

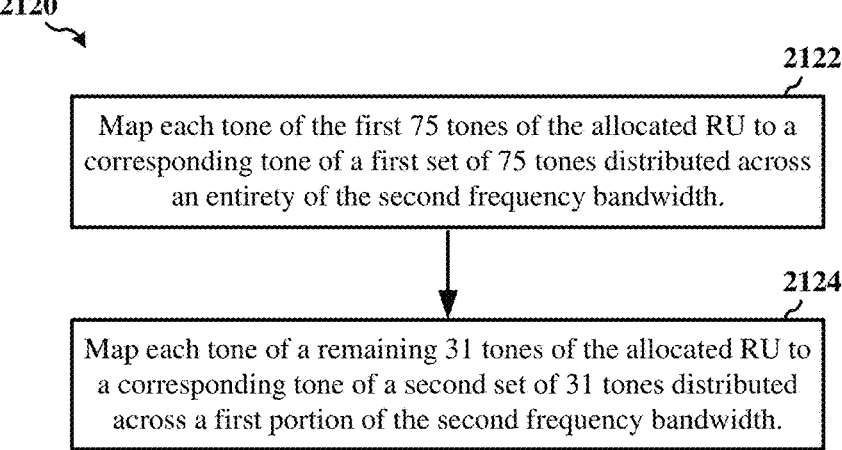

Map each tone of the first 75 tones of the allocated RU to a corresponding tone of a first set of 75 tones distributed across an entirety of the second frequency bandwidth.

2124

Map each tone of a remaining 31 tones of the allocated RU to a corresponding tone of a second set of 31 tones distributed across a first portion of the second frequency bandwidth.

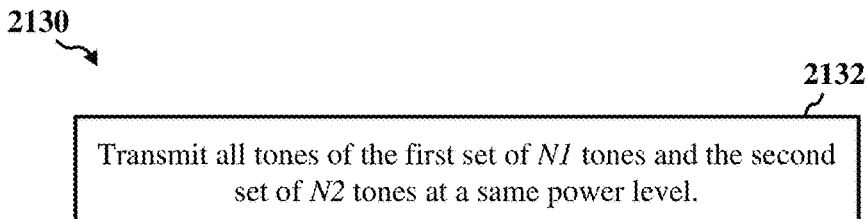

Transmit all tones of the first set of *N1* tones and the second set of *N2* tones at a same power level.

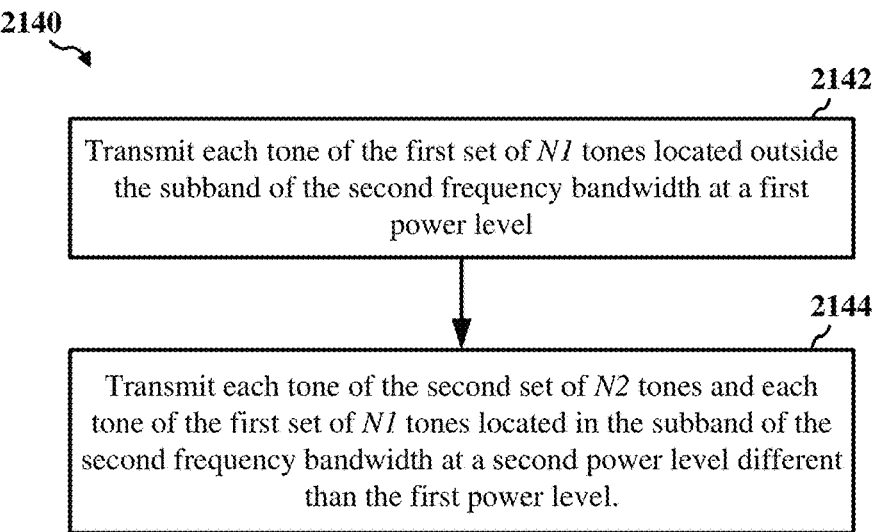

Transmit each tone of the first set of *N1* tones located outside the subband of the second frequency bandwidth at a first power level

2144

Transmit each tone of the second set of *N2* tones and each tone of the first set of *N1* tones located in the subband of the second frequency bandwidth at a second power level different than the first power level.

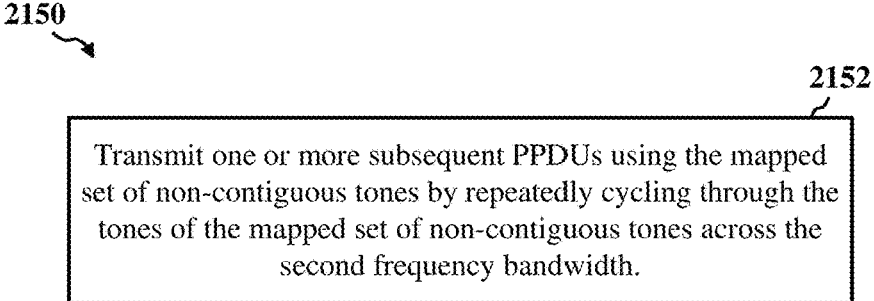

Transmit one or more subsequent PPDUs using the mapped set of non-contiguous tones by repeatedly cycling through the tones of the mapped set of non-contiguous tones across the second frequency bandwidth.

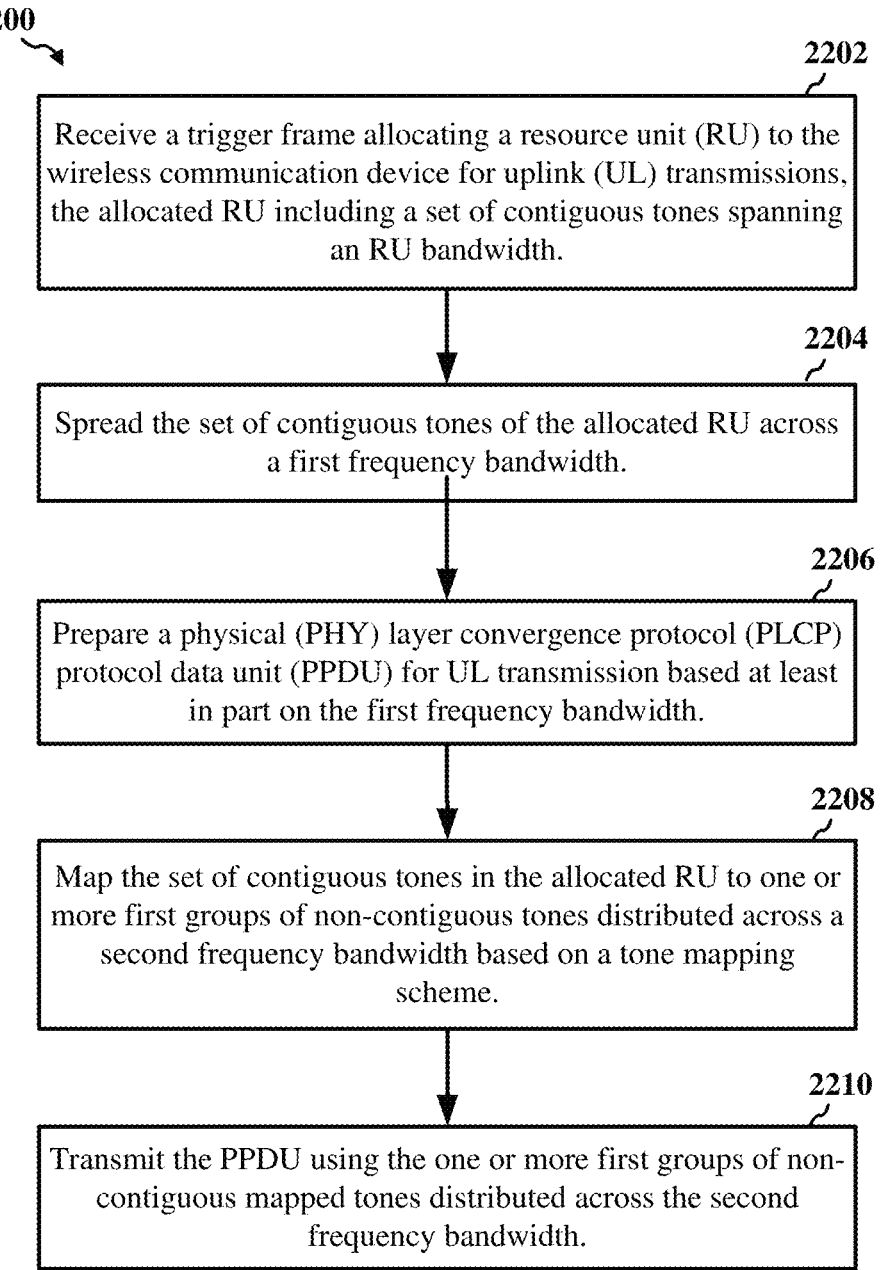

2202

Receive a trigger frame allocating a resource unit (RU) to the wireless communication device for uplink (UL) transmissions, the allocated RU including a set of contiguous tones spanning an RU bandwidth.

2204

Spread the set of contiguous tones of the allocated RU across a first frequency bandwidth.

2206

Prepare a physical (PHY) layer convergence protocol (PLCP) protocol data unit (PPDU) for UL transmission based at least in part on the first frequency bandwidth.

2208

Map the set of contiguous tones in the allocated RU to one or more first groups of non-contiguous tones distributed across a second frequency bandwidth based on a tone mapping scheme.

2210

Transmit the PPDU using the one or more first groups of non-contiguous mapped tones distributed across the second frequency bandwidth.

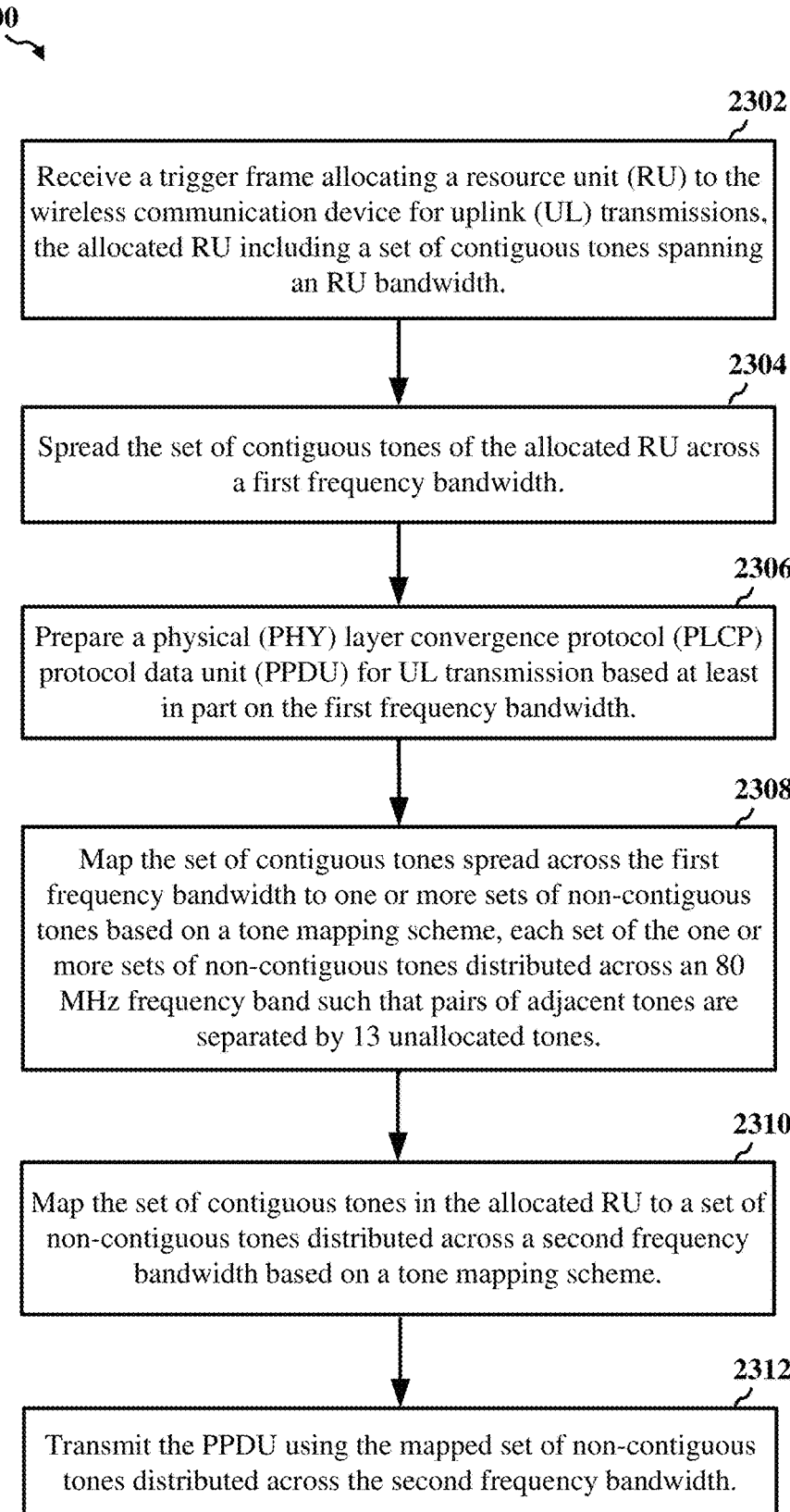

2302

Receive a trigger frame allocating a resource unit (RU) to the wireless communication device for uplink (UL) transmissions, the allocated RU including a set of contiguous tones spanning an RU bandwidth.

2304

Spread the set of contiguous tones of the allocated RU across a first frequency bandwidth.

2306

Prepare a physical (PHY) layer convergence protocol (PLCP) protocol data unit (PPDU) for UL transmission based at least in part on the first frequency bandwidth.

2308

Map the set of contiguous tones spread across the first frequency bandwidth to one or more sets of non-contiguous tones based on a tone mapping scheme, each set of the one or more sets of non-contiguous tones distributed across an 80 MHz frequency band such that pairs of adjacent tones are separated by 13 unallocated tones.

2310

Map the set of contiguous tones in the allocated RU to a set of non-contiguous tones distributed across a second frequency bandwidth based on a tone mapping scheme.

2312

Transmit the PPDU using the mapped set of non-contiguous tones distributed across the second frequency bandwidth.

*Figure 23*

PHYSICAL LAYER (PHY) PACKET DESIGN FOR POWER SPECTRAL DENSITY (PSD) LIMITS

CROSS-REFERENCE TO RELATED APPLICATIONS

This Patent application claims priority to U.S. Provisional Patent Application No. 62/989,588 entitled "PHYSICAL LAYER (PHY) PACKET DESIGN FOR POWER SPECTRAL DENSITY (PSD) LIMITS" filed on Mar. 13, 2020 and to U.S. Provisional Patent Application No. 63/009,450 entitled "PHYSICAL LAYER (PHY) PACKET DESIGN FOR POWER SPECTRAL DENSITY (PSD) LIMITS" filed on Apr. 13, 2020, both of which are assigned to the assignee hereof. The disclosures of all prior Applications are considered part of and are incorporated by reference in this Patent Application.

TECHNICAL FIELD

This disclosure relates generally to wireless communication, and more specifically to using duplication in wireless transmissions.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN. New WLAN communication protocols are being developed to enable enhanced WLAN communication features.

In some instances, APs and STAs may be subject to power spectral density (PSD) limits that can undesirably reduce transmission ranges. These PSD limits also may reduce packet detection and channel estimation capabilities of APs and STAs.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by an apparatus of a wireless communication device, and may include generating a plurality of physical (PHY) layer convergence protocol (PLCP) protocol data unit (PPDU) duplicates configured for transmission over a selected bandwidth. The method also may include transmitting each PPDU duplicate of the plurality of PPDU duplicates on a corresponding frequency subband of a plurality of different frequency subbands. In some implementations, each PPDU duplicate may be based on duplication of an entirety of the PPDU except for any universal signal field (U-SIG).

In some implementations, the plurality of different frequency subbands may include one or more unlicensed channels in a 6 GHz frequency spectrum, and a power spectral density (PSD) limit applicable to the transmission may be based on a combined frequency bandwidth of the plurality of different frequency subbands. In some instances, the combined frequency bandwidth is N times greater than the selected bandwidth upon which a respective PPDU duplicate is transmitted.

The PPDU may include a physical layer preamble containing a pre-Extremely High Throughput (EHT) modulated portion and an EHT modulated portion. The PPDU also may include one or more data fields. In some implementations, generating the plurality of PPDU duplicates includes duplicating the pre-EHT modulated portion of the preamble, the EHT modulated portion of the preamble, and the one or more data fields according to a same duplicate format. In some other implementations, generating the plurality of PPDU duplicates includes duplicating the pre-EHT modulated portion of the preamble according to a first duplicate format, duplicating the EHT modulated portion of the preamble according to a second duplicate format, and duplicating the one or more data fields according to the second duplicate format, where the second duplicate format is different than the first duplicate format. In some instances, the first duplicate format may be associated with a first multiple of a frequency bandwidth, and the second duplicate format may be associated with a second multiple of the frequency bandwidth, where the second multiple is at least twice the first multiple.

In some implementations, the PPDU includes a physical layer preamble, and may be one of an EHT format or a single-user (SU) extended range (ER) PPDU format. In some instances, generating the plurality of PPDU duplicates may include duplicating the preamble in each of a plurality of 20 MHz frequency subbands, and duplicating a data portion of the PPDU in each of the plurality of the 40 MHz frequency subbands, the 80 MHz frequency subbands, or the 160 MHz frequency subbands.

Another innovative aspect of the subject matter described in this disclosure can be implemented in a wireless communication device. The wireless communication device may include a processing system coupled to an interface. The processing system may be configured to generate a plurality of PPDU duplicates configured for transmission over a selected bandwidth. The interface may be configured to output each PPDU duplicate of the plurality of PPDU duplicates on a corresponding frequency subband of a plurality of different frequency subbands. In some implementations, each PPDU duplicate may be based on duplication of an entirety of the PPDU except for any U-SIG.

In some implementations, the plurality of different frequency subbands may include one or more unlicensed channels in a 6 GHz frequency spectrum, and a PSD limit applicable to the transmission may be based on a combined frequency bandwidth of the plurality of different frequency subbands. In some instances, the combined frequency bandwidth is N times greater than the selected bandwidth upon which a respective PPDU duplicate is transmitted.

The PPDU may include a physical layer preamble containing a pre-EHT modulated portion and an EHT modulated portion. The PPDU also may include one or more data fields. In some implementations, generating the plurality of PPDU duplicates includes duplicating the pre-EHT modulated portion of the preamble, the EHT modulated portion of the preamble, and the one or more data fields according to a same duplicate format. In some other implementations, generating the plurality of PPDU duplicates includes duplicating the pre-EHT modulated portion of the preamble according to a first duplicate format, duplicating the EHT modulated portion of the preamble according to a second duplicate format, and duplicating the one or more data fields according to the second duplicate format, where the second duplicate format is different than the first duplicate format. In some instances, the first duplicate format may be associated with a first multiple of a frequency bandwidth, and the second duplicate format may be associated with a second multiple of the frequency bandwidth, where the second multiple is at least twice the first multiple.

In some implementations, the PPDU includes a physical layer preamble, and may be one of an EHT format or a SU ER PPDU format. In some instances, generating the plurality of PPDU duplicates may include duplicating the preamble in each of a plurality of 20 MHz frequency subbands, and duplicating a data portion of the PPDU in each of the plurality of the 40 MHz frequency subbands, the 80 MHz frequency subbands, or the 160 MHz frequency subbands.

Another innovative aspect of the subject matter described in this disclosure can be implemented in a method for wireless communication. The method may be performed by an apparatus of a wireless communication device, and may include generating a PPDU for transmission over a set of duplicated resource units (RUs) allocated to the wireless communication device. The method also may include transmitting the PPDU over the allocated set of duplicated RUs. In some implementations, the PPDU may be a SU PPDU. In some instances, a PSD limit applicable to the transmission may be based on a frequency bandwidth spanned by the allocated set of duplicated RUs. The spanned frequency bandwidth may be at least twice the frequency bandwidth of a respective duplicated PPDU.

In some implementations, a size of the duplicated RUs in the allocated set of duplicated RUs may be based at least in part on a PSD limit applicable to a frequency bandwidth of the wireless channel. In some instances, the set of duplicated RUs may be based on duplication of a RU a number N of times, wherein N is an integer greater than 1. In some other instances, the PPDU may be transmitted on each RU of the allocated set of RUs.

Another innovative aspect of the subject matter described in this disclosure can be implemented in a wireless communication device. The wireless communication device may include a processing system coupled to an interface. The processing system may be configured to generate a PPDU for transmission over a set of duplicated RUs allocated to the wireless communication device. The interface may be configured to output the PPDU over the allocated set of duplicated RUs. In some implementations, the PPDU may be a SU PPDU. In some instances, a PSD limit applicable to the transmission may be based on a frequency bandwidth spanned by the allocated set of duplicated RUs. The spanned frequency bandwidth may be at least twice the frequency bandwidth of a respective duplicated PPDU.

In some implementations, a size of the duplicated RUs in the allocated set of duplicated RUs may be based at least in part on a PSD limit applicable to a frequency bandwidth of the wireless channel. In some instances, the set of duplicated RUs may be based on duplication of a RU a number N of times, wherein N is an integer greater than 1. In some other instances, the PPDU may be transmitted on each RU of the allocated set of RUs.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 11 shows a flowchart illustrating an example operation for wireless communication that supports transmitting PPDU duplicates.

FIGS. 12A, 12B, 12C and 12D show flowcharts illustrating example operations for wireless communication that support transmitting PPDU duplicates.

FIG. 13 shows a flowchart illustrating an example operation for wireless communication that supports RU duplication.

FIGS. 15A and 15B show flowcharts illustrating example operations for wireless communication that supports transmitting one or more PPDUs using tone mapping.

FIG. 16 shows a flowchart illustrating an example operation for wireless communication that supports transmitting one or more PPDUs using tone mapping.

FIG. 17 shows a flowchart illustrating an example operation for wireless communication that supports transmitting one or more PPDUs using tone mapping.

FIG. 20 shows a flowchart illustrating an example operation for wireless communication that supports transmitting one or more PPDUs using tone mapping.

FIGS. 21A, 21B, 21C, 21D, 21E and 21F show flowcharts illustrating example operations for wireless communication that supports transmitting one or more PPDUs using tone mapping.

FIG. 22 shows a flowchart illustrating an example operation for wireless communication that supports transmitting one or more PPDUs using tone mapping.

FIG. 23 shows a flowchart illustrating an example operation for wireless communication that supports transmitting one or more PPDUs using tone mapping.

Like reference numbers and designations in the various drawings indicate like elements.

DETAILED DESCRIPTION

Figure 1:
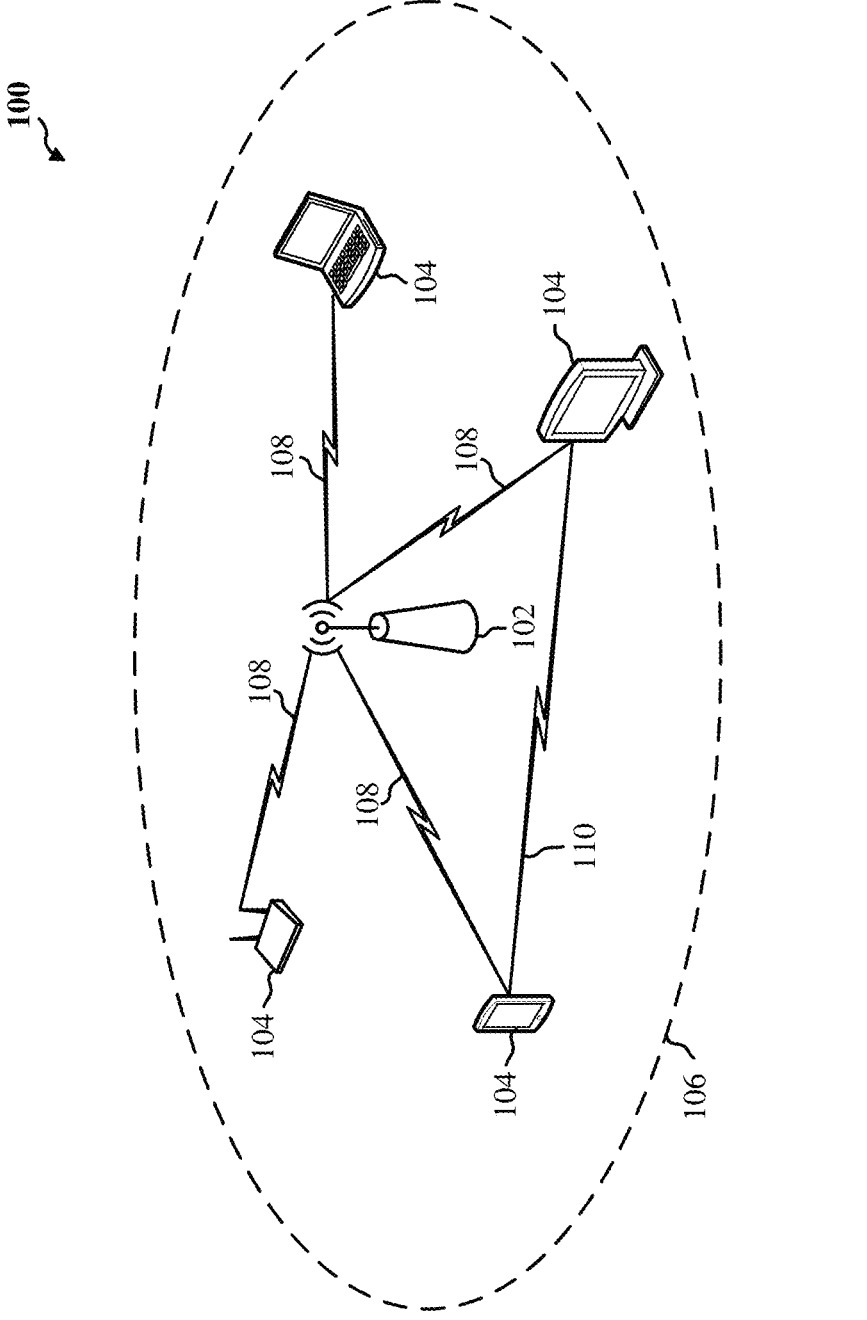
FIG. 1 shows a block diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Various implementations relate generally to increasing the allowed transmit power of APs and STAs. APs and STAs may be subject to power spectral density (PSD) limits that can undesirably reduce transmission ranges, reduce packet detection capabilities, and reduce channel estimation capabilities of APs and STAs. For example, recently proposed PSD limits on wireless communications in the 6 GHz frequency band may limit the transmit power of APs to 5 dBm/MHz, and may limit the transmit power of non-AP STAs to −1 dBm/MHz. Some implementations more specifically relate to increasing the maximum allowed transmit power of APs and STAs by transmitting information on a wider frequency bandwidth, which may increase the PSD limits applicable to such transmissions.

In some implementations, packet duplication may be used to increase the frequency bandwidth upon which information is exchanged between wireless communication devices. In some instances, the STA may prepare a physical layer (PHY) convergence protocol (PLCP) protocol data unit (PPDU) for transmission on a selected bandwidth. The STA may generate a plurality of PPDU duplicates based on duplication of an entirety of the PPDU, except for any universal signal field (U-SIG) or any extremely high throughput (EHT) signal (SIG) field (EHT-SIG) present in the PPDU. The STA may transmit each of the PPDU duplicates on a different frequency subband. For example, the PPDU may be formatted for a 20 MHz frequency subband, and the STA may duplicate the PPDU a number N times to generate a number N of PPDU duplicates. Each of the N PPDU duplicates may be transmitted on a different 20 MHz frequency subband such that transmission of the N PPDU duplicates spans a frequency band equal to N×20 MHz, thereby increasing applicable PSD limits by N times. For PPDUs that include a U-SIG, the U-SIG may be duplicated in each 20 MHz frequency subband of the N×20 MHz frequency band used for UL PPDU transmissions. For PPDUs that include a EHT-SIG, the EHT-SIG may be duplicated within each 80 MHz frequency subband based on its encoding structure. In some instances, the contents of U-SIG and EHT-SIG may be different for each of the generated PPDU duplicates.

In some other implementations, duplicated resource units (RUs) may be used to increase the frequency bandwidth upon which information is exchanged between wireless communication devices. In some instances, the STA may generate a PPDU for transmission over a set of duplicated resource units (RUs) allocated to the wireless communication device, and may transmit the PPDU over the allocated set of duplicated RUs. The frequency bandwidth spanned by the allocated set of duplicated RUs may be two or more times as wide as the frequency bandwidth of a respective duplicated RU, which may increase the maximum transmit power allowed by the PSD limits by two or more times. That is, the PSD limit applicable to the transmission may be based on a frequency bandwidth spanned by the allocated set of duplicated RUs. In some instances, a size of the duplicated RUs in the allocated set of duplicated RUs may be based at least in part on the PSD limit applicable to a frequency bandwidth of the wireless channel.

In some other implementations, tone mapping may be used to increase the frequency bandwidth upon which information is exchanged between wireless communication devices. In some instances, the STA may be allocated a RU including a set of contiguous tones for uplink (UL) or downlink (DL) transmissions, and may prepare a PPDU based at least in part on the first frequency bandwidth. The STA may map the set of contiguous tones of the allocated RU to a set of non-contiguous tones distributed across a second frequency bandwidth larger than the first frequency bandwidth, and may transmit the PPDU using the second set of tones spanning the second frequency bandwidth.

Particular implementations of the subject matter described in this disclosure can be implemented to realize one or more of the following potential advantages. In some implementations, the described techniques may be used to increase the allowable transmit power of APs and STAs. Specifically, because PSD limits imposed on wireless communications may be expressed as a function of bandwidth, the maximum transmit power allowed by such PSD limits may be increased by using larger bandwidths for wireless communications without increasing the data rate used for such communications. In some implementations, a STA that prepares a PPDU for transmission on a 20 MHz frequency subband may duplicate the PPDU a number of times and transmit the number of duplicated PPDUs on a corresponding number of 20 MHz frequency subbands, for example, such that the applicable PSD limit is based on the combined number of 20 MHz frequency subbands (rather than on a single 20 MHz frequency subband). In some other implementations, a STA that is allocated one or more RUs for UL or DL transmissions may use duplicated RUs that span a wider frequency band to transmit UL or DL data, for example, such that the applicable PSD limit is based on the wider frequency band (rather than on the frequency subband corresponding to the allocated RUs before duplication). In some other implementations, a STA that is allocated an RU including a set of contiguous tones spanning a first frequency bandwidth may map the tones of the allocated RU to a set of non-contiguous tones distributed across a second frequency bandwidth larger than the first frequency bandwidth, and transmit data using the mapped tones distributed across the second frequency bandwidth, for example, such that the applicable PSD limit is based on the second frequency bandwidth (rather than on the first frequency bandwidth). In this way, implementations of the subject matter disclosed herein may be used to increase the total transmit power of wireless communication devices. The ability to increase the transmit power of a wireless communication device may improve the signal quality of its wireless transmissions (such as by increasing one or more of a received signal strength indicator (RSSI), a channel quality indicator (CQI), a signal-to-noise ratio (SNR), a signal-to-interference plus noise ratio (SINR), and so on), and also may increase the wireless range of the wireless communication device.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
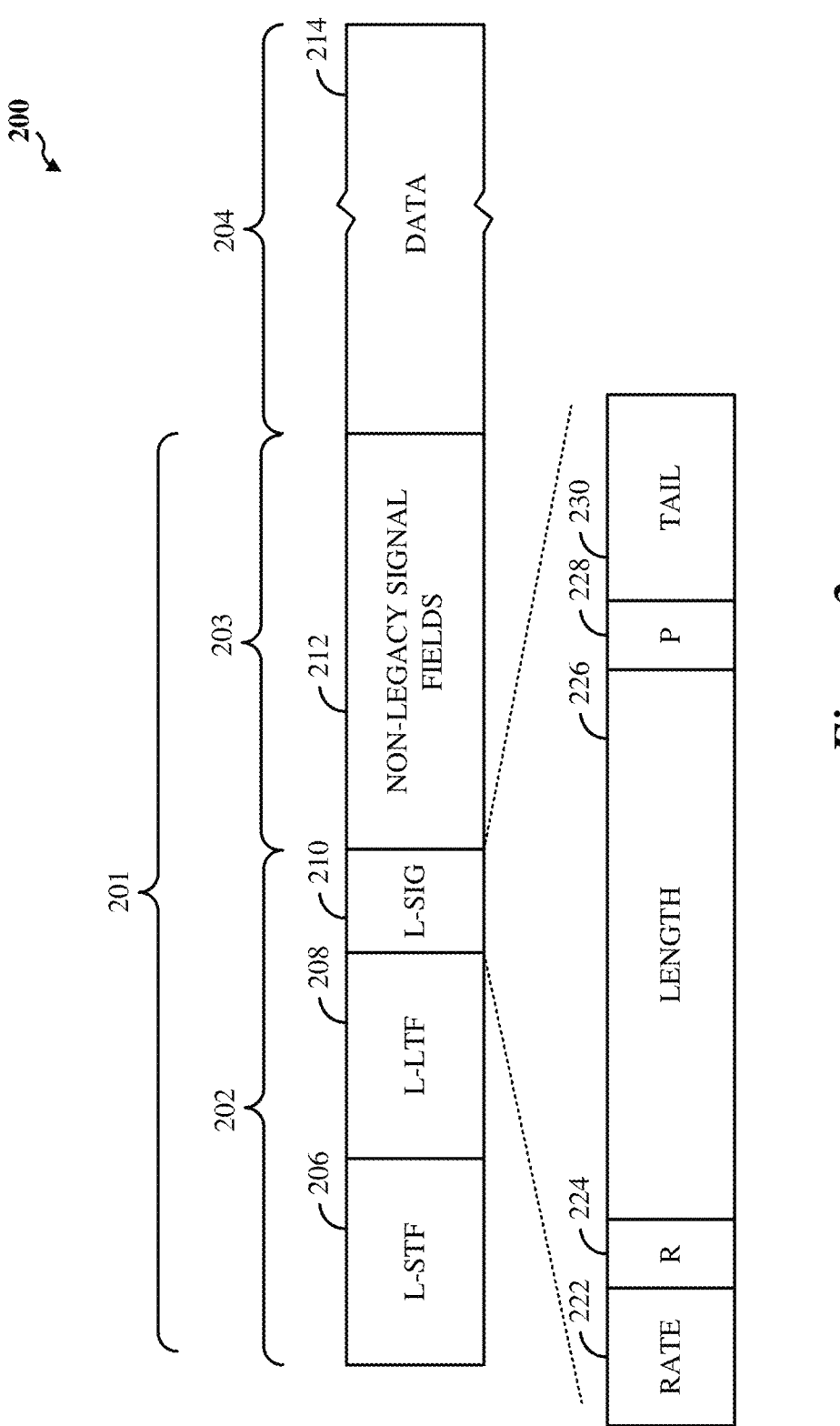
FIG. 2 shows an example protocol data unit (PDU) usable for communications between an access point (AP) and one or more wireless stations (STAs).

FIG. 2 shows an example protocol data unit (PDU) 200 usable for wireless communication between an AP and a number of STAs. For example, the PDU 200 can be configured as a PPDU. As shown, the PDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard. The preamble 201 may also include a second portion 203 including one or more non-legacy signal fields 212, for example, conforming to an IEEE wireless communication protocol such as the IEEE 802.11ac, 802.11ax, 802.11be or later wireless communication protocol standards.

L-STF 206 generally enables a receiving device to perform automatic gain control (AGC) and coarse timing and frequency estimation. L-LTF 208 generally enables a receiving device to perform fine timing and frequency estimation and also to perform an initial estimate of the wireless channel. L-SIG 210 generally enables a receiving device to determine a duration of the PDU and to use the determined duration to avoid transmitting on top of the PDU. For example, L-STF 206, L-LTF 208 and L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2 also shows an example L-SIG 210 in the PDU 200. L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figures 3A, 3B:
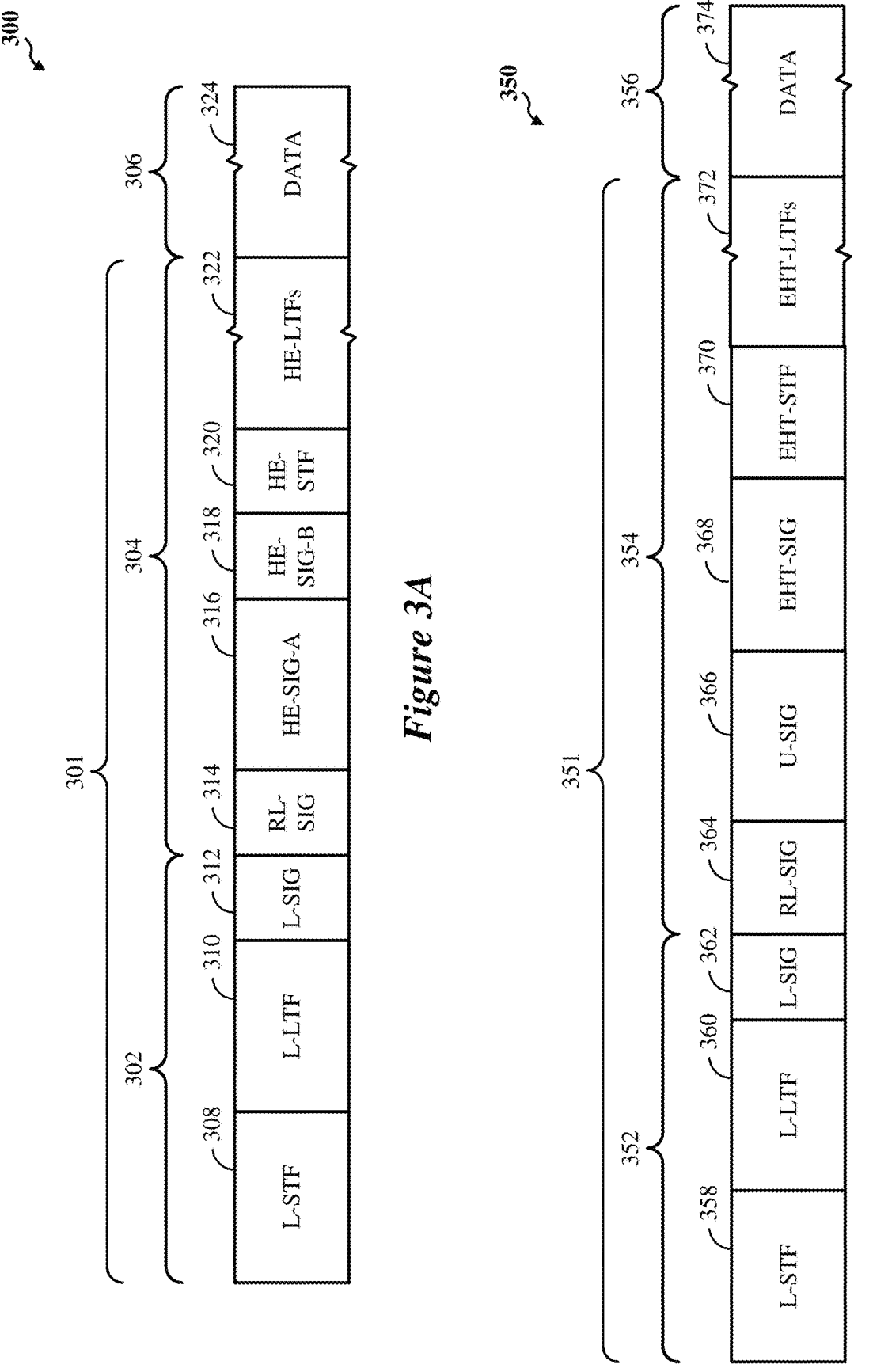
FIG. 3A shows an example PDU usable for communications between an AP and one or more STAs.
FIG. 3B shows another example PDU usable for communications between an AP and one or more STAs.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

In the IEEE 802.11be amendment to the IEEE 802.11 family of standards (or in future amendments), new fields may be used to carry signaling information. For example, the new fields and signaling information may be included in U-SIG 366. Additionally, new fields and signaling information may be included in EHT-SIG 368. If additional training signals are sent on other tones prior to U-SIG (such as additional training signals in L-SIG and RL-SIG in 11ax), each symbol in U-SIG may carry more usable data for feature signaling rather than training signals. In some implementations, U-SIG 366 includes two symbols, which may be jointly encoded together in a single block, and which may each carry twenty-six usable data (or "information") bits. For example, the bits in U-SIG 366 may include signaling regarding types or formats of additional signal fields (such as the EHT-SIG 368) that follows the U-SIG 366. EHT-SIG 368 may have a clear symbol boundary. In some implementations, a fixed MCS may be used for EHT-SIG 368. In some implementations, the MCS and DCM for EHT-SIG 368 may be indicated in U-SIG 366.

Figure 4:
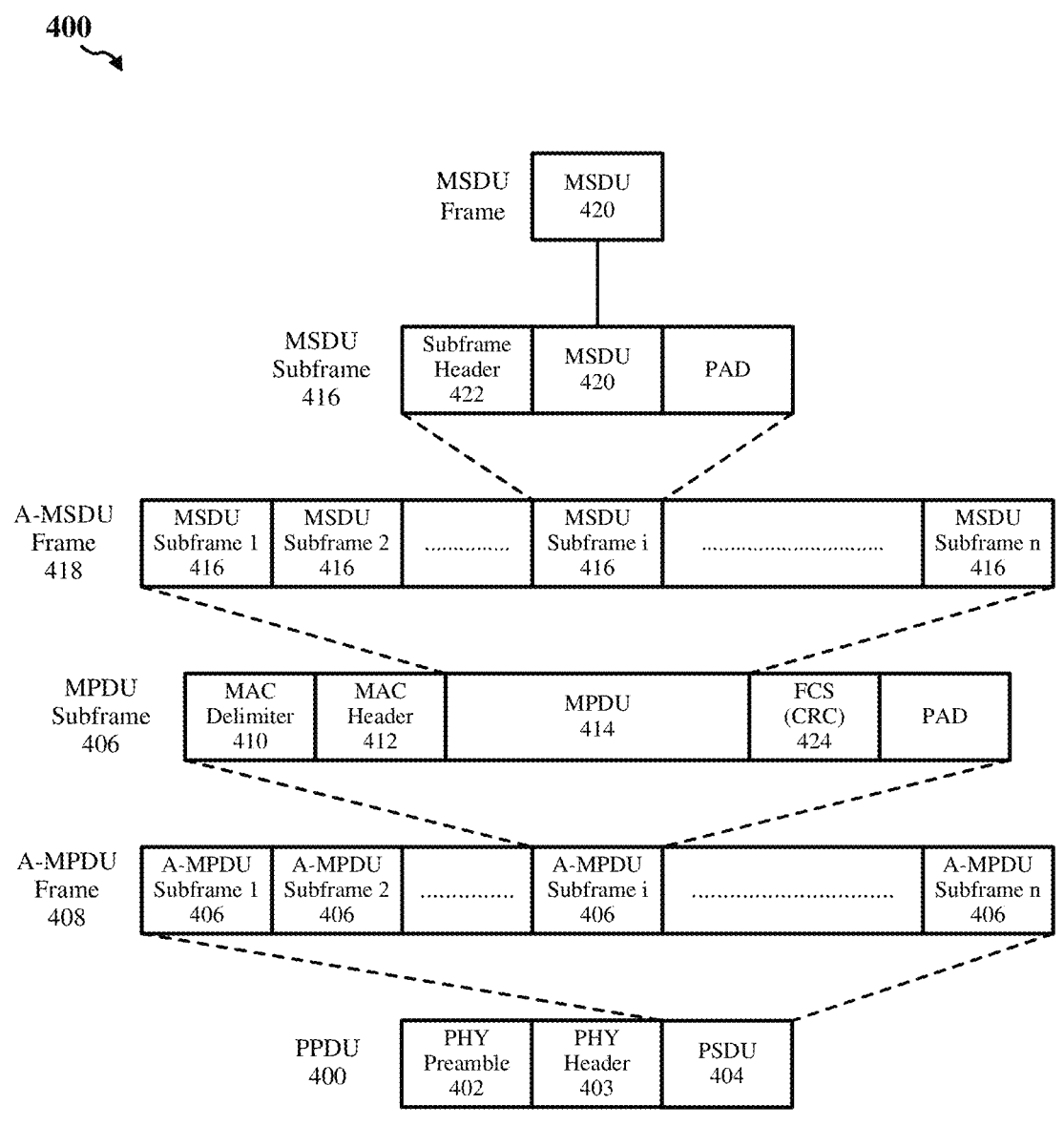
FIG. 4 shows an example physical layer convergence protocol (PLCP) protocol data unit (PPDU) usable for communications between an AP and one or more STAs.

FIG. 4 shows an example PPDU 400 usable for communications between an AP 102 and each of a number of STAs 104. As described above, each PPDU 400 includes a PHY preamble 402, a PHY header 403, and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which includes the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 may also include a frame check sequence (FCS) field 424 for error detection. For example, the FCS field 424 may include a cyclic redundancy check (CRC).

The PHY header 403 includes a service field 430, among other fields not shown for simplicity. The service field 430 may store a set of scrambling initialization bits that can be used to seed a scrambler of a wireless communication device (not shown for simplicity). In some implementations, the service field 430 may include 16 bits denoted as bits 0-15, where the first 7 bits (bits 0-6) may be used to store the set of scrambling initialization bits, and the remaining 9 bits (bits 7-15) may be reserved. In some instances, bits 0-6 of the service field 430, which are transmitted first, are set to Os and are used to synchronize the descrambler in the receiver.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5A:
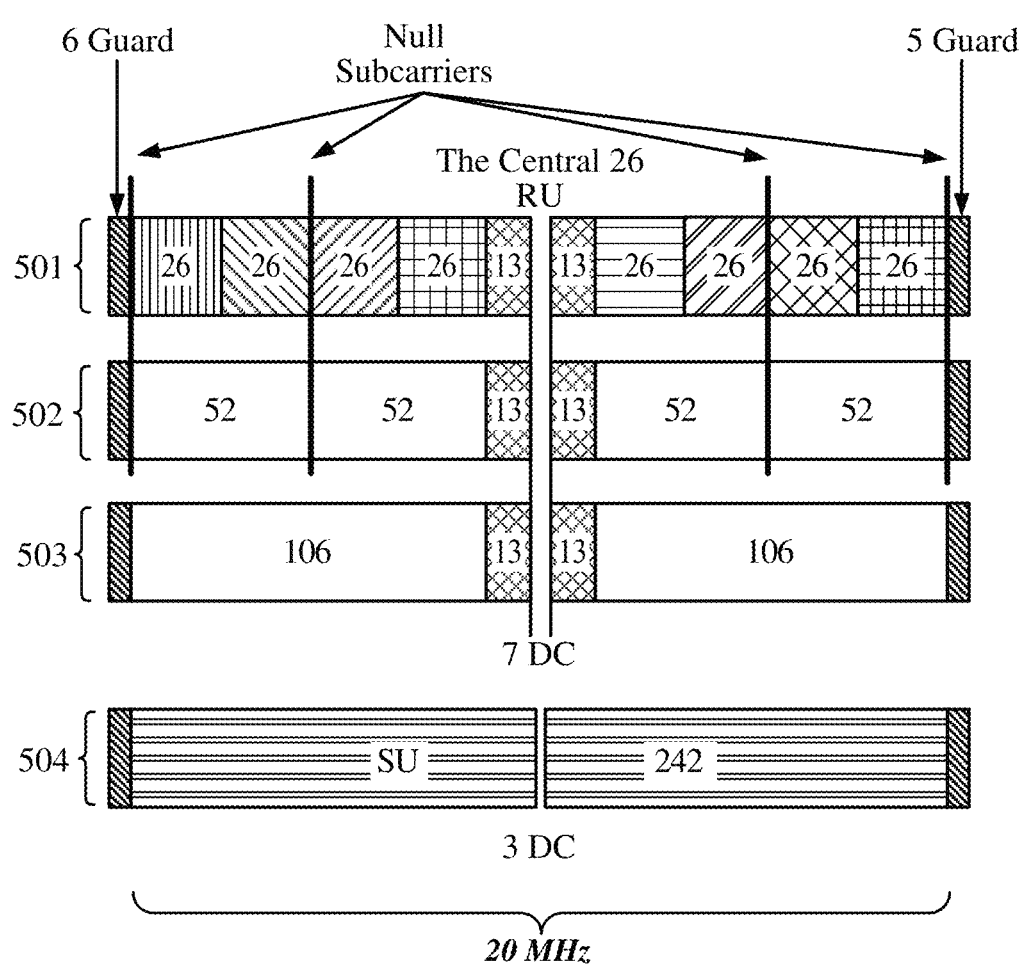
FIG. 5A shows an example tone map for a 20 MHz bandwidth.

FIG. 5A shows an example tone map 500 for a 20 MHz bandwidth. The MHz bandwidth may be divided into different numbers of RUs based on the size of the RUs. As shown, the tone map 500 includes four tone plans: a first tone plan 501 includes RUs that span 26 tones, a second tone plan 502 includes RUs that span 52 tones, a third tone plan 503 includes RUs that span 106 tones, and a fourth tone plan 504 includes an RU that spans 242 tones. Specifically, the first tone plan 501 includes eight RUs each spanning 26 tones, the second tone plan 502 includes four RUs each spanning 52 tones, the third tone plan 503 includes two RUs each spanning 106 tones, and the fourth tone plan 504 includes one RU spanning 242 tones (with the left half of the channel for single-user (SU) operations). Each 26-tone RU may include 24 data subcarriers and 2 pilot subcarriers, each 52-tone RU may include 48 data subcarriers and 4 pilot subcarriers, each 106-tone RU may include 102 data subcarriers and 4 pilot subcarriers, and the 242-tone RU may include 234 data subcarriers and 8 pilot subcarriers.

Figure 5B:
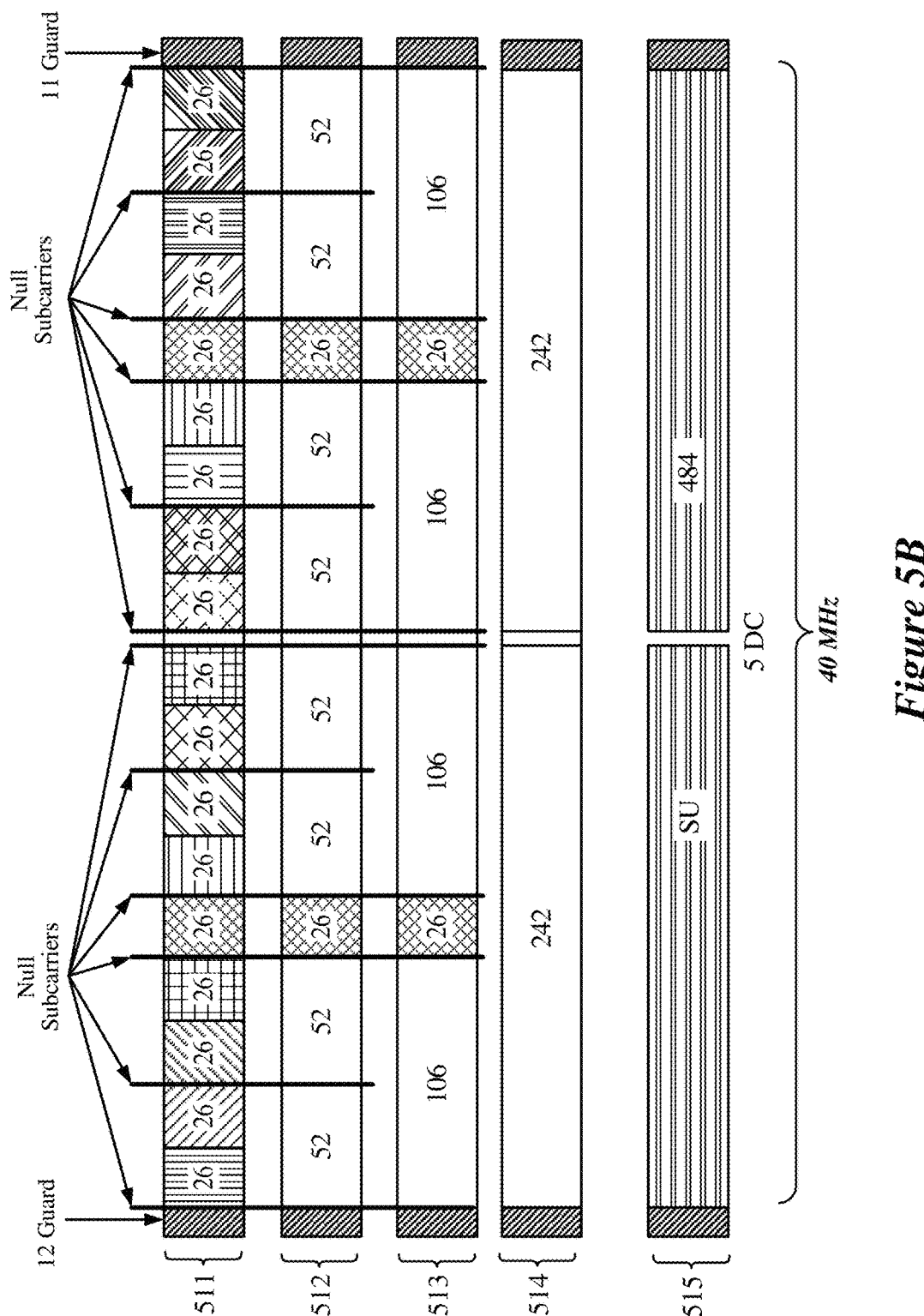
FIG. 5B shows an example tone map for a 40 MHz bandwidth.

FIG. 5B shows an example tone map 510 for a 40 MHz bandwidth. The MHz bandwidth may be divided into different numbers of RUs based on the size of the RUs. As shown, the tone map 510 includes five tone plans: a first tone plan 511 includes RUs that span 26 tones, a second tone plan 512 includes RUs that span 52 tones, a third plan 513 includes RUs that span 106 tones, a fourth tone plan 514 includes RUs that span 242 tones, and a fifth tone plan 515 includes an RU that spans 484 tones. Specifically, the first tone plan 511 includes eighteen RUs each spanning 26 tones, the second tone plan 512 includes eight RUs each spanning 52 tones, the third tone plan 513 includes four RUs each spanning 106 tones, the fourth tone plan 514 includes two RUs each spanning 242 tones, and the fifth tone plan 515 includes one RU spanning 484 tones (with the left half of the channel for SU operations). Each 26-tone RU may include 24 data subcarriers and 2 pilot subcarriers, each 52-tone RU may include 48 data subcarriers and 4 pilot subcarriers, each 106-tone RU may include 102 data subcarriers and 4 pilot subcarriers, each 242-tone RU may include 234 data subcarriers and 8 pilot subcarriers, and the 484-tone RU may include 468 data subcarriers and 16 pilot subcarriers.

Figure 5C:
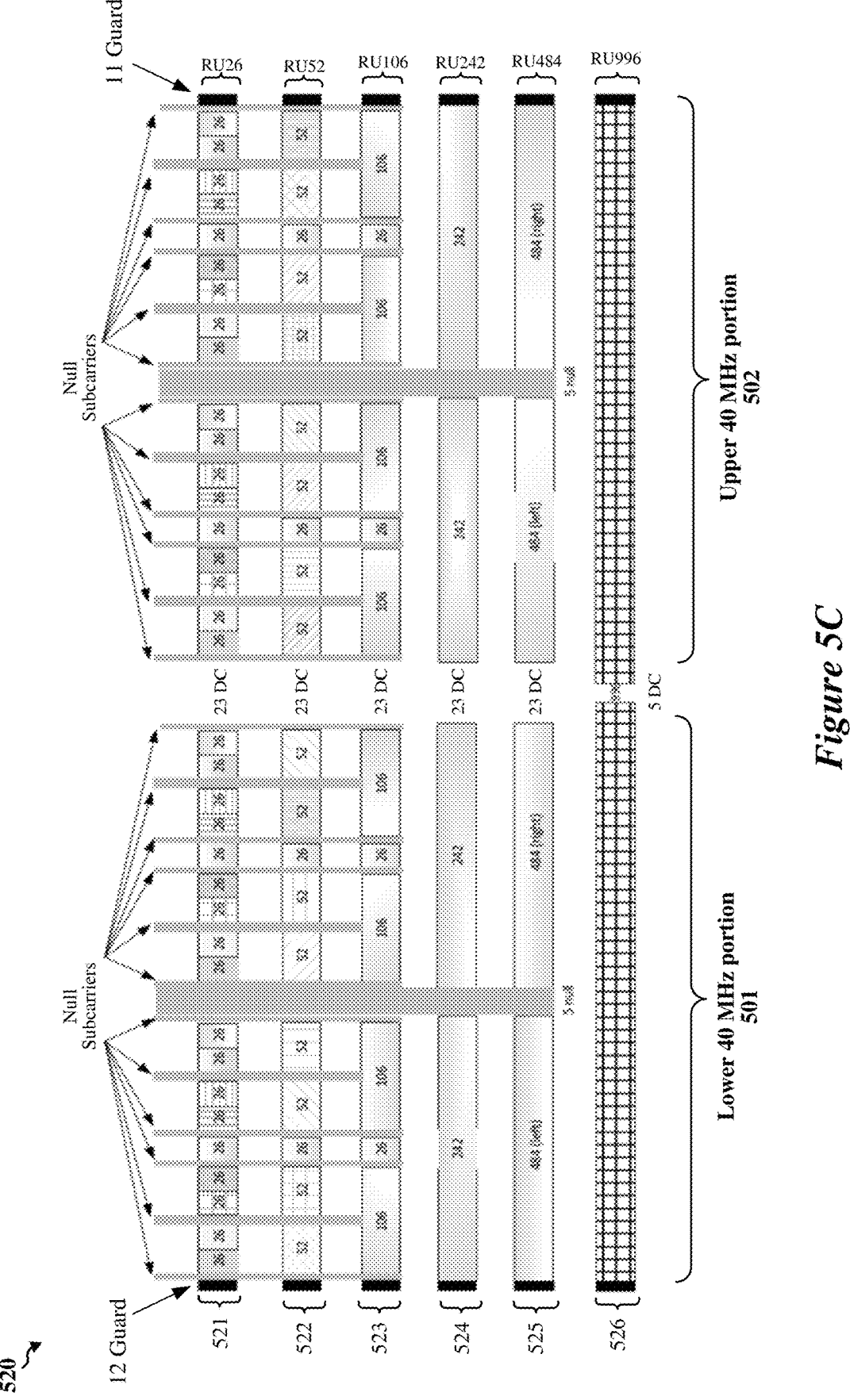
FIG. 5C shows an example tone map for an 80 MHz bandwidth.

FIG. 5C shows an example tone map 520 for an 80 MHz bandwidth. The 80 MHz bandwidth may be divided into different numbers of RUs based on the size of the RUs. As shown, the tone map 520 includes six tone plans: a first tone plan 521 includes RUs that span 26 tones, a second tone plan 522 includes RUs that span 52 tones, a third plan 523 includes RUs that span 106 tones, a fourth tone plan 524 includes RUs that span 242 tones, a fifth tone plan 525 includes RUs that span 484 tones, and a sixth tone plan 526 includes an RU that spans 996 tones. The first tone plan 521 includes thirty-six RUs each spanning 26 tones, the second tone plan 522 includes eighteen RUs each spanning 52 tones, the third tone plan 523 includes eight RUs each spanning 106 tones, the fourth tone plan 524 includes four RUs each spanning 242 tones, the fifth tone plan 525 includes two RUs each spanning 484 tones, and the sixth tone plan 526 includes one RU spanning 996 tones (with the left half of the channel for SU operations). Each 26-tone RU includes 24 data subcarriers and 2 pilot subcarriers, each 52-tone RU includes 48 data subcarriers and 4 pilot subcarriers, each 106-tone RU includes 102 data subcarriers and 4 pilot subcarriers, each 242-tone RU includes 234 data subcarriers and 8 pilot subcarriers, each 484-tone RU includes 468 data subcarriers and 16 pilot subcarriers, and the 996-tone RU includes 980 data subcarriers and 16 pilot subcarriers.

Each of the tone plans 521-526 is divided into a lower 40 MHz portion 501 and an upper 40 MHz portion 502. The lower 40 MHz portion 501 and the upper MHz portion 502 of each of the tone plans 521-525 are separated by 23 DC tones, and the lower 40 MHz portion 501 and the upper 40 MHz portion 502 of the tone plan 526 are separated by 5 DC tones. Additionally, the lower 40 MHz portion 501 of each of the tone plans 521-525 is divided into first and second 20 MHz portions separated by null subcarriers, and the upper 40 MHz portion 502 of each of the tone plans 521-525 is divided into third and fourth 20 MHz portions separated by 5 null subcarriers.

Figure 6:
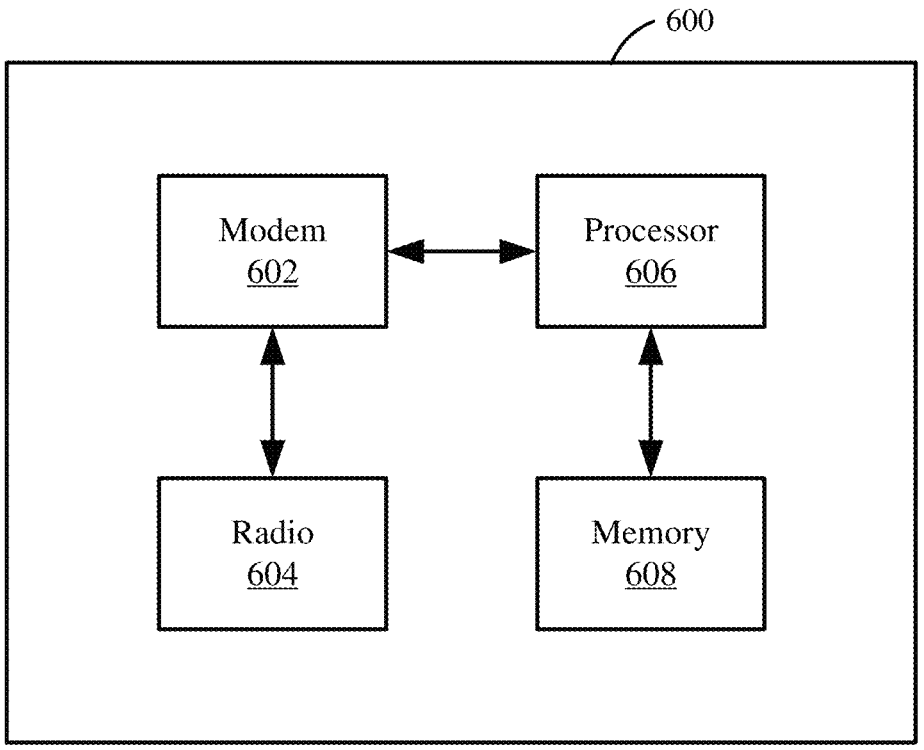
FIG. 6 shows a block diagram of an example wireless communication device.

FIG. 6 shows a block diagram of an example wireless communication device 600. In some implementations, the wireless communication device 600 can be an example of a device for use in a STA such as one of the STAs 104 described above with reference to FIG. 1. In some implementations, the wireless communication device 600 can be an example of a device for use in an AP such as the AP 102 described above with reference to FIG. 1. The wireless communication device 600 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 600 can be, or can include, a chip, system on chip (SoC), chipset, package or device that includes one or more modems 602, for example, a Wi-Fi (IEEE 802.11 compliant) modem. In some implementations, the one or more modems 602 (collectively "the modem 602") additionally include a WWAN modem (for example, a 3GPP 4G LTE or 5G compliant modem). In some implementations, the wireless communication device 600 also includes one or more radios 604 (collectively "the radio 604"). In some implementations, the wireless communication device 600 further includes one or more processors, processing blocks or processing elements (collectively "the processor 606") and one or more memory blocks or elements 608 (collectively "the memory 608").

The modem 602 can include an intelligent hardware block or device such as, for example, an application-specific integrated circuit (ASIC) among other possibilities. The modem 602 is generally configured to implement a PHY layer. For example, the modem 602 is configured to modulate packets and to output the modulated packets to the radio 604 for transmission over the wireless medium. The modem 602 is similarly configured to obtain modulated packets received by the radio 604 and to demodulate the packets to provide demodulated packets. In addition to a modulator and a demodulator, the modem 602 may further include digital signal processing (DSP) circuitry, automatic gain control (AGC), a coder, a decoder, a multiplexer and a demultiplexer. For example, while in a transmission mode, data obtained from the processor 606 is provided to a coder, which encodes the data to provide encoded bits. The encoded bits are mapped to points in a modulation constellation (using a selected MCS) to provide modulated symbols. The modulated symbols may be mapped to a number Nss of spatial streams or a number NsTs of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 604. In implementations involving beamforming, the modulated symbols in the respective spatial streams are precoded via a steering matrix prior to their provision to the IFFT block.

While in a reception mode, digital signals received from the radio 604 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 606) for processing, evaluation or interpretation.

The radio 604 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 600 can include, or be coupled with, multiple transmit antennas (each with a corresponding transmit chain) and multiple receive antennas (each with a corresponding receive chain). The symbols output from the modem 602 are provided to the radio 604, which transmits the symbols via the coupled antennas. Similarly, symbols received via the antennas are obtained by the radio 604, which provides the symbols to the modem 602.

The processor 606 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 606 processes information received through the radio 604 and the modem 602, and processes information to be output through the modem 602 and the radio 604 for transmission through the wireless medium. For example, the processor 606 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 606 may generally control the modem 602 to cause the modem to perform various operations described above.

The memory 608 can include tangible storage media such as random-access memory (RAM) or read-only memory (ROM), or combinations thereof. The memory 608 also can store non-transitory processor- or computer-executable software (SW) code containing instructions that, when executed by the processor 606, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 7B:
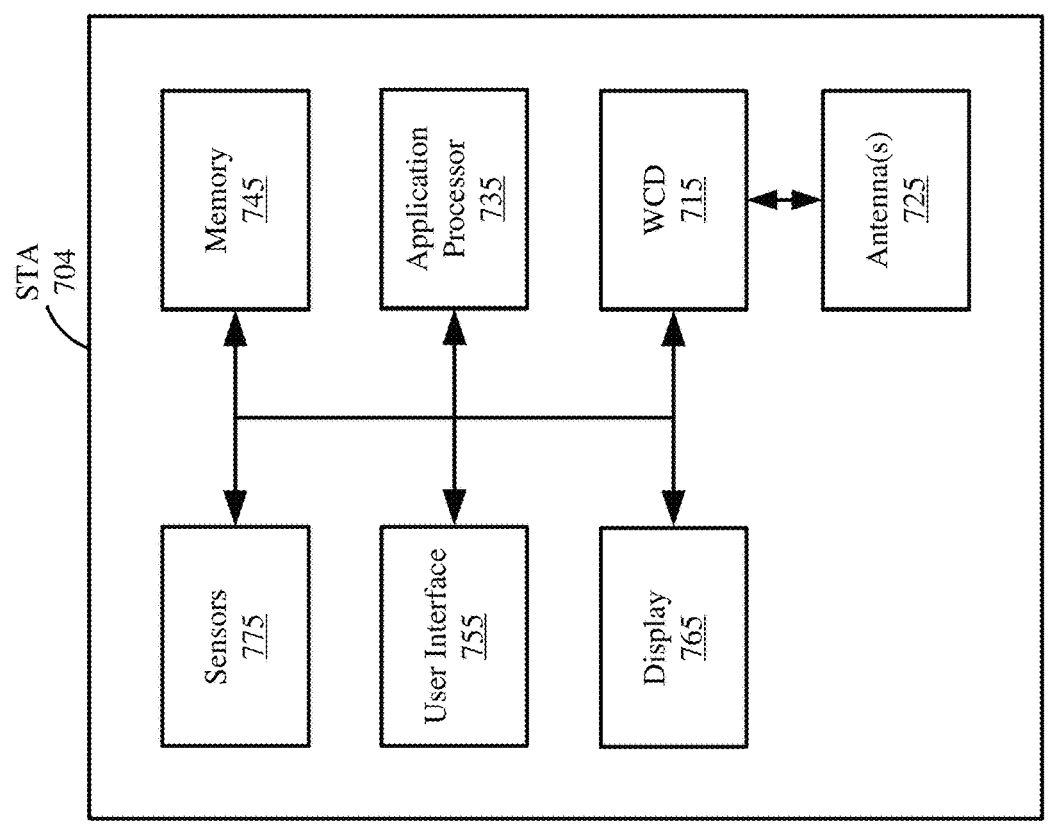
FIG. 7B shows a block diagram of an example STA.
Figure 7A:
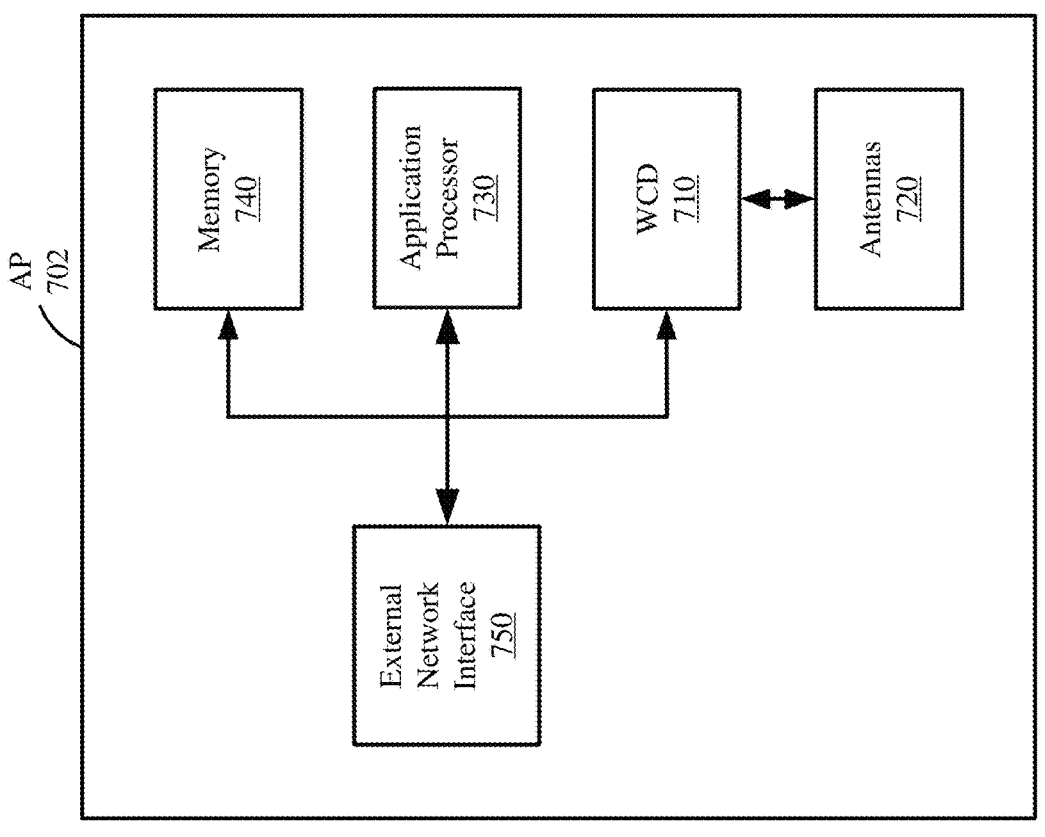
FIG. 7A shows a block diagram of an example AP.

FIG. 7A shows a block diagram of an example AP 702. For example, the AP 702 can be an example implementation of the AP 102 described with reference to FIG. 1. The AP 702 includes a wireless communication device (WCD) 710. For example, the wireless communication device 710 may be an example implementation of the wireless communication device 600 described with reference to FIG. 6. The AP 702 also includes multiple antennas 720 coupled with the wireless communication device 710 to transmit and receive wireless communications. In some implementations, the AP 702 additionally includes an application processor 730 coupled with the wireless communication device 710, and a memory 740 coupled with the application processor 730. The AP 702 further includes at least one external network interface 750 that enables the AP 702 to communicate with a core network or backhaul network to gain access to external networks including the Internet. For example, the external network interface 750 may include one or both of a wired (for example, Ethernet) network interface and a wireless network interface (such as a WWAN interface). Ones of the aforementioned components can communicate with other ones of the components directly or indirectly, over at least one bus. The AP 702 further includes a housing that encompasses the wireless communication device 710, the application processor 730, the memory 740, and at least portions of the antennas 720 and external network interface 750.

FIG. 7B shows a block diagram of an example STA 704. For example, the STA 704 can be an example implementation of the STA 104 described with reference to FIG. 1. The STA 704 includes a wireless communication device 715. For example, the wireless communication device 715 may be an example implementation of the wireless communication device 600 described with reference to FIG. 6. The STA 704 also includes one or more antennas 725 coupled with the wireless communication device 715 to transmit and receive wireless communications. The STA 704 additionally includes an application processor 735 coupled with the wireless communication device 715, and a memory 745 coupled with the application processor 735. In some implementations, the STA 704 further includes a user interface (UI) 755 (such as a touchscreen or keypad) and a display 765, which may be integrated with the UI 755 to form a touchscreen display. In some implementations, the STA 704 may further include one or more sensors 775 such as, for example, one or more inertial sensors, accelerometers, temperature sensors, pressure sensors, or altitude sensors. Ones of the aforementioned components can communicate with other ones of the components directly or indirectly, over at least one bus. The STA 704 further includes a housing that encompasses the wireless communication device 715, the application processor 735, the memory 745, and at least portions of the antennas 725, UI 755, and display 765.

Figure 8:
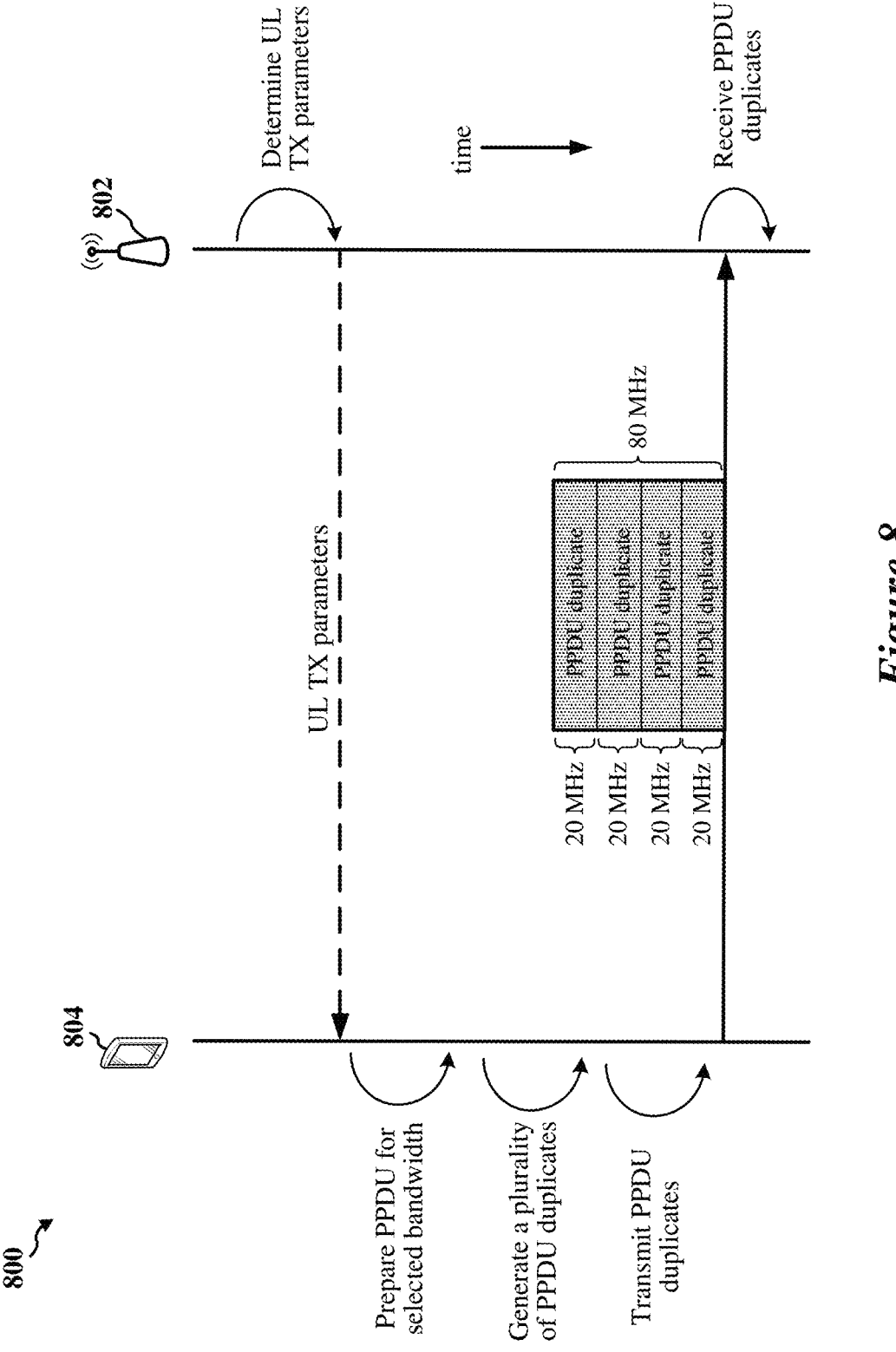
FIG. 8 shows a sequence diagram of an example communication that supports transmitting PPDU duplicates.

FIG. 8 shows a sequence diagram of an example communication 800 that supports transmitting PPDU duplicates. In some implementations, the communication 800 may be performed between an AP 802 and one or more STAs 804 (only one STA is shown in FIG. 8 for simplicity). The AP 802 may be an example of the AP 102 of FIG. 1 or the AP 702 of FIG. 7A, and the STA 804 may be an example of the STA 104 of FIG. 1 or the STA 704 of FIG. 7B. In some other implementations, the communication 800 may be performed by any suitable wireless communication devices.

In some implementations, the AP 802 may determine one or more UL transmission parameters, and may indicate the one or more UL transmission parameters to the STA 804 using any suitable frame (such as a control frame or a management frame). The STA 804 receives the indication of the one or more UL transmission parameters, and prepares a PPDU for transmission on a selected bandwidth.

The STA 804 generates a plurality of PPDU duplicates based on duplication of the PPDU, for example, such that each PPDU duplicate of the plurality of PPDU duplicates is prepared for transmission across the selected bandwidth. In some instances, each PPDU duplicate may be based on duplication of an entirety of the PPDU except for any universal signal field (U-SIG). In some implementations, a number N of the PPDU duplicates generated by duplicating the PPDU may be based at least in part on a power spectral density (PSD) limit applicable to a combined frequency bandwidth of the plurality of different frequency subbands, where N is an integer greater than one. In the example of FIG. 8, the STA 804 generates N=4 PPDU duplicates, and each of the PPDU duplicates is formatted for a 20 MHz bandwidth.

The STA 804 transmits each PPDU duplicate of the plurality of PPDU duplicates on a corresponding frequency subband of a plurality of different frequency subbands. As shown, each PPDU duplicate is transmitted on a 20 MHz frequency subband, and the resulting PPDU transmission spans an 80 MHz bandwidth. The AP 802 receives the PPDU duplicates spanning the 80 MHz bandwidth.

As discussed, the number N of PPDU duplicates generated by the STA 804 may be based at least in part on a PSD limit applicable to a combined frequency bandwidth occupied by the number N of PPDU duplicates. In some instances, the combined frequency bandwidth may be N times greater than the selected bandwidth upon which a respective PPDU duplicate is transmitted. In the example of FIG. 8, the applicable PSD limit is based on the combined frequency bandwidth of 80 MHz, rather than the 20 MHz bandwidth of each PPDU duplicate, thereby increasing the maximum allowed transmit power of the STA 804 by approximately four times.

Although not shown in FIG. 8 for simplicity, the PPDU may include a physical layer preamble containing a pre-HE or pre-EHT modulated portion and a HE or EHT modulated portion. The PPDU also may include one or more data fields. In some implementations, the STA 804 may duplicate the pre-HE or pre-EHT modulated portion of the preamble, the HE or EHT modulated portion of the preamble, and the one or more data fields according to a same duplicate format. In the example of FIG. 8, the pre-HE or pre-EHT modulated preamble portion, the HE or EHT modulated preamble portion, and the one or more data fields each span 20 MHz, and are each duplicated N=4 times to span a larger frequency bandwidth of 80 MHz.

In some other implementations, the STA 804 may duplicate the pre-HE or pre-EHT modulated portion of the preamble according to a first duplicate format, and may duplicate the HE or EHT modulated portion of the preamble and the one or more data fields according to a second duplicate format that is different than the first duplicate format. For example, in some instances, the pre-HE or pre-EHT modulated preamble portion may span 20 MHz and may be duplicated 4 times to span a larger frequency bandwidth of 80 MHz, and the HE or EHT modulated preamble portion and the one or more data fields may each span 40 MHz and may be duplicated 2 times to span the larger frequency bandwidth of 80 MHz.

For another example, the selected bandwidth may be 20 MHz, duplicating the PPDU may generate eight PPDU duplicates, and the eight PPDU duplicates may be transmitted on different 20 MHz frequency subbands of a contiguous 160 MHz wireless channel or a non-contiguous 80+80 MHz wireless channel. For another example, the selected bandwidth may be 40 MHz, duplicating the PPDU may generate two PPDU duplicates, and the two PPDU duplicates may be transmitted on different 40 MHz frequency subbands of an 80 MHz wireless channel. For another example, the selected bandwidth may be 40 MHz, duplicating the PPDU may generate four PPDU duplicates, and the four PPDU duplicates may be transmitted on different 40 MHz frequency subbands of a contiguous 160 MHz wireless channel or a non-contiguous 80+80 MHz wireless channel. For another example, the selected bandwidth may be 80 MHz, duplicating the PPDU may generate two PPDU duplicates, and the two PPDU duplicates may be transmitted on different 80 MHz frequency subbands of a contiguous 160 MHz wireless channel or a non-contiguous 80+80 MHz wireless channel. For another example, the selected bandwidth may be 80 MHz, duplicating the PPDU may generate four PPDU duplicates, and the four PPDU duplicates may be transmitted on different 80 MHz frequency subbands of a contiguous 320 MHz wireless channel or a non-contiguous 160+160 MHz wireless channel. Other configurations are possible.

In some implementations, the PPDU may be one of a high-efficiency (HE) format, an extremely high throughput (EHT) format, or a single-user (SU) extended range (ER) PPDU format. U-SIG and EHT-SIG also may be duplicated in the time domain, for example, in a manner similar to the time domain duplication of HE-SIG-A for HE ER SU PPDUs. In some instances, the STA 804 may generate the PPDU duplicates by duplicating a pre-HE or pre-EHT modulated portion of the preamble in each of a plurality of 20 MHz frequency subbands, and duplicating a HE or EHT modulated portion of the preamble and one or more data portions in each of a plurality of 40 MHz frequency subbands, 80 MHz frequency subbands, or 160 MHz frequency subbands.

The pre-HE or pre-EHT modulated portion of the preamble may include L-STF, L-LTF, L-SIG, RL-SIG, HE-SIG-A, and U-SIG (and possibly HE-SIG-B in pre-HE modulated portions, and EHT-SIG in pre-EHT modulated portions). The HE or EHT modulated portion of the preamble may include a number of HE or EHT signal fields and a number of HE or EHT training fields (such as HE-STF, HE-LTF, EHT-STF, EHT-LTF, and one or more data fields). In some implementations, a signal field of each PPDU duplicate may be used to indicate a presence of the PPDU duplicates, to indicate a frequency bandwidth of the PPDU duplicate, to indicate an entire bandwidth across which the plurality of PPDU duplicates are transmitted, or any combination thereof. In some instances, the PPDU may be a HE PPDU, and the signal field may be one of a HE-SIG-A field or a HE-SIG-B field. In some other instances, the PPDU may be an EHT PPDU, and the signal field may be a EHT-SIG field or a U-SIG field.

Figure 9A:
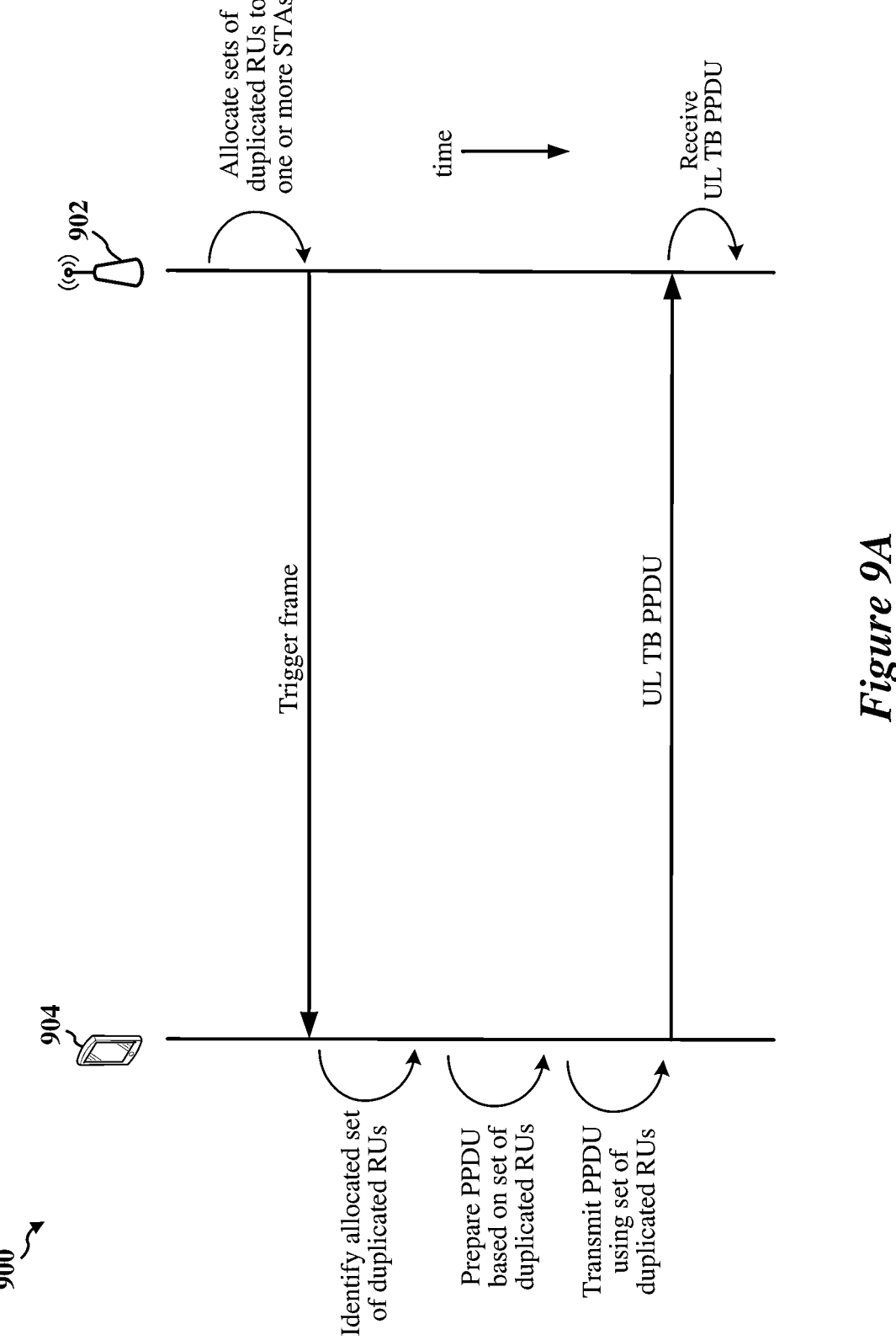
FIG. 9A shows a sequence diagram of an example communication that supports transmitting a PPDU using duplicated resource units (RUs).

FIG. 9A shows a sequence diagram of an example communication 900 that supports transmitting a PPDU using duplicated RUs. In some implementations, the communication 900 may be performed between an AP 902 and one or more STAs 904 (only one STA is shown in FIG. 9A for simplicity). The AP 902 may be an example of the AP 102 of FIG. 1 or the AP 702 of FIG. 7A, and the STA 904 may be an example of the STA 104 of FIG. 1 or the STA 704 of FIG. 7B. In some other implementations, the communication 900 may be performed by any suitable wireless communication devices.

In some implementations, the AP 902 may allocate sets of duplicated RUs to a number of different STAs for UL transmissions. The AP 902 may transmit a trigger frame to solicit UL transmissions from a number of STAs identified by the trigger frame. In some aspects, the trigger frame may allocate a set of duplicated RUs to each of the STAs identified by the trigger frame.

The STA 904 may receive the trigger frame, and may identify the set of duplicated RUs allocated by the trigger frame, or select the set of duplicated RUs allocated by the trigger frame. The STA 904 may prepare a PPDU for transmission based on the duplicated RUs, and transmit the PPDU using the set of duplicated RUs allocated by the trigger frame. The AP 902 may receive the PPDU, which in some implementations may be transmitted as an UL TB PPDU.

The PSD limit applicable to the communication 900 may be based on a frequency bandwidth spanned by the allocated set of duplicated RUs, and the spanned frequency bandwidth may be at least twice the frequency bandwidth of a respective duplicated RU. In some aspects, each RU included in the allocated set of duplicated RUs may include a same number of tones. In some other instances, one or more RUs included in the allocated set of duplicated RUs may include at least one non-contiguous tone.

Figure 9B:
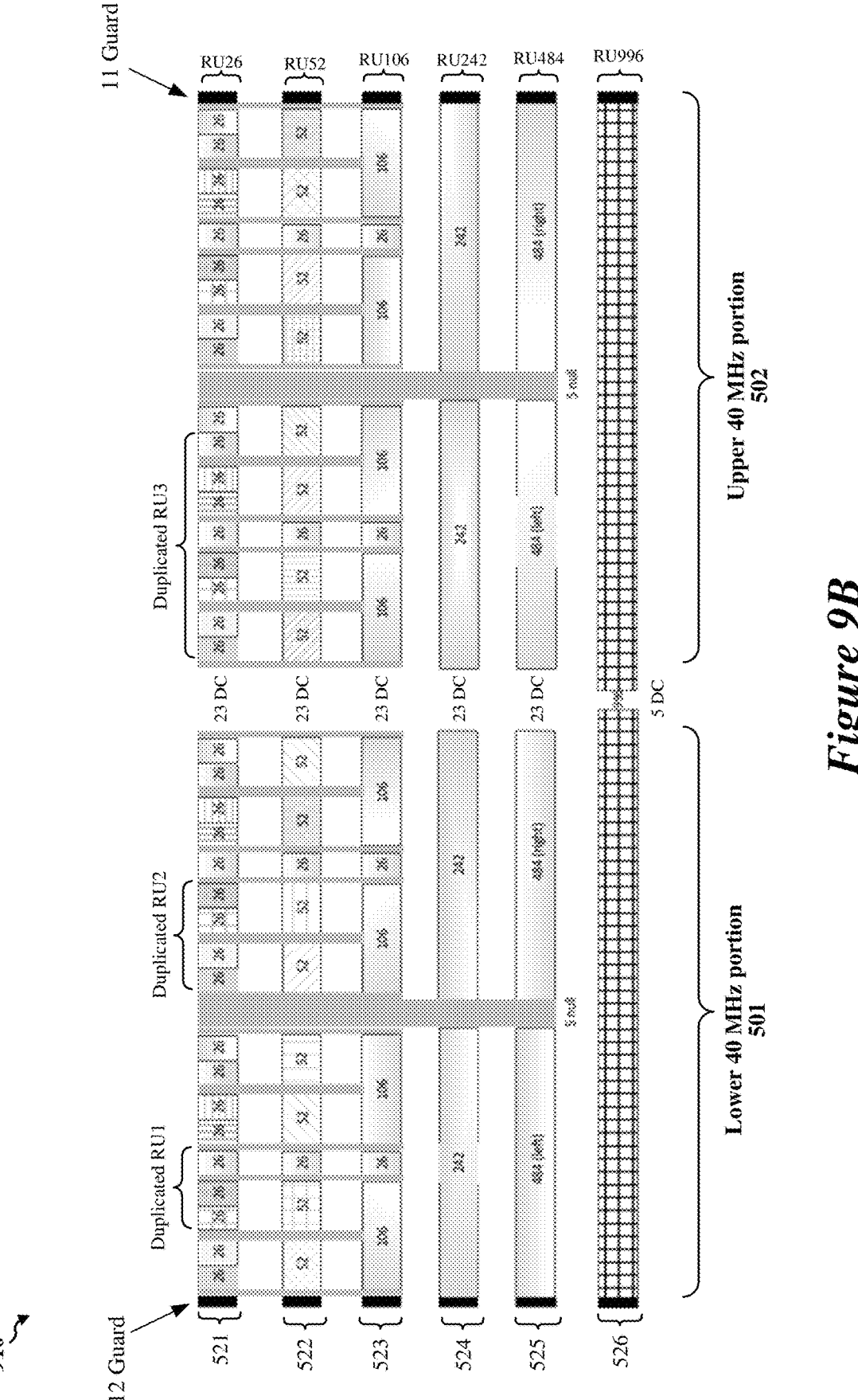
FIG. 9B shows an example RU duplication.

FIG. 9B shows an example resource unit (RU) duplication 910. The RU duplication 910 may include a first duplicated resource unit (RU1), a second duplicated resource unit (RU2), and a third duplicated resource unit (RU3). The first duplicated resource unit RU1 may be based on duplicating a 26-tone RU (RU26) two times such that the resulting duplicated resource unit RU1 spans three adjacent RU26s, which may increase the frequency bandwidth used to transmit a PPDU by three times (as compared with transmitting the PPDU using a single RU26), and therefore increase the allowable transmit power by three times. The second duplicated resource unit RU2 may be based on duplicating a 52-tone RU (RU52) once such that the resulting duplicated resource unit RU2 spans two adjacent RU52s, which may increase the frequency bandwidth used to transmit a PPDU by two times (as compared with transmitting the PPDU using a single RU52), and therefore increase the allowable transmit power by two times. The third duplicated resource unit RU3 may be based on duplicating a 26-tone RU (RU26) two times such that the resulting duplicated resource unit RU3 spans three non-adjacent RU26s, which may increase the frequency bandwidth used to transmit a PPDU by three times (as compared with transmitting the PPDU using a single RU26), and therefore increase the allowable transmit power by three times.

Figure 10A:
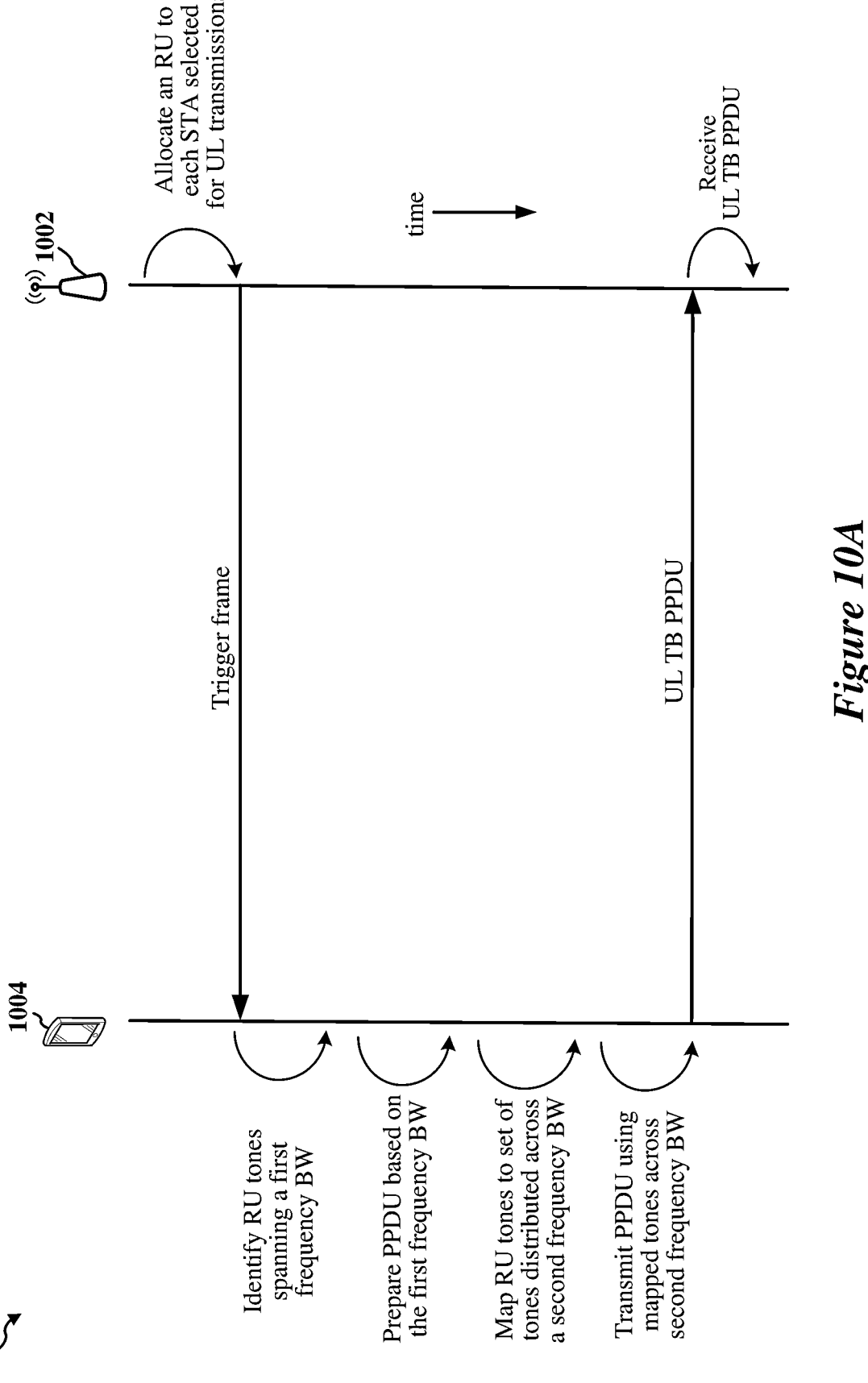
FIG. 10A shows a sequence diagram of an example communication that supports transmitting a PPDU using tone mapping.

FIG. 10A shows a sequence diagram of an example communication 1000 that supports transmitting a PPDU using tone mapping. In some implementations, the communication 1000 may be performed between an AP 1002 and one or more STAs 1004 (only one STA is shown in FIG. 10A for simplicity). The AP 1002 may be an example of the AP 102 of FIG. 1 or the AP 702 of FIG. 7A, and the STA 1004 may be an example of the STA 104 of FIG. 1 or the STA 704 of FIG. 7B. In some other implementations, the communication 1000 may be performed by any suitable wireless communication devices.

In some implementations, the AP 1002 may allocate a RU to each STA of a number of STAs selected for UL transmission. The AP 1002 may transmit a trigger frame to solicit UL transmissions from the STAs identified by the trigger frame. In some aspects, the trigger frame may allocate a RU including a set of contiguous tones spanning a first frequency bandwidth to the STA 1004 for UL transmissions.

The STA 1004 receives the trigger frame, and identifies the tones included in the allocated RU, or selects the tones included in the allocated RU. The STA 1004 prepares a PPDU for transmission based on the first frequency bandwidth associated with the allocated RU, and maps the set of contiguous tones of the allocated RU to a set of non-contiguous tones distributed across a second frequency bandwidth larger than the first frequency bandwidth. The STA 1004 transmits the PPDU using the second set of tones that span the second frequency bandwidth. The AP 1002 receives the PPDU, which in some implementations may be transmitted as an UL TB PPDU.

The PSD limit applicable to the communication 1000 may be based on the second frequency bandwidth, and the second frequency bandwidth may be at least an order of magnitude larger than the first frequency bandwidth. In some implementations, the set of contiguous tones of the allocated RU includes 26 tones spanning a 2 MHz frequency subband, includes 52 tones spanning a 4 MHz frequency subband, includes 106 tones spanning a 10 MHz frequency subband, or includes 242 tones spanning a 20 MHz frequency subband, and each tone of the set of non-contiguous tones is transmitted on a unique 1 MHz frequency subband. In some instances, a spacing between pairs of adjacent tones of the set of non-contiguous tones includes a number M of tones unallocated to the wireless communication device, where M is an integer greater than one. The number M of unallocated tones may be used for UL transmissions from one or more other STAs, concurrently with transmission of the UL TB PPDU from the STA 1004.

In some implementations, the STA 1004 may transmit a first portion of the PPDU using a first group of 26 tones of the set of non-contiguous tones, may transmit a second portion of the PPDU using a remaining 14 tones of the set of non-contiguous tones, where the first and second portions of the PPDU are transmitted concurrently. In some instances, the STA 1004 may transmit one or more subsequent PPDUs using the set of non-contiguous tones by repeatedly cycling through the tones of the set of non-contiguous tones. In some other implementations, the STA 1004 may transmit a first portion of the PPDU using a first group of 26 tones of the set of non-contiguous of tones, may transmit a second portion of the PPDU using a second group of 26 tones of the set of non-contiguous tones, may transmit a third portion of the PPDU using a third group of 26 tones of the set of non-contiguous tones, and may transmit a fourth portion of the PPDU using a remaining 2 tones of the set of non-contiguous tones, where the first, second, third, and fourth portions of the PPDU are transmitted concurrently, and are cyclic copies of each other. In some instances, the STA 1004 may transmit one or more subsequent PPDUs using the set of non-contiguous tones by repeatedly cycling through the tones of the set of non-contiguous tones.

In some other implementations, the set of contiguous tones of the allocated RU may include 26 tones spanning a 2 MHz frequency subband, and the set of non-contiguous tones may include 20 tones spanning a 20 MHz frequency subband. In some instances, the STA 1004 may map the set of contiguous tones to the set of non-contiguous tones by determining a spacing between adjacent tones of the set of non-contiguous tones, and distributing the tones of the set of non-contiguous tones across the second frequency bandwidth based on the determined spacing. The STA 1004 may determine the spacing by dividing the number of tones in the set of non-contiguous tones by the number of tones in the set of contiguous tones in the allocated RU, generating an integer quotient and a remainder based on the dividing, and selecting the integer quotient as the spacing.

Figure 10B:
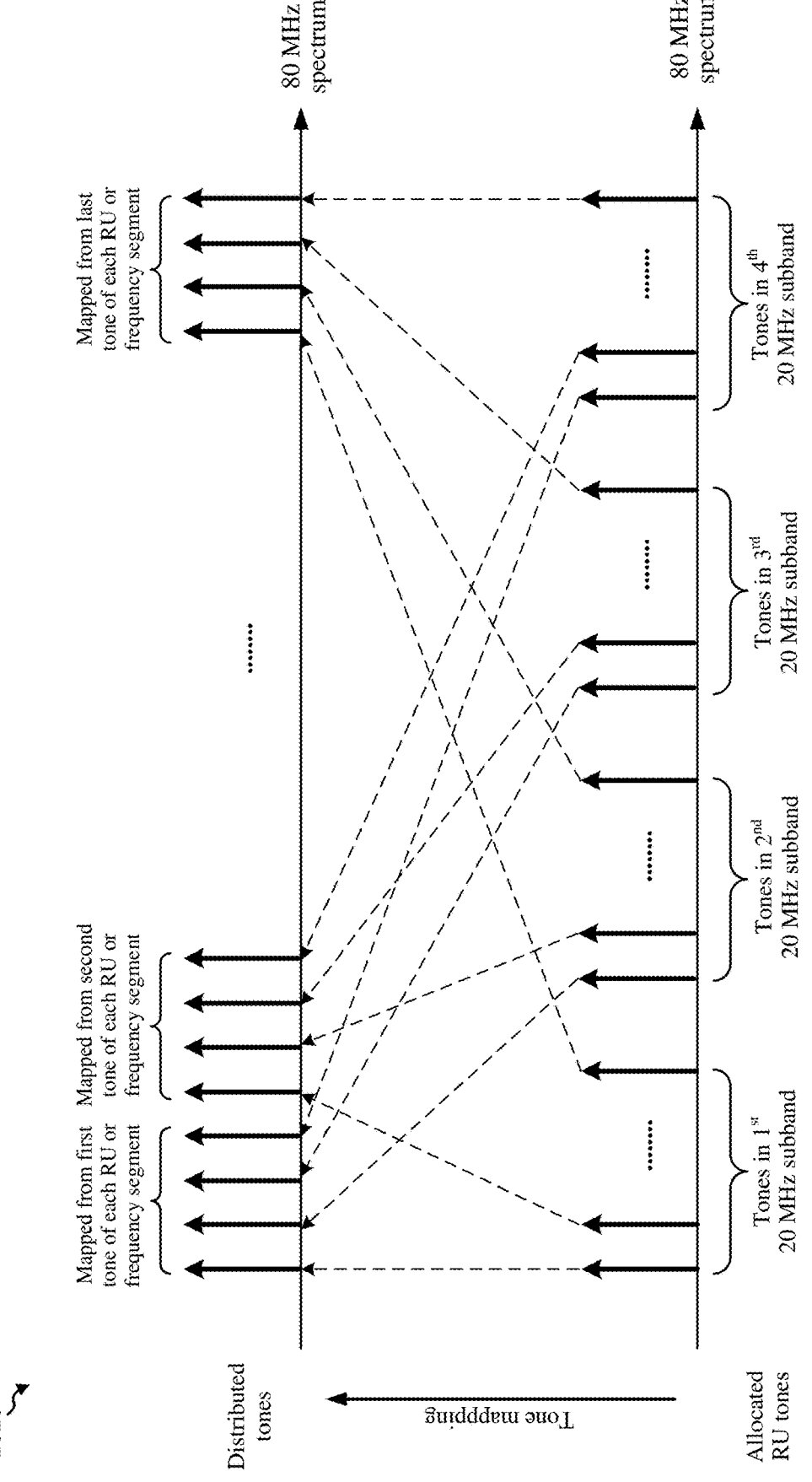
FIG. 10B shows an example mapping of tones.

FIG. 10B shows an example mapping 1010 of tones. As shown, the tones allocated to a user (or STA) by the trigger frame may be mapped to a second set of tones that are distributed across an 80 MHz frequency band. In some instances, the tones included in a respective RU of the allocated RUs (which may be referred to herein as the "existing tones") may be contiguous tones associated with one of the RU26, RU52, RU106, RU242, RU484, or RU996 resource units of a tone plan adopted by the IEEE 802.11ax standards. In some other instances, the tones included in a respective RU may be distributed across a 20 MHz frequency segment when the respective RU is one of the RU26, RU52, RU106 resource units of the tone plan. For example, during a resource allocation stage, each user (or STA) may be allocated a single RU or multi-RU for UL transmissions. When a user is allocated an RU or multi-RU smaller than RU242 (which spans a 20 MHz frequency subband), the user may use the contiguous tones of the allocated RU to transmit UL data, or may spread the contiguous tones of the allocated RU across a 20 MHz frequency subband and transmit UL data using the spread tones.

In some implementations, the existing tones allocated to a number of users are mapped to corresponding sets of interleaved tones distributed across a wider frequency bandwidth (such as wider than 20 MHz). As shown in the example of FIG. 10B, the existing tones are sequentially mapped, one at a time from each allocated RU (or 20 MHz frequency segment), to a corresponding tone in the second set of tones distributed across the 80 MHz frequency band. That is, the mapped tones occupy every $M^{th}$ tone of a tone plan associated with the wider frequency bandwidth, where M=N+1, and N indicates the number of other sets of non-contiguous tones. In this manner, the applicable PSD limit may be based on the wider frequency band spanned by the second sets of mapped tones, for example, rather than the frequency subband spanned by an allocated RU or a 20 MHz frequency segment.

In the example of FIG. 10B, the existing tones in the first 20 MHz frequency subband are mapped to the first tone, the fifth tone, the nineth tone, and so on, of the distributed sets of tones spanning an 80 MHz frequency band. The existing tones in the second 20 MHz frequency subband are mapped to the second tone, the sixth tone, the tenth tone, and so on, of the distributed sets of tones spanning the 80 MHz frequency band. The existing tones in the third 20 MHz frequency subband are mapped to the third tone, the seventh tone, the eleventh tone, and so on, of the distributed sets of tones spanning the 80 MHz frequency band. The existing tones in the fourth 20 MHz frequency subband are mapped to the fourth tone, the eighth tone, the twelfth tone, and so on, of the distributed sets of tones spanning the 80 MHz frequency band. In this manner, the applicable PSD limit and total transmit power may be based on the 80 MHz frequency band, for example, rather than on a 20 MHz frequency segment.

In some other implementations, the sets of non-contiguous tones mapped from allocated RUs or 20 MHz frequency segments may be distributed across other frequency bands such as, for example, a 20 MHz frequency band, a 40 MHz frequency band, a 160 MHz frequency band, or a 320 MHz frequency band. Also, implementations of the subject matter disclosed herein can be used with allocated RUs of other sizes such as, for example, RU52, RU106, RU242, RU484, or RU996.

Figure 10C:
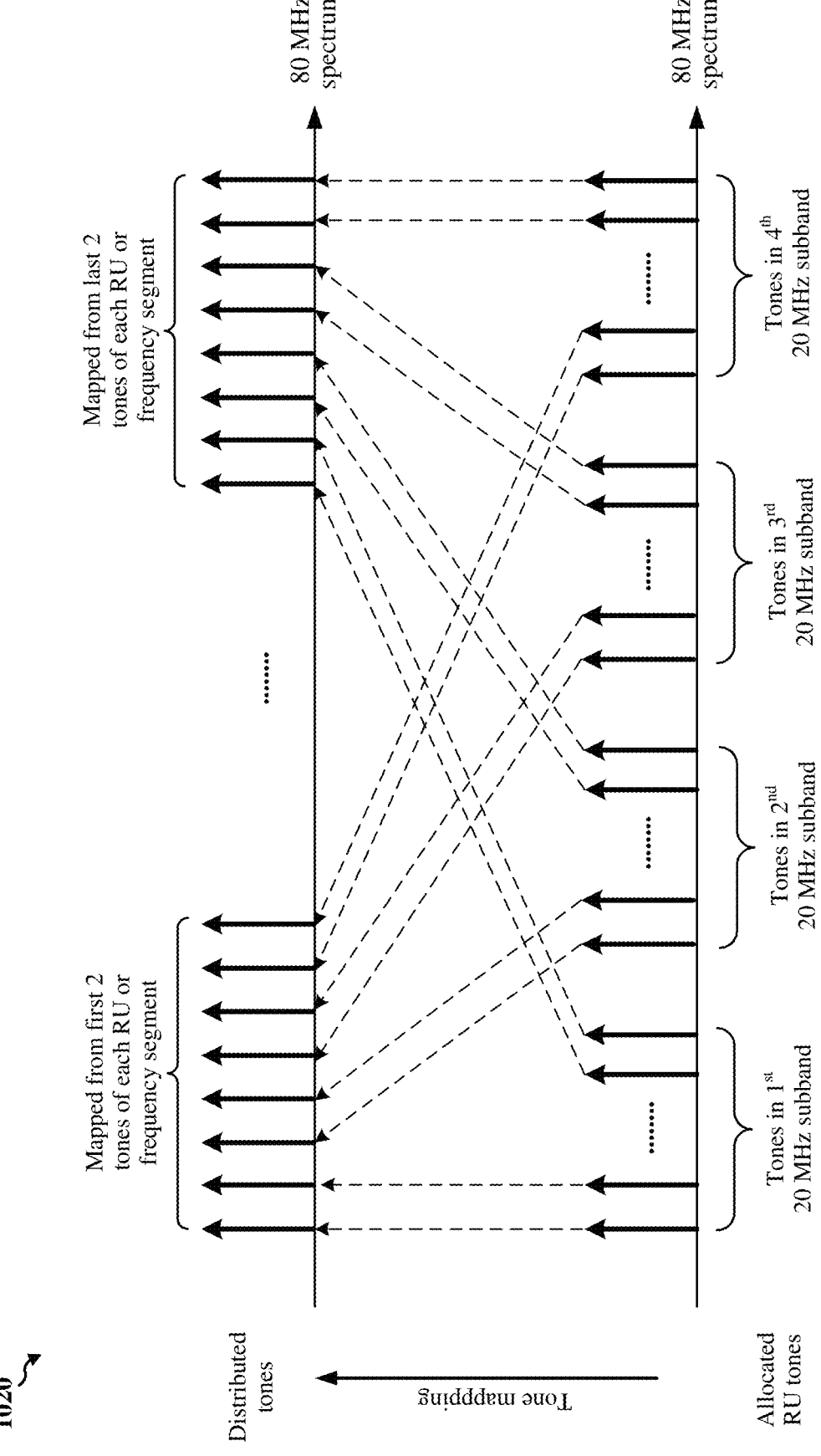
FIG. 10C shows an example mapping of tones.

FIG. 10C shows an example mapping 1020 of tones. As shown, the existing tones allocated by the trigger frame to each user may span a corresponding 20 MHz frequency subband, and may be mapped to a second set of tones that span an 80 MHz frequency band. In some implementations, the distributed tones mapped from the existing tones of each allocated RU (or each 20 MHz frequency segment) are interleaved with one another such that each of the second sets of distributed tones spans an entirety of the 80 MHz frequency band. In this manner, the applicable PSD limit and total transmit power may be based on the 80 MHz frequency band, for example, rather than on a 20 MHz frequency segment.

In the example of FIG. 10C, two tones are sequentially mapped from each allocated RU or frequency segment to a corresponding pair of tones in the second set of tones distributed across the 80 MHz frequency band. That is, the tones of the set of non-contiguous tones occupy every $M^{th}$ and $M+1^{th}$ tone of a tone plan associated with the second frequency bandwidth, where M=N+1, and N indicates the number of other sets of non-contiguous tones. In some other implementations, a group of more than two tones are sequentially mapped from each allocated RU or frequency segment to a corresponding group of more than two tones in the second set of tones distributed across the 80 MHz frequency band. In some other implementations, the sets of non-contiguous tones mapped from allocated RUs or 20 MHz frequency segments may be distributed across other frequency bands such as, for example, a 20 MHz frequency band, a 40 MHz frequency band, a 160 MHz frequency band, or a 320 MHz frequency band. Also, implementations of the subject matter disclosed herein can be used with allocated RUs of other sizes such as, for example, RU52, RU106, RU242, RU484, or RU996.

FIG. 11 shows a flowchart illustrating an example operation 1100 for wireless communication that supports transmitting PPDU duplicates. In some implementations, the operation 1100 may be performed by an apparatus of a wireless communication device operating as or within a STA, such as one of the STAs 104 of FIG. 1, the STA 704 of FIG. 7B, or the STA 804 of FIG. 8. In some other implementations, the operation 1100 may be performed by an apparatus of a wireless communication device operating as or within a network node.

At block 1102, the wireless communication device generates a plurality of PPDU duplicates configured for transmission over the selected bandwidth. At block 1104, the wireless communication device output each PPDU duplicate of the plurality of PPDU duplicates over a corresponding frequency subband of a plurality of different frequency subbands of a wireless channel. In some instances, each PPDU duplicate may be based on duplication of an entirety of the PPDU except for any universal signal field (U-SIG).

The PPDU may include a physical layer preamble containing a pre-EHT modulated portion and an EHT modulated portion. The PPDU also may include one or more data fields. In some implementations, generating the plurality of PPDU duplicates includes duplicating the pre-EHT modulated portion of the preamble, the EHT modulated portion of the preamble, and the one or more data fields according to a same duplicate format. In some other implementations, generating the plurality of PPDU duplicates includes duplicating the pre-EHT modulated portion of the preamble according to a first duplicate format, duplicating the EHT modulated portion of the preamble according to a second duplicate format, and duplicating the one or more data fields according to the second duplicate format, where the second duplicate format is different than the first duplicate format. In some instances, the first duplicate format may be associated with a first multiple of a frequency bandwidth, and the second duplicate format may be associated with a second multiple of the frequency bandwidth, where the second multiple is at least twice the first multiple.

In some implementations, a number N of generated PPDU duplicates may be based at least in part on a power spectral density (PSD) limit applicable to a combined frequency bandwidth of the plurality of different frequency subbands, where N is an integer greater than one. In some instances, the combined frequency bandwidth may be N times greater than the selected bandwidth upon which a respective PPDU duplicate is transmitted. In some other implementations, the plurality of different frequency subbands may include one or more unlicensed channels in a 6 GHz frequency spectrum, and the PSD limit applicable to the transmission may be based on a combined frequency bandwidth of the plurality of different frequency subbands.

FIG. 12A shows a flowchart illustrating an example operation 1200 for wireless communication that supports transmitting PPDU duplicates. In some implementations, the operation 1200 may be performed by an apparatus of a wireless communication device operating as or within a STA, such as one of the STAs 104 of FIG. 1, the STA 704 of FIG. 7B, or the STA 804 of FIG. 8. In some other implementations, the operation 1200 may be performed by an apparatus of a wireless communication device operating as or within a network node. In some instances, the operation 1200 is an example of generating the plurality of PPDU duplicates in block 1102 of the operation 1100 described with reference to FIG. 11. For example, at block 1202, the wireless communication device duplicates the pre-EHT modulated portion of the preamble, the EHT modulated portion of the preamble, and the one or more data fields according to a same duplicate format.

FIG. 12B shows a flowchart illustrating an example operation 1210 for wireless communication that supports transmitting PPDU duplicates. In some implementations, the operation 1210 may be performed by an apparatus of a wireless communication device operating as or within a STA, such as one of the STAs 104 of FIG. 1, the STA 704 of FIG. 7B, or the STA 804 of FIG. 8. In some other implementations, the operation 1210 may be performed by an apparatus of a wireless communication device operating as or within a network node. In some instances, the operation 1210 is an example of generating the plurality of PPDU duplicates in block 1102 of the operation 1100 described with reference to FIG. 11. For example, at block 1212, the wireless communication device duplicates the pre-EHT modulated portion of the preamble according to a first duplicate format. At block 1214, the wireless communication device duplicates the EHT modulated portion of the preamble according to a second duplicate format different than the first duplicate format. At block 1216, the wireless communication device duplicates the one or more data fields according to the second duplicate format. In some instances, the first duplicate format may be associated with a first multiple of frequency bandwidth, and the second duplicate format may be associated with a second multiple of the frequency bandwidth, where the second multiple is at least twice the first multiple.

In this manner, the pre-EHT modulated portion of the PPDU preamble may be duplicated for transmission on a first frequency bandwidth, and the EHT modulated portion of the PPDU preamble and the one or more data fields of the PPDU may be duplicated for transmission on a second frequency bandwidth larger than the first frequency bandwidth. For example, the pre-EHT modulated preamble portion may be duplicated in 20 MHz chunks, while the EHT modulated preamble portion and the one or more data fields may be duplicated in larger frequency chunks (such as 40 MHz chunks, 80 MHz chunks, or 160 MHz chunks).

FIG. 12C shows a flowchart illustrating an example operation 1220 for wireless communication that supports transmitting PPDU duplicates. In some implementations, the operation 1220 may be performed by an apparatus of a wireless communication device operating as or within a STA, such as one of the STAs 104 of FIG. 1, the STA 704 of FIG. 7B, or the STA 804 of FIG. 8. In some other implementations, the operation 1220 may be performed by an apparatus of a wireless communication device operating as or within a network node. In some instances, the operation 1220 is an example of generating the plurality of PPDU duplicates in block 1102 of the operation 1100 described with reference to FIG. 11. For example, at block 1222, the wireless communication device duplicates the pre-EHT modulated portion of the preamble in each of a plurality of 20 MHz frequency subbands. At block 1224, the wireless communication device duplicates the EHT modulated portion of the preamble in each of a plurality of 40 MHz frequency subbands, 80 MHz frequency subbands, or 160 MHz frequency subbands. At block 1224, the wireless communication device duplicates a data portion of the PPDU in each of the plurality of the 40 MHz frequency subbands, the 80 MHz frequency subbands, or the 160 MHz frequency subbands.

FIG. 12D shows a flowchart illustrating an example operation 1230 for wireless communication that supports transmitting PPDU duplicates. In some implementations, the operation 1230 may be performed by an apparatus of a wireless communication device operating as or within a STA, such as one of the STAs 104 of FIG. 1, the STA 704 of FIG. 7B, or the STA 804 of FIG. 8. In some other implementations, the operation 1230 may be performed by an apparatus of a wireless communication device operating as or within a network node. In some instances, the operation 1230 may be performed in conjunction with transmitting the plurality of PPDU duplicates in block 1104 of the operation 1100 described with reference to FIG. 11. For example, at block 1232, the wireless communication device repeats transmission of one or more data fields of the PPDU on each frequency subband of the plurality of different frequency subbands.

FIG. 13 shows a flowchart illustrating an example operation 1300 for wireless communication that supports RU duplication. In some implementations, the operation 1300 may be performed by an apparatus of a wireless communication device operating as or within a STA, such as one of the STAs 104 of FIG. 1, the STA 704 of FIG. 7B, or the STA 904 of FIG. 9A. In some other implementations, the operation 1300 may be performed by an apparatus of a wireless communication device operating as or within a network node.

At block 1302, the wireless communication device generates a physical layer convergence protocol (PLCP) protocol data unit (PPDU) for transmission based at least in part on the allocated set of duplicated RUs. At block 1304, the wireless communication device outputs the PPDU using the allocated set of duplicated RUs.

In some implementations, a power spectral density (PSD) limit applicable to the transmission is based on a frequency bandwidth spanned by the allocated set of duplicated RUs and the spanned frequency bandwidth is at least twice the frequency bandwidth of a respective duplicated RU. The size of the RUs in the allocated set of RUs may be based at least in part on the applicable PSD limit. In some instances, each RU included in the allocated set of duplicated RUs includes a same number of tones.

Figure 14:
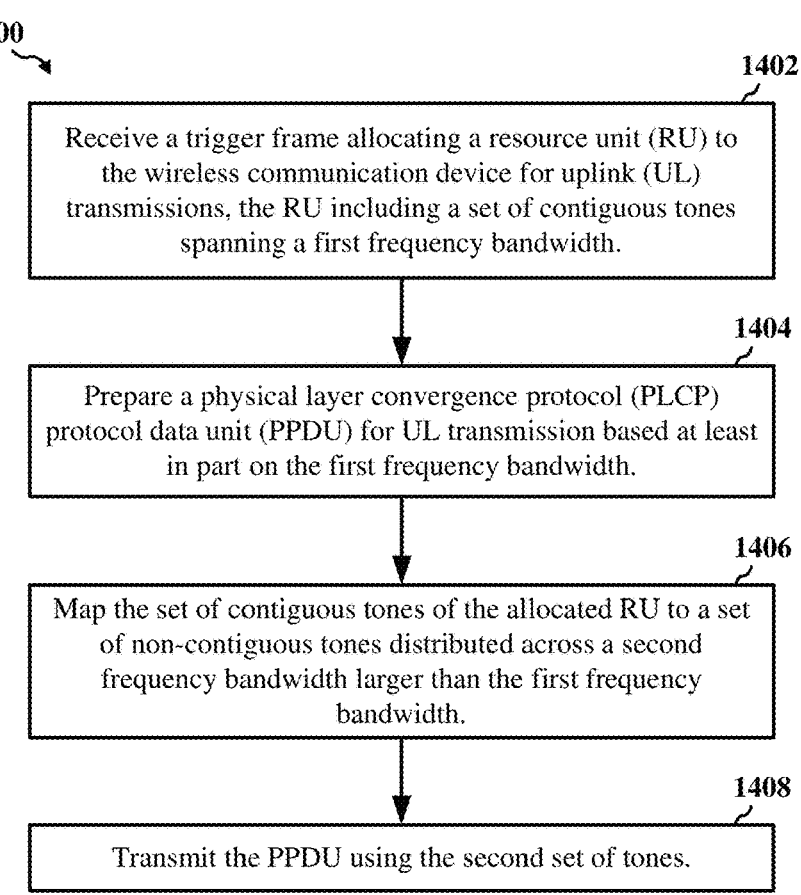
FIG. 14 shows a flowchart illustrating an example operation for wireless communication that supports transmitting one or more PPDUs using tone mapping.

FIG. 14 shows a flowchart illustrating an example operation 1400 for wireless communication that supports transmitting one or more PPDUs using tone mapping. In some implementations, the operation 1400 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 1400 may be performed by an apparatus of a wireless communication device operating as or within a network node. At block 1402, the wireless communication device receives a trigger frame allocating a resource unit (RU) to the wireless communication device for uplink (UL) transmissions, the RU including a set of contiguous tones spanning a first frequency bandwidth. At block 1404, the wireless communication device prepares a physical layer convergence protocol (PLCP) protocol data unit (PPDU) for UL transmission based at least in part on the first frequency bandwidth. At block 1406, the wireless communication device maps the set of contiguous tones of the allocated RU to a set of non-contiguous tones distributed across a second frequency bandwidth larger than the first frequency bandwidth. At block 1408, the wireless communication device transmits the PPDU using the second set of tones.

In some implementations, the PPDU is an UL TB PPDU that spans the second frequency bandwidth. In some instances, the PSD limit applicable to the transmission is based on the second frequency bandwidth, and the second frequency bandwidth is at least an order of magnitude larger than the first frequency bandwidth.

In some implementations, the tones of the set of non-contiguous tones are interleaved with tones of a number of other sets of non-contiguous tones, and the tones of each set of the number of other sets of non-contiguous tones are distributed across the second frequency bandwidth. In some instances, the tones of the set of non-contiguous tones occupy every $M^{th}$ tone of a tone plan associated with the second frequency bandwidth, where M=N+1, and N indicates the number of other sets of non-contiguous tones. In some other instances, the tones of the set of non-contiguous tones occupy every $M^{th}$ and $M+1^{th}$ tone of a tone plan associated with the second frequency bandwidth, where M=N+1, and N indicates the number of other sets of non-contiguous tones. Additionally, each set of the number of other sets of non-contiguous tones may be allocated to a different wireless communication device.

Figure 15A:
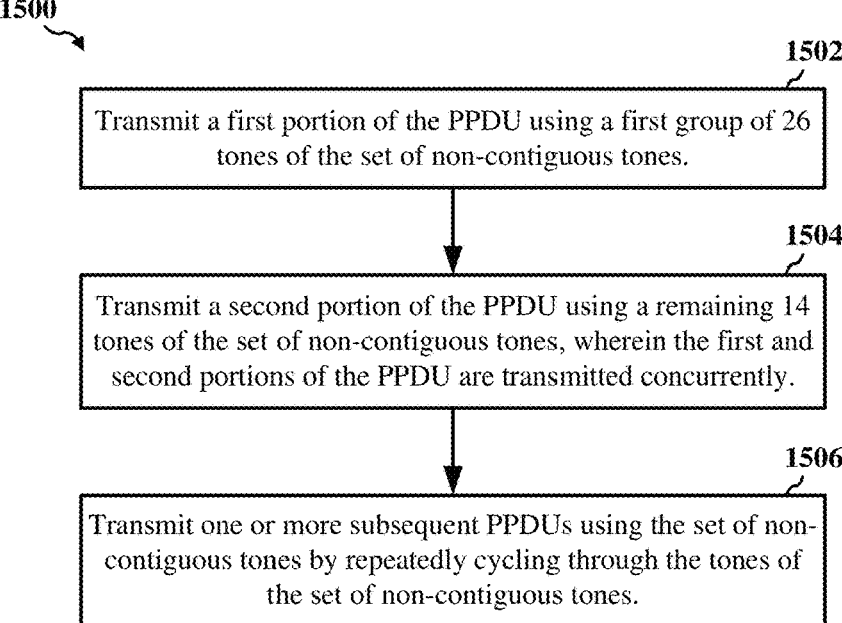

FIG. 15A shows a flowchart illustrating an example operation 1500 for wireless communication that supports transmitting one or more PPDUs using tone mapping. In some implementations, the operation 1500 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 1500 may be performed by an apparatus of a wireless communication device operating as or within a network node. In some instances, the operation 1500 is an example of transmitting the PPDU in block 1408 of the operation 1400 described with reference to FIG. 14. For example, at block 1502, the wireless communication device transmits a first portion of the PPDU using a first group of 26 tones of the set of non-contiguous tones. At block 1504, the wireless communication device transmits a second portion of the PPDU using a remaining 14 tones of the set of non-contiguous tones, where the first and second portions of the PPDU are transmitted concurrently. At block 1506, the wireless communication device transmits one or more subsequent PPDUs using the set of non-contiguous tones by repeatedly cycling through the tones of the set of non-contiguous tones.

FIG. 15B shows a flowchart illustrating an example operation 1510 for wireless communication that supports transmitting one or more PPDUs using tone mapping. In some implementations, the operation 1510 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 1510 may be performed by an apparatus of a wireless communication device operating as or within a network node. In some instances, the operation 1510 is an example of transmitting the PPDU in block 1408 of the operation 1400 described with reference to FIG. 14. For example, at block 1512, the wireless communication device transmits a first portion of the PPDU using a first group of 26 tones of the set of non-contiguous tones. At block 1514, the wireless communication device transmits a second portion of the PPDU using a second group of 26 tones of the set of non-contiguous tones. At block 1516, the wireless communication device transmits a third portion of the PPDU using a third group of 26 tones of the set of non-contiguous tones. At block 1518, the wireless communication device transmits a fourth portion of the PPDU using a remaining 2 tones of the set of non-contiguous tones, where the first, second, third, and fourth portions of the PPDU are transmitted concurrently. At block 1520, the wireless communication device transmits one or more subsequent PPDUs using the set of non-contiguous tones by repeatedly cycling through the tones of the set of non-contiguous tones.

FIG. 16 shows a flowchart illustrating an example operation 1600 for wireless communication that supports transmitting one or more PPDUs using tone mapping. In some implementations, the operation 1600 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 1600 may be performed by an apparatus of a wireless communication device operating as or within a network node. In some instances, the operation 1600 is an example of mapping the set of contiguous tones of the allocated RU in block 1406 of the operation 1400 described with reference to FIG. 14. For example, at block 1602, the wireless communication device determines a spacing between adjacent tones of the set of non-contiguous tones. At block 1604, the wireless communication device distributes the tones of the set of non-contiguous tones across the second frequency bandwidth based on the determined spacing.

In some implementations, the set of contiguous tones of the allocated RU includes 26 tones spanning a 2 MHz frequency subband, includes 52 tones spanning a 4 MHz frequency subband, includes 106 tones spanning a 10 MHz frequency subband, or includes 242 tones spanning a 20 MHz frequency subband. Each tone of the set of non-contiguous tones may be transmitted on a unique 1 MHz frequency subband. In some instances, a spacing between pairs of adjacent tones of the set of non-contiguous tones may include a number M of tones unallocated to the wireless communication device, where M is an integer greater than one.

FIG. 17 shows a flowchart illustrating an example operation 1700 for wireless communication that supports transmitting one or more PPDUs using tone mapping. In some implementations, the operation 1700 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 1700 may be performed by an apparatus of a wireless communication device operating as or within a network node. In some instances, the operation 1700 is an example of determining the spacing in block 1602 of the operation 1600 described with reference to FIG. 16. For example, at block 1702, the wireless communication divides the number of tones in the set of non-contiguous tones by the number of tones in the set of contiguous tones. At block 1704, the wireless communication device generates an integer quotient and a remainder based on the dividing. At block 1706, the wireless communication device selects the integer quotient as the spacing.

Figure 18:
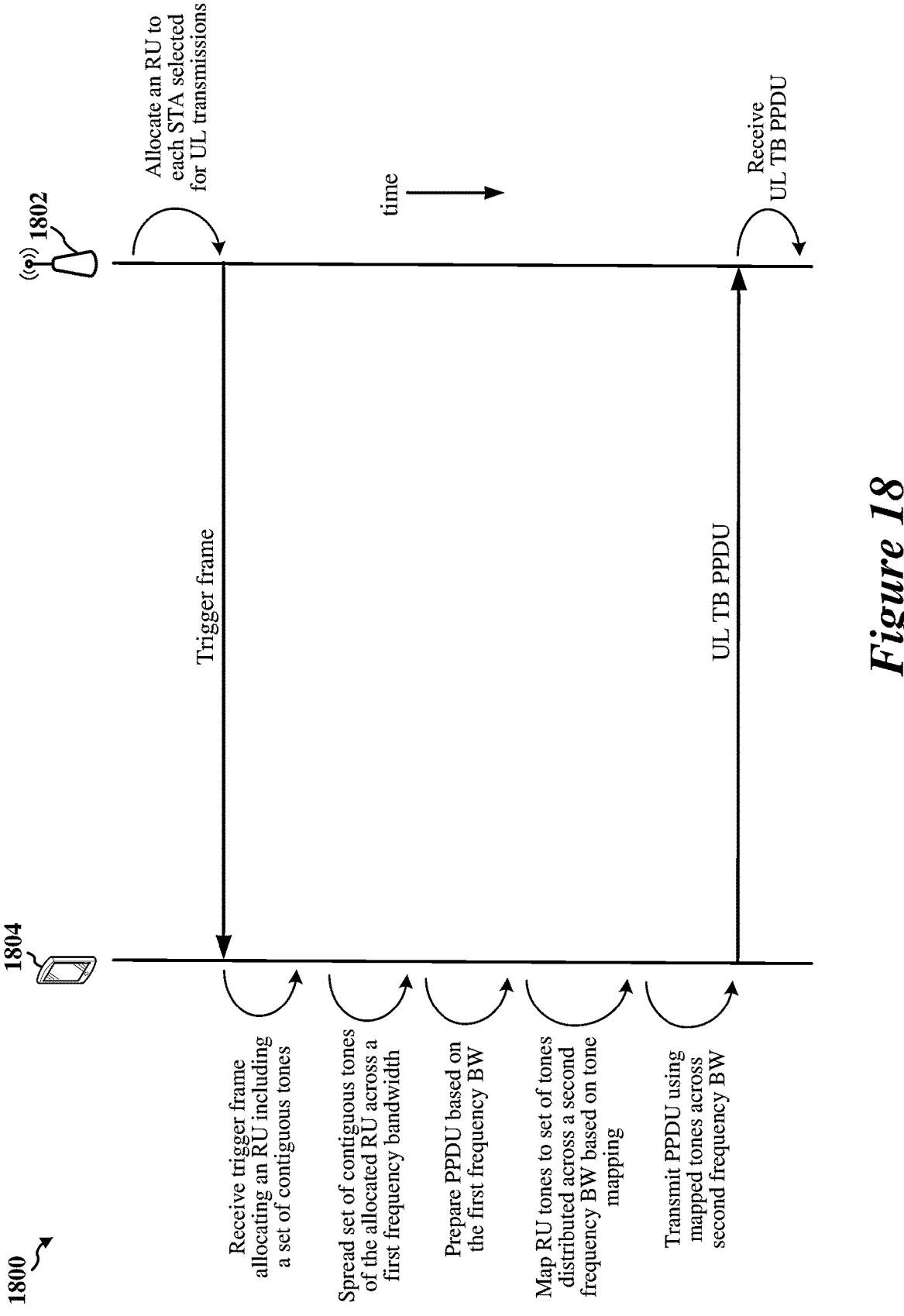
FIG. 18 shows a sequence diagram of an example communication that supports transmitting a PPDU using tone mapping.

FIG. 18 shows a sequence diagram of an example communication 1800 that supports transmitting one or more PPDUs using tone mapping. In some implementations, the communication 1800 may be performed between an AP 1802 and one or more STAs 1804 (only one STA is shown in FIG. 18 for simplicity). The AP 1802 may be an example of the AP 102 of FIG. 1 or the AP 702 of FIG. 7A, and the STA 1804 may be an example of the STA 104 of FIG. 1 or the STA 704 of FIG. 7B. In some other implementations, the communication 1800 may be performed by any suitable wireless communication devices.

The AP 1802 may allocate a RU to each STA of a number of STAs selected for UL transmission. In some implementations, the AP 1802 may transmit a trigger frame to solicit UL transmissions from the STAs. The trigger frame also may allocate an RU to the STA 1804 for UL transmissions. In some aspects, the RU allocated by the trigger frame may include a set of contiguous tones spanning an RU bandwidth. For example, an RU26 may include 26 tones (24 tones usable for UL transmissions and 2 tones usable as pilots) that span a 2 MHz frequency subband, an RU52 may include 52 tones (48 tones usable for UL transmissions and 4 tones usable as pilots) that span a 4 MHz frequency subband, an RU106 may include 106 tones (102 tones usable for UL transmissions and 4 tones usable as pilots) that span a 10 MHz frequency subband, and an RU242 may include 242 tones (234 tones usable for UL transmissions and 8 tones usable as pilots) that span a 20 MHz frequency subband.

The STA 1804 receives the trigger frame, and identifies the tones included in the allocated RU. The STA 1804 may spread the set of contiguous tones of the allocated RU across a first frequency bandwidth, for example, to increase the transmission bandwidth.

The STA 1804 prepares a PPDU for transmission based on the first frequency bandwidth associated with the allocated RU, and maps the set of contiguous tones in the allocated RU to a set of non-contiguous tones distributed across a second frequency bandwidth based on a tone mapping scheme. In some implementations, the second frequency bandwidth may be larger than the first frequency bandwidth, and the first frequency bandwidth may be larger than the RU bandwidth. In some instances, the first frequency bandwidth is 20 MHz, and the second frequency bandwidth is one of 40 MHz, 80 MHz, 160 MHz, or 320 MHz. In some other instances, the second frequency bandwidth may be an order of magnitude (or more) larger than the RU bandwidth.

The STA 1804 transmits the PPDU using the second set of tones that span the second frequency bandwidth. In some implementations, the STA 1804 may transmit a first portion of the PPDU using a first group of 26 tones of the set of non-contiguous tones, may transmit a second portion of the PPDU using a remaining 14 tones of the set of non-contiguous tones, where the first and second portions of the PPDU are transmitted concurrently. In some instances, the STA 1804 may transmit one or more subsequent PPDUs using the set of non-contiguous tones by repeatedly cycling through the tones of the set of non-contiguous tones.

In some other implementations, the STA 1804 may transmit a first portion of the PPDU using a first group of 26 tones of the set of non-contiguous of tones, may transmit a second portion of the PPDU using a second group of 26 tones of the set of non-contiguous tones, may transmit a third portion of the PPDU using a third group of 26 tones of the set of non-contiguous tones, and may transmit a fourth portion of the PPDU using a remaining 2 tones of the set of non-contiguous tones, where the first, second, third, and fourth portions of the PPDU are transmitted concurrently, and are cyclic copies of each other. In some instances, the STA 1804 may transmit one or more subsequent PPDUs using the set of non-contiguous tones by repeatedly cycling through the tones of the set of non-contiguous tones.

The AP 1802 receives the PPDU. In some implementations, the PPDU may be an uplink (UL) trigger-based (TB) PPDU that spans the second frequency bandwidth.

The PSD limit applicable to the communication 1800 may be based at least in part on the second frequency bandwidth. In some instances, the second frequency bandwidth may be at least an order of magnitude larger than the first frequency bandwidth. In some implementations, the set of contiguous tones of the allocated RU includes 26 tones spanning a 2 MHz frequency subband, includes 52 tones spanning a 4 MHz frequency subband, includes 106 tones spanning a 10 MHz frequency subband, or includes 242 tones spanning a 20 MHz frequency subband, and each tone of the set of non-contiguous tones is transmitted on a unique 1 MHz frequency subband. In some instances, a spacing between pairs of adjacent tones of the set of non-contiguous tones includes a number M of tones unallocated to the wireless communication device, where M is an integer greater than one. The number M of unallocated tones may be used for UL transmissions from one or more other STAs, concurrently with transmission of the UL TB PPDU from the STA 1804.

In some other implementations, the set of contiguous tones of the allocated RU may include 26 tones spanning a 2 MHz frequency subband, and the set of non-contiguous tones may include 20 tones spanning a 20 MHz frequency subband. In some instances, the STA 1804 may map the set of contiguous tones to the set of non-contiguous tones by determining a spacing between adjacent tones of the set of non-contiguous tones, and distributing the tones of the set of non-contiguous tones across the second frequency bandwidth based on the determined spacing. The STA 1804 may determine the spacing by dividing the number of tones in the set of non-contiguous tones by the number of tones in the set of contiguous tones in the allocated RU, generating an integer quotient and a remainder based on the dividing, and selecting the integer quotient as the spacing.

In some implementations, the tones of the set of non-contiguous tones are interleaved with tones of one or more other sets of non-contiguous tones across an entirety of the second frequency bandwidth. In some instances, each set of the one or more other sets of non-contiguous tones is allocated to a different wireless communication device. In some other implementations, the tones of the set of non-contiguous tones occupy every $M^{th}$ tone index of a tone plan for the second frequency bandwidth, wherein M is an integer greater than one. In some other implementations, the tones of the set of contiguous tones are mapped in groups of N tones to corresponding distributed tones of a tone plan associated with the second frequency bandwidth, wherein N is an integer greater than one.

Figure 19:
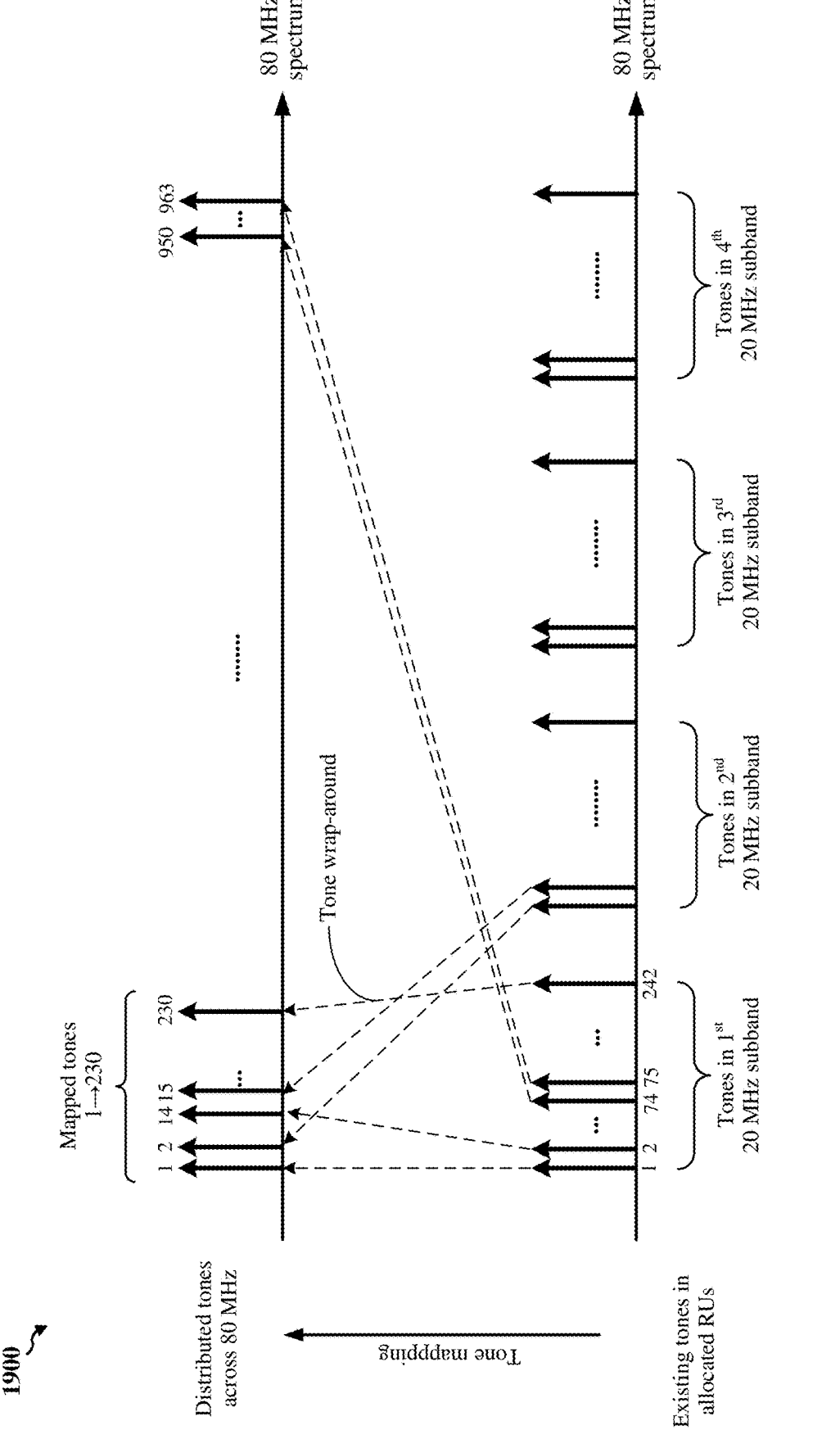
FIG. 19 shows an example mapping of tones.

FIG. 19 shows an example mapping 1900 of tones. As shown, the tones allocated to a user (or STA) by the trigger frame may be mapped to a second set of tones that are distributed across an 80 MHz frequency band. In some instances, the tones included in a respective RU of the allocated RUs (which may be referred to herein as the "existing tones") may be contiguous tones associated with one of the RU26, RU52, RU106, RU242, RU484, or RU996 resource units of a tone plan adopted by the IEEE 802.11ax standards. In some other instances, the tones included in a respective RU may be distributed across a 20 MHz frequency segment when the respective RU is one of the RU26, RU52, or RU106 resource units of the tone plan. For example, during a resource allocation stage, each user (or STA) may be allocated a single RU or multi-RU for UL transmissions. When a user is allocated an RU or multi-RU smaller than RU242 (which spans a 20 MHz frequency subband), the user may use the contiguous tones of the allocated RU to transmit UL data, or may spread the contiguous tones of the allocated RU across a 20 MHz frequency subband and transmit UL data using the spread tones.

In some implementations, the STA 1804 may determine a mapped tone index for each tone of the set of non-contiguous tones based on multiplying a tone index of a corresponding tone of the set of contiguous tones by a number M, wherein M is an integer greater than one. In the example of FIG. 19, M=13, for example, such that adjacent pairs of mapped tones in the second frequency bandwidth are separated by a spacing of 13 tones. In some implementations, the sets of non-contiguous tones mapped from allocated RUs or 20 MHz frequency segments may be distributed across other frequency bands such as, for example, a 20 MHz frequency band, a 40 MHz frequency band, a 160 MHz frequency band, or a 320 MHz frequency band. Also, implementations of the subject matter disclosed herein can be used with allocated RUs of other sizes such as, for example, RU52, RU106, RU242, RU484, or RU996.

FIG. 20 shows a flowchart illustrating an example operation 2000 for wireless communication that supports transmitting one or more PPDUs using tone mapping. In some implementations, the operation 2000 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2000 may be performed by an apparatus of a wireless communication device operating as or within a network node.

At block 2002, the wireless communication device receives a trigger frame allocating a resource unit (RU) to the wireless communication device for uplink (UL) transmissions, the allocated RU including a set of contiguous tones spanning an RU bandwidth. At block 2004, the wireless communication device spreads the tones of the set of contiguous tones of the allocated RU across a first frequency bandwidth. At block 2006, the wireless communication device prepares a physical (PHY) layer convergence protocol (PLCP) protocol data unit (PPDU) for UL transmission based at least in part on the first frequency bandwidth. At block 2008, the wireless communication device maps the set of contiguous tones in the allocated RU to a set of non-contiguous tones distributed across a second frequency bandwidth based on a tone mapping scheme. At block 2010, the wireless communication device transmits the PPDU using the mapped set of non-contiguous tones distributed across the second frequency bandwidth.

In some implementations, the second frequency bandwidth may be larger than the first frequency bandwidth, and the first frequency bandwidth may be larger than the RU bandwidth. In some instances, the first frequency bandwidth is 20 MHz, and the second frequency bandwidth is one of 40 MHz, 80 MHz, 160 MHz, or 320 MHz. In some other instances, the second frequency bandwidth may be an order of magnitude (or more) larger than the RU bandwidth. In some other instances, the second frequency bandwidth may be one or more subbands of a PPDU bandwidth.

The PPDU may be an uplink (UL) trigger-based (TB) PPDU that spans at least the second frequency bandwidth. In some implementations, a power spectral density (PSD) limit applicable to the PPDU transmission may be based at least in part on the second frequency bandwidth. In some other implementations, a power spectral density (PSD) limit applicable to the PPDU transmission is based on a PSD limit corresponding to the first frequency bandwidth times a number N, wherein N is equal to the second frequency bandwidth divided by the first frequency bandwidth.

In some implementations, the tones of the set of non-contiguous tones are interleaved with tones of one or more other sets of non-contiguous tones across an entirety of the second frequency bandwidth. In some instances, each set of the one or more other sets of non-contiguous tones is allocated to a different wireless communication device.

In some implementations, the set of contiguous tones of the allocated RU includes one of 26 tones spanning a 2 MHz frequency subband, 52 tones spanning a 4 MHz frequency subband, 106 tones spanning a 10 MHz frequency subband, or 242 tones spanning a 20 MHz frequency subband. In some instances, the tones of the set of contiguous tones of the allocated RU are spread across a 20 MHz frequency band, irrespective of the number of tones in the allocated RU.

In some implementations, the tones of the set of non-contiguous tones occupy every $M^{th}$ tone index of a tone plan for the second frequency bandwidth, wherein M is an integer greater than one. In some other implementations, the tones of the set of contiguous tones are mapped in groups of N tones to corresponding distributed tones of a tone plan associated with the second frequency bandwidth, wherein N is an integer greater than one.

In some implementations, each tone of a first number of tones in the set of non-contiguous tones occupies a unique 1 MHz frequency subband. In some instances, each tone of a second number of tones in the set of non-contiguous tones shares the unique 1 MHz frequency subband occupied by a corresponding tone of the first number of tones.

FIG. 21A shows a flowchart illustrating an example operation 2100 for wireless communication that supports transmitting one or more PPDUs using tone mapping. In some implementations, the operation 2100 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2100 may be performed by an apparatus of a wireless communication device operating as or within a network node. In some instances, the operation 2100 is an example of mapping the set of contiguous tones of the allocated RU to the set of non-contiguous tones in block 2008 of the operation 2000 described with reference to FIG. 20.

For example, at block 2102, the wireless communication device determines a mapped tone index for each tone of the set of non-contiguous tones based on multiplying a tone index of a corresponding tone of the set of contiguous tones by a number M, wherein M is an integer greater than one. In some other implementations, the mapped tone indices ($IDX_{mapped\_tone\_k,1}$) for a group of M tones in the second frequency bandwidth is $IDX_{mapped\_tone}=\text{mod}(13*(k-1)+1, N_{tone})$, wherein $IDX_{local\_tone}$ is the tone index of the corresponding tone of the set of contiguous tones, M is an integer greater than one, and N tone is the number of tones in the second frequency bandwidth. In some instances, M=13.

FIG. 21B shows a flowchart illustrating an example operation 2110 for wireless communication that supports transmitting one or more PPDUs using tone mapping. In some implementations, the operation 2110 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2110 may be performed by an apparatus of a wireless communication device operating as or within a network node. In some instances, the operation 2110 is an example of mapping the set of contiguous tones in the allocated RU to a set of non-contiguous tones in block 2008 of the operation 2000 described with reference to FIG. 20.

For example, at block 2112, the wireless communication device maps each tone of a number N1 of tones of the allocated RU to a corresponding tone of a first set of N1 tones distributed across an entirety of the second frequency bandwidth, wherein N1 is an integer greater than one. At block 2114, the wireless communication device maps each tone of a remaining number N2 tones of the allocated RU to a corresponding tone of a second set of N2 tones distributed across a subband of the second frequency bandwidth, wherein N2 is an integer greater than one.

In some implementations, the first set of N1 tones occupy the first tone and every $P^{th}$ subsequent tone of the second frequency bandwidth, wherein P is an integer greater than one. Also, the second set of N2 tones may occupy the $i^{th}$ tone and every $P^{th}$ subsequent tone, for N2−1 subsequent tones, of the second frequency bandwidth, wherein I is an integer greater than one. In some instances, P=13 and I is less than P. In some implementations, the tones of the second set of N2 tones and the tones of the first set of N1 tones located in the subband of the second frequency bandwidth are interleaved relative to one another. In some other implementations, each tone of the first set of N1 tones located outside the subband of the second frequency bandwidth occupies a unique 1 MHz frequency subband. In some instances, each tone of the second set of N2 tones shares a unique 1 MHz frequency subband with a corresponding tone of the first set of N1 tones located in the subband of the second frequency bandwidth.

FIG. 21C shows a flowchart illustrating an example operation 2120 for wireless communication that supports transmitting one or more PPDUs using tone mapping. In some implementations, the operation 2120 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2120 may be performed by an apparatus of a wireless communication device operating as or within a network node. In some instances, the operation 2120 is an example of mapping the set of contiguous tones in the allocated RU to a set of non-contiguous tones in block 2008 of the operation 2000 described with reference to FIG. 20.

For example, at block 2122, the wireless communication device maps each tone of the first 75 tones of the allocated RU106 to a corresponding tone of a first set of 75 tones distributed across an entirety of the second frequency bandwidth. At block 2124, the wireless communication device maps each tone of a remaining 31 tones of the allocated RU106 to a corresponding tone of a second set of 31 tones distributed across a first portion of the second frequency bandwidth.

FIG. 21D shows a flowchart illustrating an example operation 2130 for wireless communication that supports transmitting one or more PPDUs using tone mapping. In some implementations, the operation 2130 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2130 may be performed by an apparatus of a wireless communication device operating as or within a network node. In some instances, the operation 2130 may be one example of transmitting the PPDU in block 2010 of the operation of FIG. 10. For example, at block 2132, the wireless communication device transmits all tones of the first set of N1 tones and the second set of N2 tones at a same power level.

FIG. 21E shows a flowchart illustrating an example operation 2140 for wireless communication that supports transmitting one or more PPDUs using tone mapping. In some implementations, the operation 2140 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2140 may be performed by an apparatus of a wireless communication device operating as or within a network node. In some instances, the operation 2140 is an example of transmitting the PPDU in block 2010 of the operation 2000 described with reference to FIG. 20.

For example, at block 2142, the wireless communication device transmits each tone of the first set of N1 tones located outside the subband of the second frequency bandwidth at a first power level. At block 2144, the wireless communication device transmits each tone of the second set of N2 tones and each tone of the first set of N1 tones located in the subband of the second frequency bandwidth at a second power level different than the first power level.

FIG. 21F shows a flowchart illustrating an example operation 2150 for wireless communication that supports transmitting one or more PPDUs using tone mapping. In some implementations, the operation 2150 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2150 may be performed by an apparatus of a wireless communication device operating as or within a network node. In some instances, the operation 2150 an example of transmitting the PPDU in block 2010 of the operation 2000 described with reference to FIG. 20.

For example, at block 2152, the wireless communication device transmits one or more subsequent PPDUs using a mapped set of non-contiguous tones by repeatedly cycling through the tones of the mapped set of non-contiguous tones across the second frequency bandwidth.

FIG. 22 shows a flowchart illustrating an example operation 2200 for wireless communication that supports transmitting one or more PPDUs using tone mapping. In some implementations, the operation 2200 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2200 may be performed by an apparatus of a wireless communication device operating as or within a network node.

At block 2202, the wireless communication device receives a trigger frame allocating a resource unit (RU) to the wireless communication device for uplink (UL) transmissions, the allocated RU including a set of contiguous tones spanning an RU bandwidth. At block 2204, the wireless communication device spreads the set of contiguous tones of the allocated RU across a first frequency bandwidth. At block 2206, the wireless communication device prepares a physical (PHY) layer convergence protocol (PLCP) protocol data unit (PPDU) for UL transmission based at least in part on the first frequency bandwidth. At block 2208, the wireless communication device maps the set of contiguous tones in the allocated RU to one or more first groups of non-contiguous tones distributed across a second frequency bandwidth based on a tone mapping scheme. At block 2210, the wireless communication device transmits the PPDU using the one or more first groups of non-contiguous mapped tones distributed across the second frequency bandwidth. In some instances, each group of tones spans an 80 MHz frequency band.

In some implementations, the second frequency bandwidth also includes one or more second groups of non-contiguous tones distributed across the second frequency bandwidth and allocated for non-mapped tones of the allocated RU. Each of the first and second groups of non-contiguous tones of the second frequency bandwidth may occupy or span any suitable frequency subband. For example, in implementations for which the first groups of non-contiguous tones are 80 MHz wide and the second groups of non-contiguous tones are also 80 MHz wide, a first number of 80 MHz portions or "chunks" of non-contiguous tones in the second frequency bandwidth may be used for distributed transmissions. and a second number of 80 MHz portions or "chunks" of non-contiguous tones in the second frequency bandwidth may be used for localized transmissions. That is, while some 80 MHz portions of the second frequency bandwidth may be used for distributed transmissions that can increase applicable PSD limits, other portions of the second frequency bandwidth may be reserved for UL transmissions based on frequency resources associated with one or more RUs' allocated by the trigger frame. In some instances, the second frequency bandwidth is larger than the first frequency bandwidth, and the first frequency bandwidth is larger than the RU bandwidth.

In some implementations, a power spectral density (PSD) limit applicable to the PPDU transmission is based at least in part on the second frequency bandwidth. In some other implementations, a power spectral density (PSD) limit applicable to the PPDU transmission is based on a PSD limit corresponding to the first frequency bandwidth times a number N, wherein N is equal to the second frequency bandwidth divided by the first frequency bandwidth.

FIG. 23 shows a flowchart illustrating an example operation 2300 for wireless communication that supports transmitting one or more PPDUs using tone mapping. In some implementations, the operation 2300 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2300 may be performed by an apparatus of a wireless communication device operating as or within a network node.

At block 2302, the wireless communication device receives a trigger frame allocating a resource unit (RU) to the wireless communication device for uplink (UL) transmissions, the allocated RU including a set of contiguous tones spanning an RU bandwidth. At block 2304, the wireless communication device spreads the set of contiguous tones of the allocated RU across a first frequency bandwidth. At block 2306, the wireless communication device prepares a physical (PHY) layer convergence protocol (PLCP) protocol data unit (PPDU) for UL transmission based at least in part on the first frequency bandwidth. At block 2308, the wireless communication device maps the set of contiguous tones spread across the first frequency bandwidth to one or more sets of non-contiguous tones based on a tone mapping scheme, each set of the one or more sets of non-contiguous tones distributed across an 80 MHz frequency band. At block 2310, the wireless communication device maps each set of non-contiguous tones from a corresponding 80 MHz frequency band to one of a 160 MHz frequency band or a 320 MHz frequency band based on the tone mapping scheme. At block 2312, the wireless communication device transmits the PPDU using the mapped set of non-contiguous tones distributed across the second frequency bandwidth.

Implementation examples are described in the following numbered clauses:

1. A method for wireless communication by an apparatus of a wireless communication device, including:
   generating a plurality of physical (PHY) layer convergence protocol (PLCP) protocol data unit (PPDU) duplicates configured for transmission over a selected bandwidth; and
   transmitting each PPDU duplicate of the plurality of PPDU duplicates on a corresponding frequency subband of a plurality of different frequency subbands.

2. The method of clause 1, where each PPDU duplicate is based on duplication of an entirety of the PPDU except for any universal signal field (U-SIG).

3. The method of any one or more of clauses 1-2, where the plurality of different frequency subbands include one or more unlicensed channels in a 6 GHz frequency spectrum, and a power spectral density (PSD) limit applicable to the transmission is based on a combined frequency bandwidth of the plurality of different frequency subbands.

4. The method of clause 3, where the combined frequency bandwidth is N times greater than the selected bandwidth upon which a respective PPDU duplicate is transmitted.

5. The method of any one or more of clauses 1-4, where the PPDU includes an extremely high throughput (EHT) PPDU including a physical layer preamble and one or more data fields, where generating the plurality of PPDU duplicates includes:
   duplicating a pre-EHT modulated portion of the preamble, an EHT modulated portion of the preamble, and the one or more data fields according to a same duplicate format.

6. The method of any one or more of clauses 1-5, where the PPDU includes an extremely high throughput (EHT) PPDU including a physical layer preamble and one or more data fields, where generating the plurality of PPDU duplicates includes:

duplicating a pre-EHT modulated portion of the preamble according to a first duplicate format;

duplicating the EHT modulated portion of the preamble according to a second duplicate format different than the first duplicate format; and duplicating the one or more data fields according to the second duplicate format.

7. The method of clause 6, where the first duplicate format is associated with a first multiple of a frequency bandwidth, and the second duplicate format is associated with a second multiple of the frequency bandwidth, where the second multiple is at least twice the first multiple.

8. The method of any one or more of clauses 1-7, further including:

repeating transmission of one or more data fields of the PPDU on each frequency subband of the plurality of different frequency subbands.

9. The method of any one or more of clauses 1-8, where the PPDU includes a physical layer preamble and includes one of an extremely high throughput (EHT) format or a single-user (SU) extended range (ER) PPDU format, where generating the plurality of PPDU duplicates includes:

duplicating the preamble in each of a plurality of 20 MHz frequency subbands; and duplicating a data portion of the PPDU in each of the plurality of the 40 MHz frequency subbands, the 80 MHz frequency subbands, or the 160 MHz frequency subbands.

10. The method of any one or more of clauses 1-9, where a respective PPDU duplicate includes a physical layer preamble including a compression mode field indicating a non-orthogonal frequency division multiple access (OFDMA) transmission, and a Modulation and Coding Scheme (MCS) field in a user field of the indicating an MCS14 value.

11. A wireless communication device, including:

a processing system configured to:

generate a plurality of physical (PHY) layer convergence protocol (PLCP) protocol data unit (PPDU) duplicates configured for transmission over a selected bandwidth; and an interface configured to:

output each PPDU duplicate of the plurality of PPDU duplicates on a corresponding frequency subband of a plurality of different frequency subbands.

12. The wireless communication device of clause 11, where each PPDU duplicate is based on duplication of an entirety of the PPDU except for any universal signal field (U-SIG).

13. The wireless communication device of any one or more of clauses 11-12, where the plurality of different frequency subbands include one or more unlicensed channels in a 6 GHz frequency spectrum, and a power spectral density (PSD) limit applicable to the transmission is based on a combined frequency bandwidth of the plurality of different frequency subbands.

14. The wireless communication device of any one or more of clauses 11-13, where the PPDU includes an extremely high throughput (EHT) PPDU including a physical layer preamble and one or more data fields, where generating the plurality of PPDU duplicates includes:

duplicating a pre-EHT modulated portion of the preamble, an EHT modulated portion of the preamble, and the one or more data fields according to a same duplicate format.

15. The wireless communication device of any one or more of clauses 11-14, where the PPDU includes an extremely high throughput (EHT) PPDU including a physical layer preamble and one or more data fields, where generating the plurality of PPDU duplicates includes:

duplicating a pre-EHT modulated portion of the preamble according to a first duplicate format;

duplicating the EHT modulated portion of the preamble according to a second duplicate format different than the first duplicate format; and duplicating the one or more data fields according to the second duplicate format.

16. The wireless communication device of clause 15, where the first duplicate format is associated with a first multiple of a frequency bandwidth, and the second duplicate format is associated with a second multiple of the frequency bandwidth, where the second multiple is at least twice the first multiple.

17. A method for wireless communication by an apparatus of a wireless communication device, including:

generating a physical (PHY) layer convergence protocol (PLCP) protocol data unit (PPDU) for transmission over a set of duplicated resource units (RUs) allocated to the wireless communication device; and transmitting the PPDU over the allocated set of duplicated RUs.

18. The method of clause 17, where the PPDU includes a single-user (SU) PPDU.

19. The method of any one or more of clauses 17-18, where a power spectral density (PSD) limit applicable to the transmission is based on a frequency bandwidth spanned by the allocated set of duplicated RUs.

20. The method of clause 19, where the spanned frequency bandwidth is at least twice the frequency bandwidth of a respective duplicated RU.

21. The method of any one or more of clauses 17-20, where a size of the duplicated RUs in the allocated set of duplicated RUs is based at least in part on a power spectral density (PSD) limit applicable to a frequency bandwidth of the wireless channel.

22. The method of any one or more of clauses 17-21, where the set of duplicated RUs is based on duplication of a RU a number N of times, where N is an integer greater than 1.

23. The method of any one or more of clauses 17-22, where the PPDU is transmitted on each RU of the allocated set of RUs.

24. A wireless communication device, including:

a processing system configured to:

generate a physical (PHY) layer convergence protocol (PLCP) protocol data unit (PPDU) for transmission over a set of duplicated resource units (RUs) allocated to the wireless communication device; and an interface configured to:

output the PPDU over the allocated set of duplicated RUs.

25. The wireless communication device of clause 24, where the PPDU includes a single-user (SU) PPDU.

26. The wireless communication device of clause 25, where a power spectral density (PSD) limit applicable to the transmission is based on a frequency bandwidth spanned by the allocated set of duplicated RUs.

27. The wireless communication device of clause 26, where the spanned frequency bandwidth is at least twice the frequency bandwidth of a respective duplicated RU.

28. The wireless communication device of any one or more of clauses 24-27, where a size of the duplicated RUs in the allocated set of duplicated RUs is based at least in part on a power spectral density (PSD) limit applicable to a frequency bandwidth of the wireless channel.

29. The wireless communication device of any one or more of clauses 24-28, where the set of duplicated RUs is based on duplication of a RU a number N of times, where N is an integer greater than 1.

30. The wireless communication device of any one or more of clauses 24-29, where the PPDU is transmitted on each RU of the allocated set of RUs.

31. A method for wireless communication by an apparatus of a wireless communication device, including:

receiving a trigger frame allocating a resource unit (RU) to the wireless communication device for uplink (UL) transmissions, the RU including a set of contiguous tones spanning a first frequency bandwidth;

preparing a physical (PHY) layer convergence protocol (PLCP) protocol data unit (PPDU) for UL transmission based at least in part on the first frequency bandwidth;

mapping the set of contiguous tones of the allocated RU to a set of non-contiguous tones distributed across a second frequency bandwidth larger than the first frequency bandwidth; and transmitting the PPDU using the second set of tones.

32. The method of clause 31, where the PPDU includes an uplink (UL) trigger-based (TB) PPDU that spans the second frequency bandwidth.

33. The method of any one or more of clauses 31-32, where a power spectral density (PSD) limit applicable to the transmission is based on the second frequency bandwidth.

34. The method of any one or more of clauses 31-33, where the second frequency bandwidth is at least an order of magnitude larger than the first frequency bandwidth.

35. The method of any one or more of clauses 31-34, where the set of contiguous tones of the allocated RU includes 26 tones spanning a 2 MHz frequency subband, includes 52 tones spanning a 4 MHz frequency subband, includes 106 tones spanning a 10 MHz frequency subband, or includes 242 tones spanning a 20 MHz frequency subband, and each tone of the set of non-contiguous tones is transmitted on a unique 1 MHz frequency subband.

36. The method of clause 35, where a spacing between pairs of adjacent tones of the set of non-contiguous tones includes a number M of tones unallocated to the wireless communication device, where M is an integer greater than one.

37. The method of clause 36, where the number M of unallocated tones are configured for UL transmissions from one or more other wireless communication devices.

38. The method of any one or more of clauses 35-37, where the set of non-contiguous tones includes 40 tones spanning a 40 MHz frequency subband.

39. The method of clause 38, where transmitting the PPDU includes:

transmitting a first portion of the PPDU using a first group of 26 tones of the set of non-contiguous tones; and transmitting a second portion of the PPDU using a remaining 14 tones of the set of non-contiguous tones, where the first and second portions of the PPDU are transmitted concurrently.

40. The method of clause 39, further including:

transmitting one or more subsequent PPDUs using the set of non-contiguous tones by repeatedly cycling through the tones of the set of non-contiguous tones.

41. The method of any one or more of clauses 35-40, where the set of non-contiguous tones includes 80 tones spanning a 80 MHz frequency subband.

42. The method of clause 41, where transmitting the PPDU includes:

transmitting a first portion of the PPDU using a first group of 26 tones of the set of non-contiguous tones;

transmitting a second portion of the PPDU using a second group of 26 tones of the set of non-contiguous tones;

transmitting a third portion of the PPDU using a third group of 26 tones of the set of non-contiguous tones; and transmitting a fourth portion of the PPDU using a remaining 2 tones of the set of non-contiguous tones, where the first, second, third, and fourth portions of the PPDU are transmitted concurrently.

43. The method of clause 42, further including:

transmitting one or more subsequent PPDUs using the set of non-contiguous tones by repeatedly cycling through the tones of the set of non-contiguous tones.

44. The method of any one or more of clauses 42-43, where the set of contiguous tones of the allocated RU includes 26 tones spanning a 2 MHz frequency subband, and the set of non-contiguous tones includes 20 tones spanning a 20 MHz frequency subband.

45. The method of clause 44, where mapping the set of contiguous tones to the set of non-contiguous tones includes:

determining a spacing between adjacent tones of the set of non-contiguous tones; and distributing the tones of the set of non-contiguous tones across the second frequency bandwidth based on the determined spacing.

46. The method of clause 45, where determining the spacing includes:

dividing the number of tones in the set of non-contiguous tones by the number of tones in the set of contiguous tones;

generating an integer quotient and a remainder based on the dividing; and selecting the integer quotient as the spacing.

47. The method of any one or more of clauses 44-45, where the tones of the set of non-contiguous tones are interleaved with tones of a number of other sets of non-contiguous tones.

48. The method of clause 47, where the tones of each set of the number of other sets of non-contiguous tones are distributed across the second frequency bandwidth.

49. The method of clause 48, where each set of the number of other sets of non-contiguous tones is allocated to a different wireless communication device.

50. The method of clause 49, where the tones of the set of non-contiguous tones occupy every $M^{th}$ tone of a tone plan associated with the second frequency bandwidth, where M=N+1, and N indicates the number of other sets of non-contiguous tones.

51. The method of clause 49, where the tones of the set of th e set of non-contiguous tones occupy every $M^{th}$ and $M+1^{th}$ tone of a tone plan associated with the second frequency bandwidth, where M=N+1, and N indicates the number of other sets of non-contiguous tones.

52. A wireless communication device including:
  at least one modem;
  at least one processor communicatively coupled with the at least one modem; and
  at least one memory communicatively coupled with the at least one processor and storing processor-readable code that, when executed by the at least one processor in conjunction with the at least one modem, is configured to perform the method of any one of clauses 1-51.

53. A mobile station including:
  the wireless communication device of clause 52;
  at least one transceiver coupled to the at least one modem;
  at least one antenna coupled to the at least one transceiver to wirelessly transmit signals output from the at least one transceiver and to wirelessly receive signals for input into the at least one transceiver; and
  a housing that encompasses the at least one modem, the at least one processor, the at least one memory, the at least one transceiver and at least a portion of the at least one antenna.

54. A method for wireless communication by an apparatus of a wireless communication device, including:
  receiving a trigger frame allocating a resource unit (RU) to the wireless communication device for uplink (UL) transmissions, the allocated RU including a set of contiguous tones spanning an RU bandwidth;
  spreading the set of contiguous tones of the allocated RU across a first frequency bandwidth;
  preparing a physical (PHY) layer convergence protocol (PLCP) protocol data unit (PPDU) for UL transmission based at least in part on the first frequency bandwidth;
  mapping the set of contiguous tones in the allocated RU to a set of non-contiguous tones distributed across a second frequency bandwidth based on a tone mapping scheme; and
  transmitting the PPDU using the mapped set of non-contiguous tones distributed across the second frequency bandwidth.

55. The method of clause 54, where the PPDU includes an uplink (UL) trigger-based (TB) PPDU that spans the second frequency bandwidth.

56. The method of any one or more of clauses 54-55, where the second frequency bandwidth is larger than the first frequency bandwidth, and the first frequency bandwidth is larger than the RU bandwidth.

57. The method of any one or more of clauses 54-56, where a power spectral density (PSD) limit applicable to the PPDU transmission is based at least in part on the second frequency bandwidth.

58. The method of any one or more of clauses 54-56, where a power spectral density (PSD) limit applicable to the PPDU transmission is based on a PSD limit corresponding to the first frequency bandwidth times a number N, where N is equal to the second frequency bandwidth divided by the first frequency bandwidth.

59. The method of any one or more of clauses 54-58, where the tone mapping scheme includes an arithmetic operation.

60. The method of any one or more of clauses 54-59, where the mapping includes:
  determining a mapped tone index for each tone of the set of non-contiguous tones based on multiplying a tone index of a corresponding tone of the set of contiguous tones by a number M, where M is an integer greater than one.

61. The method of clause 60, where the mapped tone index ($IDX_{mapped\_tone}$) for a respective tone of the set of non-contiguous tones is $IDX_{mapped\_tone}$=Mod$((IDX_{local\_tone}-1)*M+1, N_{tone})$, where $IDX_{local\_tone}$ is the tone index of the corresponding tone of the set of contiguous tones, M is an integer greater than one, and $N_{tone}$ is the number of tones in the second frequency bandwidth.

62. The method of any one or more of clauses 60-61, where a spacing between pairs of adjacent tones of the set of non-contiguous tones includes M tones allocated for UL transmissions from one or more other wireless communication devices.

63. The method of any one or more of clauses 60-62, where M=13.

64. The method of any one or more of clauses 54-63, where the tones of the set of non-contiguous tones are interleaved with tones of one or more other sets of non-contiguous tones across an entirety of the second frequency bandwidth.

65. The method of clause 64, where each set of the one or more other sets of non-contiguous tones is allocated to a different wireless communication device.

66. The method any one or more of clauses 54-65, where the set of contiguous tones of the allocated RU includes one of 26 tones spanning a 2 MHz frequency subband, 52 tones spanning a 4 MHz frequency subband, 106 tones spanning a 10 MHz frequency subband, or 242 tones spanning a 20 MHz frequency subband.

67. The method of clause 66, where the tones of the set of contiguous tones of the allocated RU are spread across a 20 MHz frequency band, irrespective of the number of tones in the allocated RU.

68. The method of any one or more of clauses 54-67, where the tones of the set of non-contiguous tones occupy every $M^{th}$ tone index of a tone plan for the second frequency bandwidth, where M is an integer greater than one.

69. The method of clause 68, where the tones of the set of contiguous tones are mapped in groups of N tones to corresponding distributed tones of a tone plan associated with the second frequency bandwidth, where N is an integer greater than one.

70. The method of any one or more of clauses 54-69, where the mapping includes:
  determining a group of mapped tone indices for each group of tones in the second frequency bandwidth based on multiplying the tone indices of respective groups of tones in the first frequency bandwidth.

71. The method of clause 70, where the mapped tone indices ($IDX_{mapped\_tone\_k,1}$) for a group of M tones in the second frequency bandwidth is $IDX_{mapped\_tone}$=mod$(13*(k-1)+1, N_{tone})$, where $IDX_{local\_tone}$ is the tone index of the corresponding tone of the set of contiguous tones, M is an integer greater than one, and $N_{tone}$ is the number of tones in the second frequency bandwidth.

72. The method of any one or more of clauses 54-71, where each tone of a first number of tones in the set of non-contiguous tones occupies a unique 1 MHz frequency subband.

73. The method of clause 72, where each tone of a second number of tones in the set of non-contiguous tones shares the unique 1 MHz frequency subband occupied by a corresponding tone of the first number of tones.

74. The method of any one or more of clauses 54-71, where the mapping includes:

mapping each tone of a number N1 of tones of the allocated RU to a corresponding tone of a first set of N1 tones distributed across an entirety of the second frequency bandwidth, where N1 is an integer greater than one; and mapping each tone of a remaining number N2 tones of the allocated RU to a corresponding tone of a second set of N2 tones distributed across a subband of the second frequency bandwidth, where N2 is an integer greater than one.

75. The method of clause 74, where the first set of N1 tones occupy the first tone and every $P^{th}$ subsequent tone of the second frequency bandwidth, where P is an integer greater than one.

76. The method of clause 75, where the second set of N2 tones occupy the/th tone and every $P^{th}$ subsequent tone, for thirty subsequent tones, of the second frequency bandwidth, where I is an integer greater than one.

77. The method of any one or more of clauses 75-76, where P=13 and I is less than P.

78. The method of clause 77, where the tones of the second set of N2 tones and the tones of the first set of N1 tones located in the subband of the second frequency bandwidth are interleaved relative to one another.

79. The method of clause 78, where each tone of the first set of N1 tones located outside the subband of the second frequency bandwidth occupies a unique 1 MHz frequency subband.

80. The method of clause 79, where each tone of the second set of N2 tones shares a unique 1 MHz frequency subband with a corresponding tone of the first set of N1 tones located in the subband of the second frequency bandwidth.

81. The method of any one or more of clauses 74-80, where transmitting the PPDU includes:

transmitting each tone of the first set of N1 tones located outside the subband of the second frequency bandwidth at a first power level; and transmitting each tone of the second set of N2 tones and each tone of the first set of N1 tones located in the subband of the second frequency bandwidth at a second power level different than the first power level.

82. The method of clause 81, where the second power level is less than the first power level.

83. The method of any one or more of clauses 74-82, where transmitting the PPDU includes:

transmitting all tones of the first set of N1 tones and the second set of N2 tones at a same power level.

84. The method of clause 83, where the same power level is based on a power spectral density (PSD) limit applicable to transmission of a pair of tones from the first and second respective sets of tones using a 1 MHz frequency subband.

85. The method of clause 84, where the allocated RU includes 106 tones, the second frequency bandwidth is 80 MHz, and the second frequency bandwidth includes 968 tones usable for carrying UL data.

86. The method of clause 85, where the mapping includes:

mapping each tone of the first 75 tones of the allocated RU to a corresponding tone of a first set of 75 tones distributed across an entirety of the second frequency bandwidth; and mapping each tone of a remaining 31 tones of the allocated RU to a corresponding tone of a second set of 31 tones distributed across a first portion of the second frequency bandwidth.

87. The method of clause 86, where the first set of 75 tones occupy the first tone and every 13 th subsequent tone of the second frequency bandwidth.

88. The method of any one or more of clauses 86-87, where the second set of 31 tones occupy the eighth tone and every 13 th subsequent tone, for thirty subsequent tones, of the second frequency bandwidth.

89. The method of clauses 54-88, further including:

transmitting one or more subsequent PPDUs using the mapped set of non-contiguous tones by repeatedly cycling through the tones of the mapped set of non-contiguous tones across the second frequency bandwidth.

90. A wireless communication device including:

at least one modem;

at least one processor communicatively coupled with the at least one modem; and at least one memory communicatively coupled with the at least one processor and storing processor-readable code that, when executed by the at least one processor in conjunction with the at least one modem, is configured to perform the method of any one of clauses 54-89.

91. A non-transitory computer-readable medium including instructions that, when executed by one or more processors of a base station, cause the base station to perform the operations of any one or more of clauses 54-89.

92. A wireless communication device including means for performing the operations of any one or more of clauses 54-89.

93. A method for wireless communication by an apparatus of a wireless communication device, including:

receiving a trigger frame allocating a resource unit (RU) to the wireless communication device for uplink (UL) transmissions, the allocated RU including a set of contiguous tones spanning an RU bandwidth;

spreading the set of contiguous tones of the allocated RU across a first frequency bandwidth;

preparing a physical (PHY) layer convergence protocol (PLCP) protocol data unit (PPDU) for UL transmission based at least in part on the first frequency bandwidth;

mapping the set of contiguous tones in the allocated RU to one or more first groups of non-contiguous tones distributed across a second frequency bandwidth based on a tone mapping scheme; and transmitting the PPDU using the one or more first groups of non-contiguous mapped tones distributed across the second frequency bandwidth.

94. The method of clause 93, where the second frequency bandwidth includes one or more second groups of non-contiguous tones distributed across the second frequency bandwidth and allocated for non-mapped tones of the allocated RU.

95. The method of any one or more of clauses 93-94, where each group of tones spans an 80 MHz frequency band.

96. The method of any one or more of clauses 93-95, where the PPDU includes an uplink (UL) trigger-based (TB) PPDU that spans the second frequency bandwidth, where the second frequency bandwidth is larger than the first frequency bandwidth.

97. The method of any one or more of clauses 93-96, where the second frequency bandwidth is larger than the first frequency bandwidth, and the first frequency bandwidth is larger than the RU bandwidth.

98. The method of any one or more of clauses 93-97, where a power spectral density (PSD) limit applicable to the PPDU transmission is based at least in part on the second frequency bandwidth.

99. The method of any one or more of clauses 93-97, where a power spectral density (PSD) limit applicable to the PPDU transmission is based on a PSD limit corresponding to the first frequency bandwidth times a number N, where N is equal to the second frequency bandwidth divided by the first frequency bandwidth.

100. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one of clauses 93-99.

101. A non-transitory computer-readable medium including instructions that, when executed by one or more processors of a base station, cause the base station to perform the operations of any one or more of clauses 93-99.

102. A wireless communication device including means for performing the operations of any one or more of clauses 93-99.

103. A method for wireless communication by an apparatus of a wireless communication device, including:
receiving a trigger frame allocating a resource unit (RU) to the wireless communication device for uplink (UL) transmissions, the allocated RU including a set of contiguous tones spanning an RU bandwidth;
spreading the set of contiguous tones of the allocated RU across a first frequency bandwidth;
preparing a physical (PHY) layer convergence protocol (PLCP) protocol data unit (PPDU) for UL transmission based at least in part on the first frequency bandwidth;
mapping the set of contiguous tones spread across the first frequency bandwidth to one or more sets of non-contiguous tones based on a tone mapping scheme, each set of the one or more sets of non-contiguous tones distributed across an 80 MHz frequency band such that pairs of adjacent tones are separated by 13 unallocated tones;
mapping each set of non-contiguous tones from a corresponding 80 MHz frequency band to one of a 160 MHz frequency band or a 320 MHz frequency band based on the tone mapping scheme; and
transmitting the PPDU using the mapped tones in the one of the 160 MHz frequency band or the 320 MHz frequency band.

104. The method of clause 103, where the PPDU includes an uplink (UL) trigger-based (TB) PPDU that spans the second frequency bandwidth.

105. The method of clause 103 or clause 104, where adjacent tones of the mapped tones in the one of the 160 MHz frequency band or the 320 MHz frequency band are separated by 2 or 4 unallocated tones.

106. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one of clauses 103-105.

107. A non-transitory computer-readable medium including instructions that, when executed by one or more processors of a base station, cause the base station to perform the operations of any one or more of clauses 103-105.

108. A wireless communication device including means for performing the operations of any one or more of clauses 103-105.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm operations described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and operations described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example operations in the form of a flowchart or flow diagram. However, other operations that are not depicted can be incorporated in the example operations that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by an apparatus of a wireless communication device, comprising:

generating a physical (PHY) layer convergence protocol (PLCP) protocol data unit (PPDU), wherein the PPDU is an extremely high throughput (EHT) PPDU that includes a pre-EHT portion containing a universal signal (U-SIG) field and an EHT portion containing a data field, wherein the U-SIG field is duplicated according to a first duplication format corresponding to a first frequency bandwidth, wherein the data field is duplicated according to a second duplication format corresponding to a second frequency bandwidth, and wherein the second frequency bandwidth is greater than the first frequency bandwidth by an integer multiple greater than 1; and transmitting the PPDU via a set of resource units (RUs), each RU of the set of RUs including the duplication of the data field of the PPDU.

2. The method of claim 1, wherein the PPDU comprises a single-user (SU) PPDU.

3. The method of claim 1, wherein a power spectral density (PSD) limit applicable to transmission of the PPDU is associated with a total frequency bandwidth spanned by the set of RUs.

4. The method of claim 3, wherein the total frequency bandwidth is at least twice a respective frequency bandwidth of a respective RU.

5. The method of claim 1, wherein a size of respective RUs in the set of RUs is associated with a power spectral density (PSD) limit applicable to a frequency bandwidth of a wireless channel.

6. The method of claim 1, wherein the set of RUs is obtained via duplication of a RU a quantity N of times, N being an integer greater than 1.

7. The method of claim 1, wherein the data field of the PPDU is duplicated in frequency, and the PPDU is transmitted over each RU of the set of RUs.

8. A wireless communication device, comprising:

a processing system configured to:

generate a physical (PHY) layer convergence protocol (PLCP) protocol data unit (PPDU), wherein the PPDU is an extremely high throughput (EHT) PPDU that includes a pre-EHT portion containing a universal signal (U-SIG) field and an EHT portion containing a data field, wherein the U-SIG field is duplicated according to a first duplication format corresponding to a duplication of the data field in a first frequency bandwidth, wherein the data field is duplicated according to a second duplication format corresponding to a second frequency bandwidth, and wherein the second frequency bandwidth is greater than the first frequency bandwidth by an integer multiple greater than 1; and an interface configured to:

transmit the PPDU via a set of resource units (RUs), each RU of the set of RUs including the duplication of the data field of the PPDU.

9. The wireless communication device of claim 8, wherein the PPDU comprises a single-user (SU) PPDU.

10. The wireless communication device of claim 9, wherein a power spectral density (PSD) limit applicable to transmission of the PPDU is associated with a total frequency bandwidth spanned by the set of RUs.

11. The wireless communication device of claim 10, wherein the total frequency bandwidth is at least twice a respective frequency bandwidth of a respective RU.

12. The wireless communication device of claim 8, wherein a size of respective RUs in the set of RUs is associated with a power spectral density (PSD) limit applicable to a frequency bandwidth of a wireless channel.

13. The wireless communication device of claim 8, wherein the set of RUs is obtained via duplication of a RU a quantity N of times, N being an integer greater than 1.

14. The wireless communication device of claim 8, wherein the data field of the PPDU is duplicated in frequency, and the PPDU is transmitted over each RU of the set of RUs.

15. An apparatus of a wireless communication device, comprising:

means for generating a physical (PHY) layer convergence protocol (PLCP) protocol data unit (PPDU), wherein the PPDU is an extremely high throughput (EHT) PPDU that includes a pre-EHT portion containing a universal signal (U-SIG) field and an EHT portion containing a data field, wherein the U-SIG field is duplicated according to a first duplication format corresponding to a duplication of the data field in a first frequency bandwidth, wherein the data field is duplicated according to a second duplication format corresponding to a second frequency bandwidth, and wherein the second frequency bandwidth is greater than the first frequency bandwidth by an integer multiple greater than 1; and means for transmitting the PPDU via a set of resource units (RUS), each RU of the set of RUs including the duplication of the data field of the PPDU.

16. The apparatus of claim 15, wherein the PPDU comprises a single-user (SU) PPDU.

17. The apparatus of claim 15, wherein a power spectral density (PSD) limit applicable to transmission of the PPDU is associated with a total frequency bandwidth spanned by the set of RUs.

18. The apparatus of claim 17, wherein the total frequency bandwidth is at least twice a respective frequency bandwidth of a respective RU.

19. The apparatus of claim 15, wherein a size of respective RUs in the set of RUs is associated with a power spectral density (PSD) limit applicable to a frequency bandwidth of a wireless channel.

20. The apparatus of claim 15, wherein the set of RUs is obtained via duplication of a RU a quantity N of times, N being an integer greater than 1.

21. The apparatus of claim 15, wherein the data field of the PPDU is duplicated in frequency, and the PPDU is transmitted over each RU of the set of RUs.

22. A non-transitory computer-readable medium storing code for wireless communication at a wireless communication device, the code comprising instructions executable by a processor to:

generate a physical (PHY) layer convergence protocol (PLCP) protocol data unit (PPDU), wherein the PPDU is an extremely high throughput (EHT) PPDU that includes a pre- EHT portion containing a universal signal (U-SIG) field and an EHT portion containing a data field, wherein the U-SIG field is duplicated according to a first duplication format corresponding to a first frequency bandwidth, wherein the data field is duplicated according to a second duplication format corresponding to a second frequency bandwidth, and wherein the second frequency bandwidth is greater than the first frequency bandwidth by an integer multiple greater than 1; and transmit the PPDU via a set of resource units (RUs), each RU of the set of RUs including the duplication of the data field of the PPDU.

23. The non-transitory computer-readable medium of claim 22, wherein the PPDU comprises a single-user (SU) PPDU.

24. The non-transitory computer-readable medium of claim 23, wherein a power spectral density (PSD) limit applicable to transmission of the PPDU is associated with a total frequency bandwidth spanned by the set of RUs.

25. The non-transitory computer-readable medium of claim 24, wherein the total frequency bandwidth is at least twice a respective frequency bandwidth of a respective RU.

26. The non-transitory computer-readable medium of claim 22, wherein a size of respective RUs in the set of RUs is associated with a power spectral density (PSD) limit applicable to a frequency bandwidth of a wireless channel.

27. The non-transitory computer-readable medium of claim 22, wherein the set of RUs is obtained via duplication of a RU a quantity N of times, N being an integer greater than 1.

28. The non-transitory computer-readable medium of claim 22, wherein the data field of the PPDU is duplicated in frequency, and the PPDU is transmitted over each RU of the set of RUs.

* * * * *